(12) United States Patent
Ezra et al.

(10) Patent No.: US 11,025,533 B1
(45) Date of Patent: Jun. 1, 2021

(54) SATISFYING SERVICE DEMANDS IN DATA COMMUNICATION NETWORKS

(71) Applicant: ECI Telecom Ltd., Petah Tikva (IL)

(72) Inventors: Shirel Ezra, Moshav gane tal d.n nachal sorek (IL); Inbal Hecht, Petach Tikva (IL); Efraim Gelman, Ramat Gan (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 16/867,817

(22) Filed: May 6, 2020

Related U.S. Application Data

(63) Continuation of application No. PCT/IB2020/053478, filed on Apr. 13, 2020.

(51) Int. Cl.
| | |
|---|---|
| *H04L 12/707* | (2013.01) |
| *H04L 12/703* | (2013.01) |
| *H04L 12/761* | (2013.01) |
| *H04L 12/24* | (2006.01) |
| *H04L 29/08* | (2006.01) |

(52) U.S. Cl.
CPC ............ *H04L 45/24* (2013.01); *H04L 41/145* (2013.01); *H04L 41/5041* (2013.01); *H04L 45/16* (2013.01); *H04L 45/22* (2013.01); *H04L 45/28* (2013.01); *H04L 67/16* (2013.01)

(58) Field of Classification Search
CPC ...................................................... H04L 45/24
See application file for complete search history.

(56) References Cited

U.S. PATENT DOCUMENTS

| | | | |
|---|---|---|---|
| 10,389,584 B1 | 8/2019 | Ezra | |
| 2007/0047556 A1 | 3/2007 | Raahemi et al. | |
| 2016/0182147 A1* | 6/2016 | Liu | ........................ H04L 45/64 398/4 |
| 2017/0104525 A1* | 4/2017 | Prakash | ................. H04B 10/27 |

OTHER PUBLICATIONS

International Search Report and Written Opinion for PCT Application No. PCT/IB2020/053478, dated Dec. 14, 2020; 14 pages.

* cited by examiner

*Primary Examiner* — Kevin M Cunningham
(74) *Attorney, Agent, or Firm* — Finnegan, Henderson, Farabow, Garrett & Dunner, LLP

(57) ABSTRACT

Techniques for identifying service paths for satisfying a service demand in a data communication network are disclosed. Aspects include identifying a plurality of vertices in a communications route cycle, the communications route cycle alternating through the plurality of vertices and a plurality of edges in a sequence; identifying a plurality of internal paths in the communications route cycle, each of the plurality of internal paths is disjoint to the plurality of edges; identifying a first internal path and a second internal path among the plurality of internal paths as a crossing pair of internal paths; detecting a failure of at least two edges among the plurality of edges; and identifying, based on the communications route cycle and the identified crossing pair of internal paths, a service path that satisfies the service demand in response to detecting the failure of the at least two edges.

28 Claims, 29 Drawing Sheets

SATISFYING SERVICE DEMANDS IN DATA COMMUNICATION NETWORKS

This application is a continuation of PCT International Application No. PCT/IB62020/053478, filed Apr. 13, 2020. The foregoing application is incorporated herein by reference in its entirety.

TECHNICAL FIELD

The present disclosure relates to the field of data communication networks and, more particularly, to systems and methods for satisfying service demands in a data communication network and traffic grooming.

BACKGROUND

A data communication network infrastructure, such as the Internet, can be composed of a large number of network nodes that are connected among one another. Network nodes refer to network components (e.g., clients, servers, microservices, virtual machines, serverless code instances, IoT devices, etc.) that communicate with one another according to predetermined protocols by means of wired or wireless communication links. The data communication network provides services to users according to requirements of the services, such as quality of service commitments.

In a data communication network, different types of service demands with different levels of link failure protection are provided. For example, a type of service demand may require two disjoint paths available from a source node to a destination node of the service demand, and for any failure of a pair of edges on the disjoint paths, there must be another path from the source node to the destination node of the service demand that does not pass through the failed edges. Another type of service demand may require a restoration path available in case of any failure of two edges on a communication route cycle. It is desirable to select service paths in the data communication network such that different types of service demands can be satisfied. Further, when a network link failure occurs, there is a need to quickly identify a service path that satisfies the service demand and does not go through the failed link. In addition, it is desired that a minimal number of service paths is used to satisfy the service demands in the data communication network so as to reduce the cost of operating the network.

SUMMARY

In one disclosed embodiment, a method for satisfying a service demand in a data communication network is disclosed. The method comprises identifying a plurality of vertices in a communications route cycle, the communications route cycle alternating through the plurality of vertices and a plurality of edges in a sequence; identifying a plurality of internal paths in the communications route cycle, wherein each of the plurality of internal paths connects between two of the plurality of vertices, and each of the plurality of internal paths is disjoint to the plurality of edges; identifying a first internal path and a second internal path among the plurality of internal paths as a crossing pair of internal paths; detecting a failure of at least two edges among the plurality of edges; and identifying, based on the communications route cycle and the identified crossing pair of internal paths, a service path that satisfies the service demand in response to detecting the failure of the at least two edges. The first internal path connects between a first vertex and a second vertex among the plurality of vertices, and the second internal path connects between a third vertex and a fourth vertex among the plurality of vertices, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a network management system for satisfying a service demand in a data communication network is disclosed. The network management system comprises at least one processor and a memory for storing instructions executable by the processor. The at least one processor is configured to identify a plurality of vertices in a communications route cycle, the communications route cycle alternating through the plurality of vertices and a plurality of edges in a sequence; identify a plurality of internal paths in the communications route cycle, wherein each of the plurality of internal paths connects between two of the plurality of vertices, and each of the plurality of internal paths is disjoint to the plurality of edges; identify a first internal path and a second internal path among the plurality of internal paths as a crossing pair of internal paths; detect a failure of at least two edges among the plurality of edges; and identify, based on the communications route cycle and the identified crossing pair of internal paths, a service path that satisfies the service demand in response to detecting the failure of the at least two edges. The first internal path connects between a first vertex and a second vertex among the plurality of vertices, and the second internal path connects between a third vertex and a fourth vertex among the plurality of vertices, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a non-transitory computer readable medium is disclosed. The non-transitory computer readable medium stores a set of instructions that is executable by at least one processor of a network management system to cause the network management system to perform operations for satisfying a service demand in a data communication network. The operations comprise identifying a plurality of vertices in a communications route cycle, the communications route cycle alternating through the plurality of vertices and a plurality of edges in a sequence; identifying a plurality of internal paths in the communications route cycle, wherein each of the plurality of internal paths connects between two of the plurality of vertices, and each of the plurality of internal paths is disjoint to the plurality of edges; identifying a first internal path and a second internal path among the plurality of internal paths as a crossing pair of internal paths; detecting a failure of at least two edges among the plurality of edges; and identifying, based on the communications route cycle and the identified crossing pair of internal paths, a service path that satisfies the service demand in response to detecting the failure of the at least two edges. The first internal path connects between a first vertex and a second vertex among the plurality of vertices, and the second internal path connects between a third vertex and a fourth vertex among the plurality of vertices, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a method for satisfying a service demand in a data communication network is disclosed. The method comprises identifying a plurality of vertices in a communications route cycle, the communications route cycle alternating through the plurality of vertices and a plurality of edges in a sequence; identifying a plurality of candidate internal paths in the communications route cycle, wherein each of the plurality of candidate internal paths connects between two of the plurality of vertices, and each of the plurality of candidate internal paths is disjoint to the plurality of edges; identifying a first internal path and a second internal path among the plurality of candidate internal paths as a crossing pair of internal paths; selecting, based on the identified crossing pair of internal paths, a plurality of internal paths among the plurality of candidate internal paths; and determining a set of service paths for satisfying the service demand based on the plurality of internal paths and the plurality of edges. The first internal path connects between a first vertex and a second vertex among the plurality of vertices, and the second internal path connects between a third vertex and a fourth vertex among the plurality of vertices, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a network management system for satisfying a service demand in a data communication network is disclosed. The network management system comprises at least one processor and a memory for storing instructions executable by the processor. The at least one processor is configured to identify a plurality of vertices in a communications route cycle, the communications route cycle alternating through the plurality of vertices and a plurality of edges in a sequence; identify a plurality of candidate internal paths in the communications route cycle, wherein each of the plurality of candidate internal paths connects between two of the plurality of vertices, and each of the plurality of candidate internal paths is disjoint to the plurality of edges; identify a first internal path and a second internal path among the plurality of candidate internal paths as a crossing pair of internal paths; select, based on the identified crossing pair of internal paths, a plurality of internal paths among the plurality of candidate internal paths; and determine a set of service paths for satisfying the service demand based on the plurality of internal paths and the plurality of edges. The first internal path connects between a first vertex and a second vertex among the plurality of vertices, and the second internal path connects between a third vertex and a fourth vertex among the plurality of vertices, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a non-transitory computer readable medium is disclosed. The non-transitory computer readable medium stores a set of instructions that is executable by at least one processor of a network management system to cause the network management system to perform operations for satisfying a service demand in a data communication network. The operations comprise identifying a plurality of vertices in a communications route cycle, the communications route cycle alternating through the plurality of vertices and a plurality of edges in a sequence; identifying a plurality of candidate internal paths in the communications route cycle, wherein each of the plurality of candidate internal paths connects between two of the plurality of vertices, and each of the plurality of candidate internal paths is disjoint to the plurality of edges; identifying a first internal path and a second internal path among the plurality of candidate internal paths as a crossing pair of internal paths; selecting, based on the identified crossing pair of internal paths, a plurality of internal paths among the plurality of candidate internal paths; and determining a set of service paths for satisfying the service demand based on the plurality of internal paths and the plurality of edges. The first internal path connects between a first vertex and a second vertex among the plurality of vertices, and the second internal path connects between a third vertex and a fourth vertex among the plurality of vertices, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a method for identifying service paths for satisfying a service demand in a data communication network is disclosed. The method comprises identifying a plurality of vertices in a communications route cycle, the communications route cycle alternating through the plurality of vertices and a plurality of edges in a sequence; identifying a plurality of internal paths in the communications route cycle, wherein each of the plurality of internal paths connects between two of the plurality of vertices, and each of the plurality of internal paths is disjoint to the plurality of edges; identifying a first internal path and a second internal path among the plurality of internal paths as a crossing pair of internal paths; and determining a first service path and a second service path based on the communications route cycle and based either on the identified crossing pair of internal paths or an internal path connecting between the first end point and the second end point of the service demand, wherein each of the first service path and the second service path satisfies the service demand. The first internal path connects between a first vertex and a second vertex among the plurality of vertices, the first vertex corresponding to a first end point of the service demand, and the second internal path connects between a third vertex and a fourth vertex among the plurality of vertices, the third vertex corresponding to a second end point of the service demand, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a network management system for identifying service paths for satisfying a service demand in a data communication network is disclosed. The network management system comprises at least one processor and a memory for storing instructions executable by the processor. The at least one processor is configured to identify a plurality of vertices in a communications route cycle, the communications route cycle alternating through the plurality of vertices and a plurality of edges in a sequence; identify a plurality of internal paths in the communications route cycle, wherein each of the plurality of internal paths connects between two of the plurality of vertices, and each of the plurality of internal paths is disjoint to the plurality of edges; identify a first internal path and a second internal path among the plurality of internal paths as a crossing pair of internal paths; and determine a first service path and a second service path based on the communications route cycle and based either on the identified crossing pair of internal paths or an internal path connecting between the first end point and the second end point of the service demand, wherein each of the first service path and the second service path satisfies the service demand. The first internal path connects between a first vertex and a second vertex among the plurality of vertices, the first vertex corresponding to a first end point of the service demand, and the second internal path connects between a third vertex and a fourth vertex among the plurality of vertices, the third vertex corresponding to a second end point of the service demand, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a non-transitory computer readable medium is disclosed. The non-transitory computer readable medium stores a set of instructions that is executable by at least one processor of a network management system to cause the network management system to perform operations for identifying service paths for satisfying a service demand in a data communication network. The operations comprise identifying a plurality of vertices in a communications route cycle, the communications route cycle alternating through the plurality of vertices and a plurality of edges in a sequence; identifying a plurality of internal paths in the communications route cycle, wherein each of the plurality of internal paths connects between two of the plurality of vertices, and each of the plurality of internal paths is disjoint to the plurality of edges; identifying a first internal path and a second internal path among the plurality of internal paths as a crossing pair of internal paths; and determining a first service path and a second service path based on the communications route cycle and based either on the identified crossing pair of internal paths or an internal path connecting between the first end point and the second end point of the service demand, wherein each of the first service path and the second service path satisfies the service demand. The first internal path connects between a first vertex and a second vertex among the plurality of vertices, the first vertex corresponding to a first end point of the service demand, and the second internal path connects between a third vertex and a fourth vertex among the plurality of vertices, the third vertex corresponding to a second end point of the service demand, and the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle.

In another disclosed embodiment, a method for identifying a set of internal paths for satisfying a plurality of service demands in a data communication network is disclosed. The method comprises accessing a communications route cycle, the communications route cycle including a number of 2M vertices and a number of 2M edges, M being a positive integer, the communications route cycle further including a plurality of internal paths. Each of the plurality of internal paths is disjoint to each of the 2M edges of the communications route cycle, and each pair of the 2M vertices is connected by one of the plurality of internal paths. The plurality of service demands is of type 1+1+R, and each pair of the 2M vertices corresponds to end points of one of the plurality of service demands. The method further comprises selecting a set of M internal paths for satisfying the plurality of service demands, wherein each of the 2M vertices serves as an end point of exactly one of the M internal paths.

In another disclosed embodiment, a method for identifying a set of internal paths for satisfying a plurality of service demands in a data communication network is disclosed. The method comprises accessing a communications route cycle, the communications route cycle including a number of 2M+4 vertices and a number of 2M+4 edges, M being a positive integer. The vertices are ordered on the communications route cycle in a clockwise or counterclockwise direction with an index from 1 to 2M+4, wherein a first set of vertices includes vertices $\{v_3, \ldots v_{M+2}, v_{M+5}, \ldots v_{2M+4}\}$, and the second set includes vertices $\{v_1, v_2, v_{M+3}, v_{M+4}\}$. The communications route cycle further includes a plurality of internal paths, each pair of vertices in the first set is connected by one of the plurality of internal paths, and vertices in the second set is not connected by any internal paths. The plurality of service demands is of type 2, each of the plurality of service demands having end points corresponding to vertices in the second set, and each pair of vertices in the second set corresponds to end points of one of the plurality of service demands. The method further comprises selecting a first internal path and a second internal path for satisfying the plurality of service demands, wherein the first internal path connects directly between vertices $v_3$ and $v_{M+5}$, and the second internal path connects directly between vertices $v_{M+2}$ and $v_{2M+4}$.

In another disclosed embodiment, a method for identifying a set of internal paths for satisfying a plurality of service demands in a data communication network is disclosed. The method comprises accessing a communications route cycle, the communications route cycle including a number of 2M vertices and a number of 2M edges, M being a positive integer. The vertices are ordered on the communications route cycle in a clockwise or counterclockwise direction with an index from 1 to 2M. The communications route cycle further includes an internal path P directly connecting between vertices $v_1$ and $v_{M+1}$, a plurality of internal paths, wherein for each pair of vertices ($v_{1+i}$, $v_{2M-i+1}$), i being an integer with a value between [1, M−1], the communications route cycle includes a first internal path disjoint to the internal path P, and a second internal path is not disjoint to the internal path P, the first internal path associated with a higher cost than the second internal path. The plurality of service demands is of type 1++, and the plurality of service demands includes a service demand between vertices $v_1$ and $v_{M+1}$, a service demand between vertex $v_1$ and each of the vertices $v_2, \ldots v_M, v_{M+2}, \ldots, v_{2M}$, a service demand between vertex $v_{M+1}$ and each of the vertices $v_2, \ldots v_M$, $v_{M+2}, \ldots, v_{2M}$, and a service demand between each pair of vertices $(v_{1+i}, v_{2M-i+1})$, i being an integer with a value between [1, M−1]. The method further comprises selecting a set of M internal paths for satisfying the plurality of service demands, wherein the M internal paths include the internal path P and the first internal path for each pair of vertices $(v_{1+i}, v_{2M-i+1})$, i being an integer with a value between [1, M−1].

The foregoing general description and the following detailed description are exemplary and explanatory only, and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

FIG. 12 is a diagram illustrating another network graph in a data communication network, in accordance with embodiments of the present disclosure.

DETAILED DESCRIPTION

Figure 1:
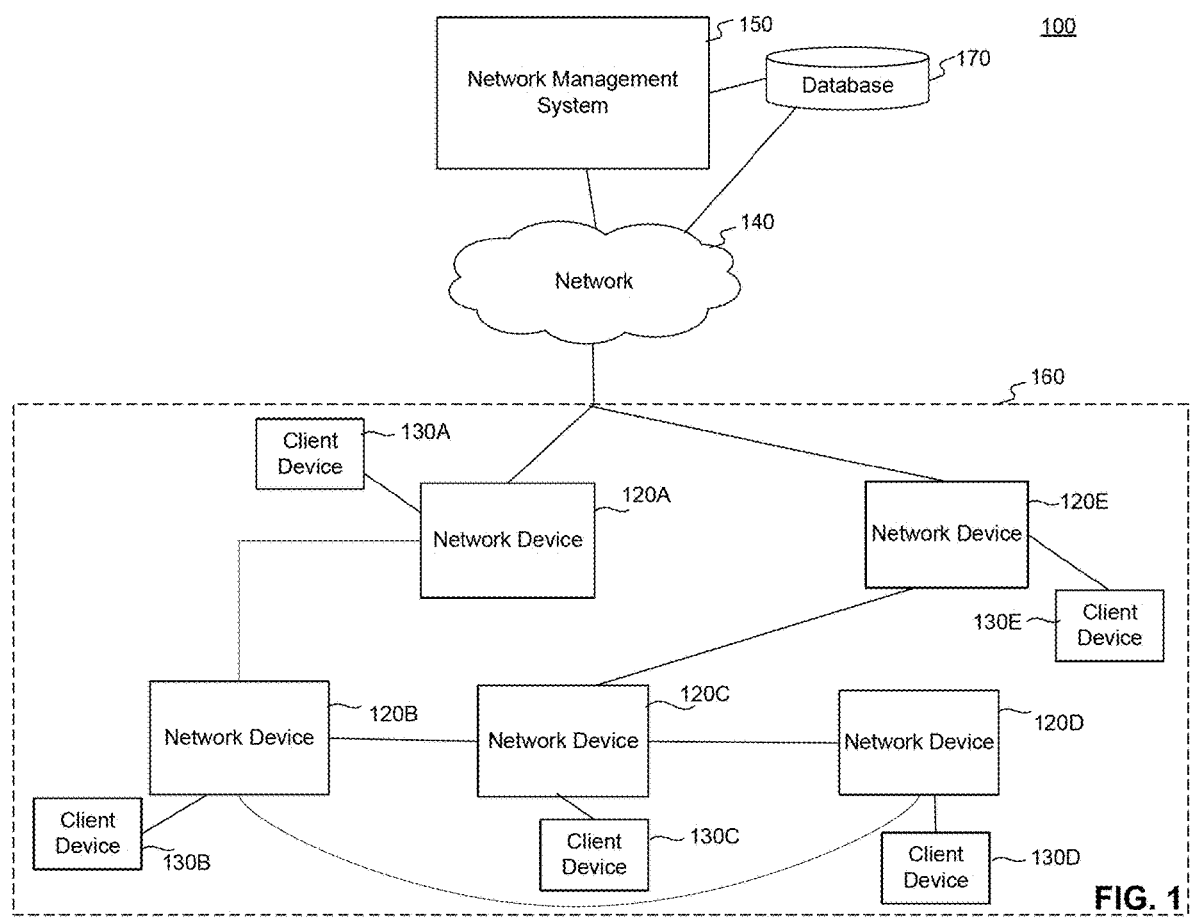
FIG. 1 is a diagram of an example data communication network in which various implementations described herein may be practiced.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows an example data communication network 100 in which various implementations as described herein may be practiced. Data communication network 100 includes, for example, a network 140, network management system 150, database 170, network devices 120A-120E, and client devices 130A-130E. The network devices 120A-120E and client devices 130A-130E form a service network 160, in which the network devices 120A-120E (collectively 120) provide data services to client devices 130A-130E (collectively 130). The network devices may be hardware-based or software-based switches, routers, splitters, or the like that facilitate delivery of data services to client devices 130. The components and arrangements shown in FIG. 1 are not intended to limit the disclosed embodiments, as the system components used to implement the disclosed processes and features can vary. For example, each network device 120 may be associated with no, one, or many client devices 130. In various embodiments, service network 160 may be based on one or more of on-premises network environments, virtualized (cloud) network environments, or combinations of on-premises and cloud networks. Consistent with embodiments described herein, various types of data may be communicated over service network 160, such as Internet (e.g., IP protocol) data, telephony or telecommunications data, satellite data, IoT-based data, cellular data, proprietary network data, and more.

Network management system 150 is configured to manage service deliveries for the service network 160. For example, the network management system 150 may determine service paths and allocate resources for services to be delivered in the data communication network 100. The network management system 150 may determine a set of service paths that satisfy a plurality of service demands in the data communication network 100. In some embodiments, the network management system 150 may identify a set of candidate paths for a service demand in the data communication network 100, such that the candidate paths can be used to satisfy the service demand when a network link failure occurs.

In the present disclosure, a service demand is a request for network resources between two nodes in the network, i.e., end points of the service demand, and a service demand is satisfied when a service path connecting between the end points of the service demand is available and operable. In some embodiments, the network management system 150 may identify a set of service paths that is sufficient to satisfy the service demands in the data communication network 100 and in the meantime reduce the operation cost (e.g., in terms of equipment usage, bandwidth, processing activity, monetary cost, etc.) in the network. Network management system 150 can be a computer-based system including computer system components, desktop computers, workstations, tablets, handheld computing devices, memory devices, and/or internal network(s) connecting the components.

Network 140 facilitates communication between the network management system 150 and the service network 160.

Network management system 150 may send data to network devices 120 via network 140 to allocate resources for services in the data communication network 100. Network management system 150 may also receive data from network devices 120 via network 140 indicating the status of service links in the data communication network 100. Network 140 may be an electronic network. Network devices 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly-accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long Term Evolution (LTE) network or a Personal Communication Service (PCS) network, that allow mobile devices (e.g., client devices 130) to send and receive data via applicable communication protocols, including those described above.

In the illustrated example, network devices 120A and 120E are directly connected to network 140, and network devices 120B-120D connect to the network 140 via their connection to network device 120A and/or 120E. One of ordinary skill in the art would appreciate that network devices 120B-120D may also directly connect to the network 140, or may indirectly connect to the network 140 through numerous other devices. Network devices 120 may be connected to one another via copper wire, coaxial cable, optical fiber, microwave links, or other satellite or radio communication components. Accordingly, network devices 120 may each have a corresponding communications interface (e.g., wireless transceiver, wired transceiver, adapter, etc.) to allow for such communications.

As shown in FIG. 1, network devices 120A-120E are connected to one another. In this example, network device 120A is connected to network device 120B, network device 120B is connected to network devices 120A, 120C, and 120D, network device 120C is connected to network devices 120B, 120D, and 120E, network device 120D is connected to network devices 120B and 120C, and network device 120E is connected to network device 120C. In some embodiments, a network topology may be formed to present a graphical view of the service network 160, where each of the network devices 120 corresponds to a network node or vertex in the network topology. In this disclosure, the terms "node" and "vertex" are exchangeable. The network topology also shows the interconnection relationships among the network devices 120. In some embodiments, the network management system 150 may obtain the connectivity status between the network devices and generate a network topology. In other embodiments, the network management system 150 may acquire the network topology from a server or a database associated with a service provider providing the service network 160. One of ordinary skill in the art would appreciate that the service network 160 illustrated in FIG. 1 is merely an example, and the network topology of service network 160 can be different from the example without departing from the scope of the present disclosure.

Network management system 150 may reside in a server or may be configured as a distributed system including network devices or as a distributed computer system including multiple servers, server farms, clouds, computers, or virtualized computing resources that interoperate to perform one or more of the processes and functionalities associated with the disclosed embodiments.

Database 170 may include one or more physical or virtual storages coupled with the network management system 150. Database 170 may be configured to store information associated with the service network 160, such as the network topology, the capabilities of the network devices 120, the services and corresponding configurations provided by the service network 160, and so on. Database 170 may also be adapted to store processed information associated with the network topology and services in the service network 160, so as to facilitate efficient route configurations and resource allocations to satisfy the service demands in the service network 160. The data stored in the database 170 may be transmitted to the network management system 150 and/or the network devices 120. In some embodiments, the database 170 is stored in a cloud-based server (not shown) that is accessible by the network management system 150 and/or the network devices 120 through the network 140. While the database 170 is illustrated as an external device connected to the network management system 150, the database 170 may also reside within the network management system 150 as an internal component of the network management system 150.

As shown in FIG. 1, network devices 120A-120E are connected with client devices 130A-130E respectively to deliver services. As an example, client devices 130A-130E may include a display such as a television, tablet, computer monitor, video conferencing console, IoT device, or laptop computer screen. Client devices 130A-130E may also include video/audio input devices such as a video camera, web camera, or the like. As another example, client devices 130A-130E may include mobile devices such as a tablet or a smartphone having display and video/audio capture capabilities. While FIG. 1 shows one client device 130 connected to each network device 120, one of ordinary skill in the art would appreciate that more than one client device 130 may be connected to a network device 120 and that in some instances a network device 120 may not be connected to any client device 130.

In some embodiments, the data communication network 100 may include an optical network, where the network devices 120 are interconnected by optical fiber links. The optical fiber links may be capable of conveying a plurality of optical channels using a plurality of specified different optical wavelengths. The optical network may be based on a wavelength division multiplexing (WDM) physical layer. A WDM optical signal comprises a plurality of transmission channels, each channel carrying an information signal modulated over a carrier wavelength. For example, the network devices 120 may be provided with the ability to switch a channel from an input fiber to an output fiber, and to add/drop traffic. The network devices 120 may include a wavelength switch or an optical add/drop multiplexer that performs optical add, drop, and pass through. The network devices 120 may include optical or optical/electrical elements being adapted to perform to various functions such as compensating, amplifying, switching, restoring, performing wavelength conversion of incoming optical signals, etc. The optical fiber links may include dispersion compensation fibers (DCF), optical filters, amplifiers and other relevant optical components that are used for operation of optical networks. The network management system 150 or database 170 may store topologic data that includes information about optical channels and their associated wavelengths. In some embodiments, the data communication network 100 may include a network controller (not shown) configured to improve network utilization by providing an optimal routing and wavelength assignment plan for a given set of service demands. In the context of an optical network, a service demand is a request for a wavelength between two nodes in the network. A circuit is provisioned to satisfy a service demand and is characterized by a route and assigned wavelength number.

Figure 2:
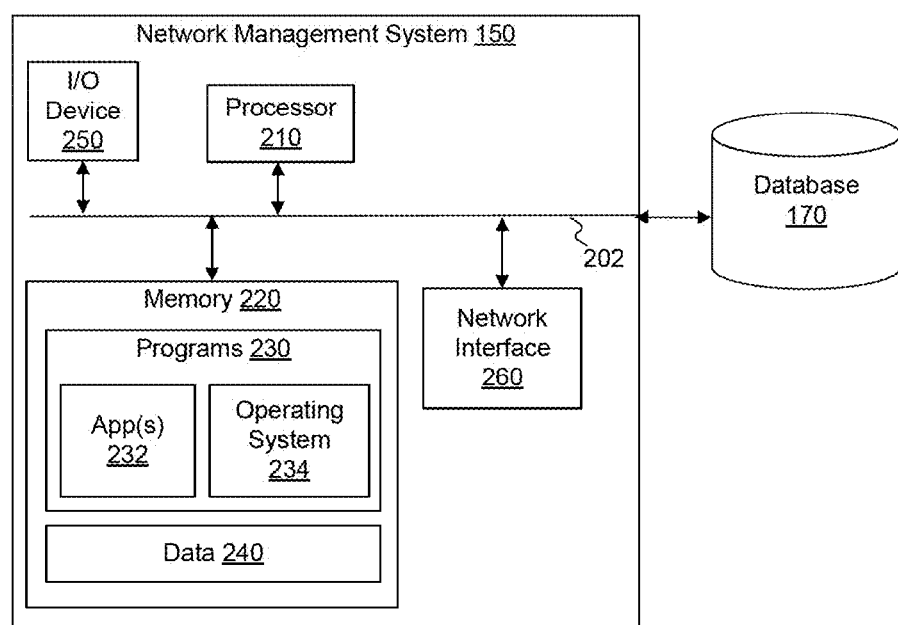
FIG. 2 is a diagram of an example network management system, consistent with the disclosed embodiments.

FIG. 2 shows a diagram of an example network management system 150, consistent with the disclosed embodiments. The network management system 150 may be implemented as a specially made machine that is specially programed to perform functions relating to managing a data communication network, as discussed further below. The special programming at the network management system 150 may enable network management system 150 to determine service paths and allocate resources for services to be delivered in the data communication network 100, consistent with below embodiments.

The network management system 150 may include a bus 202 (or other communication mechanism) which interconnects subsystems and components for transferring information within the network management system 150. As shown, the network management system 150 includes one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the network management system 150).

The processor 210 may be one or more processing devices configured to perform functions of the disclosed methods, such as a microprocessor manufactured by Intel™ or manufactured by AMD™. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the network management system 150 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH- EPROM or any other flash memory, NVRAM, a cache, a register, any other memory chip or cartridge, and networked versions of the same.

The network management system 150 may include one or more storage devices configured to store information used by processor 210 (or other components) to perform certain functions related to the disclosed embodiments. For example, the network management system 150 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to the network management system 150) or external storage communicatively coupled with the network management system 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some embodiments, the network management system 150 may be communicatively connected to one or more remote memory devices (e.g., remote databases (not shown)) through network 140 or a different network. The remote memory devices can be configured to store information that the network management system 150 can access and/or manage. By way of example, the remote memory devices could be document management systems, Microsoft™ SQL database, SharePoint databases, Oracle™ databases, Sybase™ databases, or other relational databases. Systems and methods consistent with disclosed embodiments, however, are not limited to separate databases or even to the use of a database.

The programs 230 include one or more software modules configured to cause processor 210 to perform one or more functions of the disclosed embodiments. Moreover, the processor 210 may execute one or more programs located remotely from one or more components of the data communication network 100. For example, the network management system 150 may access one or more remote programs that, when executed, perform functions related to disclosed embodiments.

In the presently described embodiment, server app(s) 232 causes the processor 210 to perform one or more functions of the disclosed methods. For example, the server app(s) 232 cause the processor 210 to determine service routes and allocate resources for services to be delivered in the data communication network 100.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. The network management system 150 may also include software that, when executed by a processor 210, provides communications with network 140 through the network interface 260 and/or a direct connection to one or more network devices 120A-120E.

In some embodiments, the data 240 may include, for example, network configurations, requirements of service demands, service paths for satisfying the service demands and relationships between the service paths, capacity of the network devices, and so on. For example, the data 240 may include network topology of the service network 160 and operating status (e.g., operating properly or not operating properly) of the communication link between the network devices 120. The data 240 may also include requirements of service demands and service paths for each service demand in the service network 160.

The network management system 150 may also include one or more I/O devices 250 having one or more interfaces for receiving signals or input from devices and providing signals or output to one or more devices that allow data to be received and/or transmitted by the network management system 150. For example, the network management system 150 may include interface components for interfacing with one or more input devices, such as one or more keyboards, mouse devices, and the like, that enable the network management system 150 to receive input from an operator or administrator (not shown).

Solving Type 1+1+R Demands

In a data communication network, such as network 100, there is often a need to provide additional protection for a type of service demands in case of network link failure. For example, one type of service demand is called the 1+1+R demand, where the 1+1+R demand requires two disjoint paths between end points of a service demand, and for any failure of a pair of edges on the two disjoint paths, an alternate path should be available to satisfy the demand. In other words, the 1+1+R demand requires additional protection to the two disjoint paths such that the service demand can still be satisfied in case of a failure of two edges. In this disclosure, the term "edge" refers to the direct connection between two network nodes on a communications route cycle.

Figure 3A:
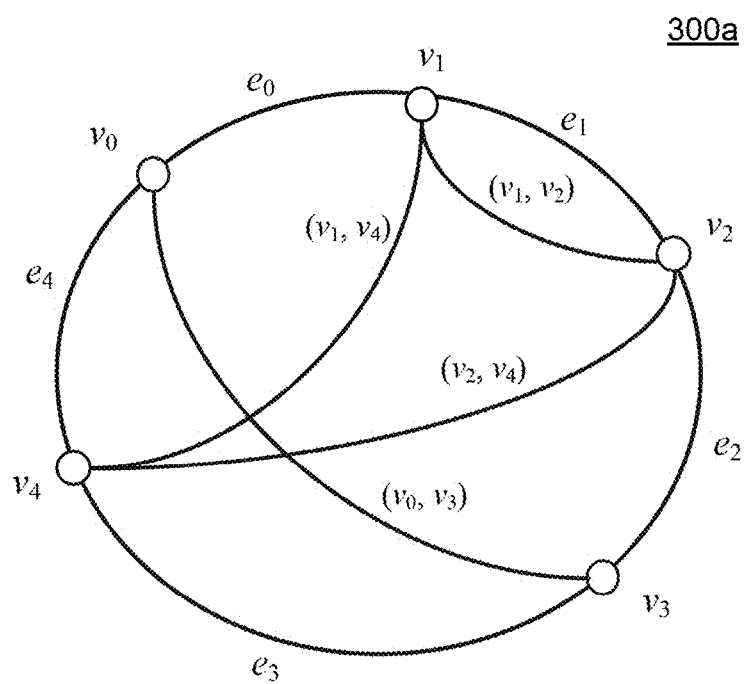
FIGS. 3A-3C are diagrams of an example communications route cycle, consistent with the disclosed embodiments.

FIG. 3A is a diagram of an example communications route cycle 300a, consistent with the present disclosure. As shown in FIG. 3A, the communications route cycle 300a includes vertices $v_0$, $v_1$, $v_2$, $v_3$, $v_4$, and a plurality of edges $e_0$, $e_1$, $e_2$, $e_3$, $e_4$, where each of the edges $e_0$, $e_1$, $e_2$, $e_3$, $e_4$ connects between two vertices. The communications route cycle 300a alternates through the plurality of vertices and edges in a sequence of $v_0$, $e_0$, $v_1$, $e_1$, $v_2$, $e_2$, $v_3$, $e_3$, $v_4$, $e_4$, $v_0$. The communications route cycle 300a also includes a plurality of internal paths connecting between two vertices. As shown in FIG. 3A, there exists an internal path between nodes $(v_0, v_3)$, $(v_1, v_4)$, $(v_2, v_4)$, $(v_1, v_2)$. In the present disclosure, the direct connection between nodes A, B is denoted as (A, B). As discussed earlier, a network node refers to a network component, such as network devices 120, that communicates with other network devices according to predetermined protocols by means of wired or wireless communication links.

In a data communication network, each service demand can be identified by a tuple <s, t>, with s and t being the source and destination node of the service demand. For example, a service demand that is to be delivered from source node "$v_1$" to destination node "$v_4$" can be denoted as $<v_1, v_4>$. If $<v_1, v_4>$ is a type 1+1+R demand discussed above, the demand $<v_1, v_4>$ requires two disjoint paths connecting between $v_1$ and $v_4$, such as the path P1 through nodes ($v_1, v_0, v_4$) and the path P2 through nodes ($v_1, v_2, v_3, v_4$). The demand $<v_1, v_4>$ also requires that for any failures of two edges on the paths P1 and P2, an alternate path that does not involve the failed edges is available for the service demand $<v_1, v_4>$.

Figure 4:
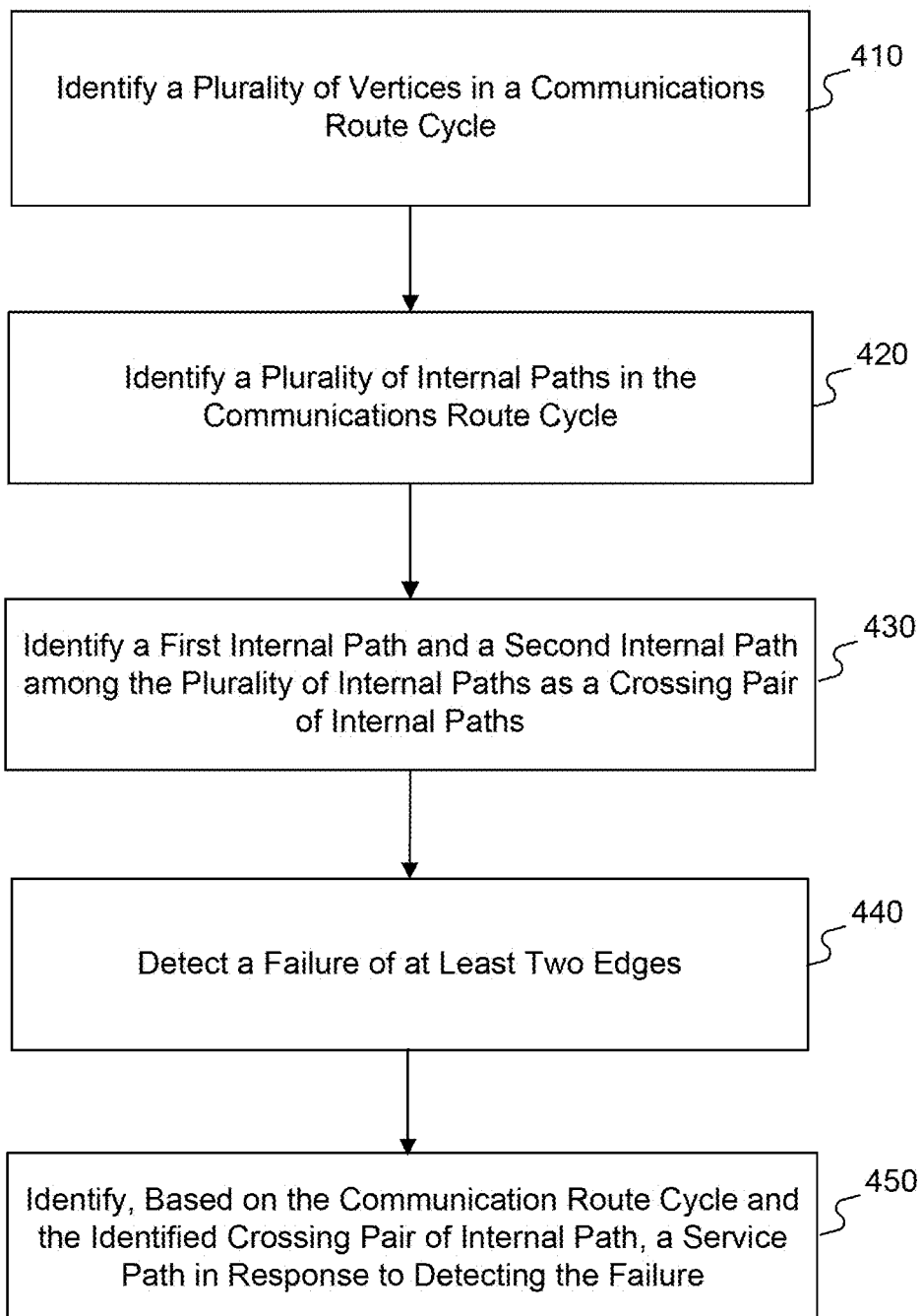
FIG. 4 is a flowchart of an example process for satisfying a service demand in a data communication network, in accordance with embodiments of the present disclosure.

FIG. 4 is a flowchart of an example process 400 for satisfying a service demand in a data communication network, in accordance with embodiments of the present disclosure. The steps associated with this example process may be performed by, for example, a processor of the network management system 150 of FIG. 1. The example process 400 provides an alternate path to satisfy a service demand in a data communication network when a network link failure occurs.

In step 410, the network management system 150 identifies a plurality of vertices in a communications route cycle. The communications route cycle alternates through the plurality of vertices and a plurality of edges in a sequence. For example, referring to the communications route cycle 300a shown in FIG. 3A, the network management system identifies vertices $\{v_0, \ldots, v_4\}$ in the communications route cycle. The communications route cycle 300a also includes a plurality of edges $\{e_0, \ldots, e_4\}$ and alternates through the vertices $\{v_0, \ldots, v_4\}$ and edges $\{e_0, \ldots, e_4\}$ in a sequence.

In step 420, the network management system 150 identifies a plurality of internal paths in the communications route cycle. Each of the plurality of internal paths connects between two of the vertices in the communications route cycle, and each of the plurality of internal paths is disjoint to the edges in the communications route cycle. For example, referring to the communications route cycle 300a shown in FIG. 3A, the network management system 150 identifies internal paths $\{(v_0, v_3), (v_1, v_4), (v_2, v_4), (v_1, v_2)\}$ in the communications route cycle, each of which connects between two of the vertices $\{v_0, \ldots, v_4\}$ and is disjoint to the edges $\{e_0, \ldots, e_4\}$ in the communications route cycle 300a. The diagram depicted in FIG. 3A is an example only and is not intended to be limiting.

In step 430, the network management system 150 identifies a first internal path and a second internal path among the plurality of internal paths as a crossing pair of internal paths. For example, referring to the communications route cycle 300a shown in FIG. 3A, the network management system 150 identifies internal paths $\{(v_0, v_3), (v_1, v_4)\}$ as a crossing pair of internal paths in the communications route cycle. The communications route cycle 300a may include a plurality of crossing pairs of internal paths. For example, the communications route cycle 300a may include another crossing pair of internal paths $\{(v_0, v_3), (v_2, v_4)\}$ in addition to the crossing pair $\{(v_0, v_3), (v_1, v_4)\}$.

The vertices in the crossing pair of internal paths may appear in an alternate fashion on the communications route cycle 300a. For example, referring to the crossing pair $\{(v_0, v_3), (v_1, v_4)\}$ in the communications route cycle 300a, the first internal path connects between vertices ($v_0, v_3$), and the second internal path connects between vertices ($v_1, v_4$). As shown in FIG. 3A, the communications route cycle 300a alternates through one vertex $v_0$ of the first internal path, one vertex $v_1$ of the second internal path, the other vertex $v_3$ of the first internal path, and the other vertex $v_4$ of the second internal path in a sequence. Each vertex in the first internal path intervenes between the vertices of the second internal path on the communications route cycle, and each vertex in the second internal path intervenes between the vertices of the first internal path on the communications route cycle. For example, the vertex $v_0$ in the first internal path is located between $v_1$ and $v_4$, the vertices of the second internal path, on one side of the communications route cycle 300a between $v_1$ and $v_4$ between $v_1$ and $v_4$. The other vertex $v_3$ in the first internal path is also located between $v_1$ and $v_4$ on the other side of communications route cycle 300a between $v_1$ and $v_4$. Similarly, the vertex $v_1$ in the second internal path is located between $v_0$ and $v_3$, the vertices of the first internal path, on one side of the communications route cycle 300a between $v_0$ and $v_3$. The other vertex $v_4$ in the second internal path is also located between $v_0$ and $v_3$ on the other side of communications route cycle 300a between $v_0$ and $v_3$.

The vertices in the non-crossing pair of internal paths do not intersect from one another. For example, referring to the pair of internal paths $\{(v_0, v_3), (v_1, v_2)\}$ in the communications route cycle 300a, it is not a crossing pair of internal paths. As shown in FIG. 3A, the internal paths $\{(v_0, v_3), (v_1, v_2)\}$ do not cross each other, and the vertices $v_0$ and $v_3$ of the first path do not intersect between the vertices $v_1$ and $v_2$ of the second path. Instead, the vertices $v_0$ and $v_3$ of the first path are located on the same side to the vertices $v_1$ and $v_2$ of the second path vertices $v_1$ and $v_2$ of the second path on the communications route cycle 300a. The communications route cycle 300a does not alternate through the vertices of the first internal path and the second internal path, and instead passes through the vertices in the sequence of the first vertex $v_0$ of the first internal path, the first vertex $v_1$ of the second internal path, the second vertex $v_2$ of the second internal path, and the second vertex $v_3$ of the first internal path.

In some embodiments, the network management system may also identify a pair of internal paths that share a common vertex. For example, referring to the communications route cycle 300a shown in FIG. 3A, the network management system identifies a pair of internal paths $\{(v_1, v_2), (v_1, v_4)\}$ in the communications route cycle that shares a common vertex $v_1$. The communications route cycle may include a plurality of pairs of internal paths that share a common vertex. For example, the communications route cycle 300a includes three pairs of internal paths $\{(v_1, v_4), (v_2, v_4)\}$, $\{(v_1, v_2), (v_2, v_4)\}$, and $\{(v_1, v_2), (v_1, v_4)\}$, each of which includes a common vertex shared by the internal paths.

Figure 3B:
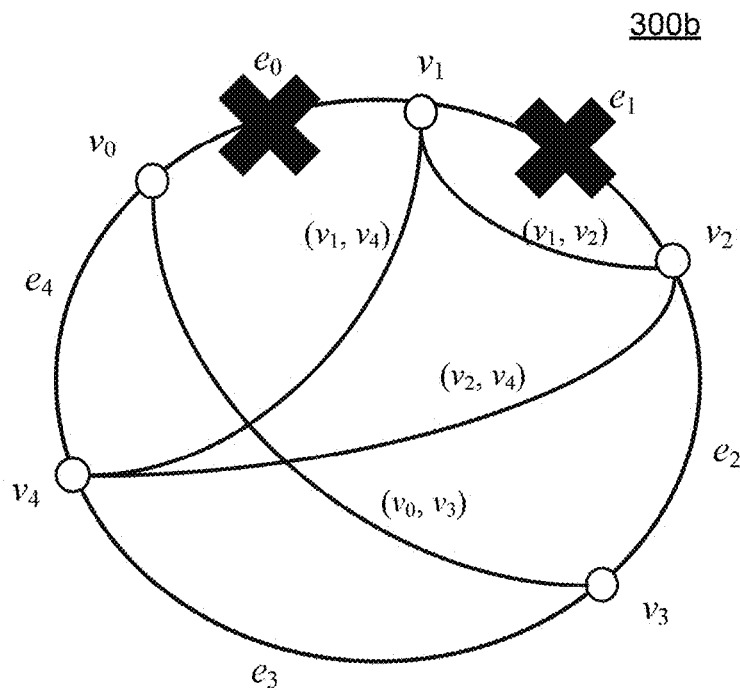

Referring back to FIG. 4, in step 440, the network management system 150 detects a failure of at least two edges on the communications route cycle. For example, the network management system 150 may identify a failure of two edges by detecting service degradation in one or more services currently provided by the data communication network. As another example, the network management system 150 may identify the failure of edges by receiving feedback from network devices indicating a failure to send or receive data by the network devices. Other methods may be used to identify an edge failure in the data communication network, which are not describe herein for the sake of brevity. FIG. 3B shows an example communications route cycle 300b, in which a failure of $e_0$ and $e_1$ are identified in the communications route cycle.

In step 450 of process 400, the network management system 150 identifies, based on the communications route cycle and the identified crossing pair of internal paths, a service path that satisfies a service demand in response to detecting the failure of the at least two edges. In this disclosure, a service path refers to a single path with two end vertices or a series of paths in which an end vertex of a path is the beginning vertex of a next path. A service path satisfies a service demand <x, y> if it connects directly between vertices x and y or if the beginning vertex of the first service path is x and the end vertex of the last service path is y. For example, as shown in FIG. 3B, service demand <$v_2$, $v_4$> can be satisfied by either service path ($v_2$, $v_4$) or service path ($v_2$, $v_3$, $v_4$).

Referring to FIG. 3B, the communications route cycle 300b may receive a type 1+1+R service demand <$v_1$, $v_4$> that requires protection over two edge failures. In the event that a failure of $e_0$ and $e_1$ occurs in the communications route cycle, an alternate service path that does not involve the failed edges $e_0$ and $e_1$ should be found to satisfy the service demand <$v_1$, $v_4$>. As shown in FIG. 3B, the service demand <$v_1$, $v_4$> can be satisfied by the internal path ($v_1$, $v_4$) when edges $e_0$ and $e_1$ both fail. In addition, the service demand <$v_1$, $v_4$> can be satisfied by the series of internal paths ($v_1$, $v_2$) and ($v_2$, $v_4$), denoted as (($v_1$, $v_2$), ($v_2$, $v_4$)), when edges $e_0$ and $e_1$ both fail. The service demand <$v_1$, $v_4$> can further be satisfied by the combination of internal path ($v_1$, $v_2$) and the path through nodes ($v_2$, $v_3$, $v_4$), denoted as (($v_1$, $v_2$), $v_2$, $v_3$, $v_4$). Thus, multiple service paths are available to satisfy the service demand <$v_1$, $v_4$> when edges $e_0$ and $e_1$ both fail.

Figure 3C:
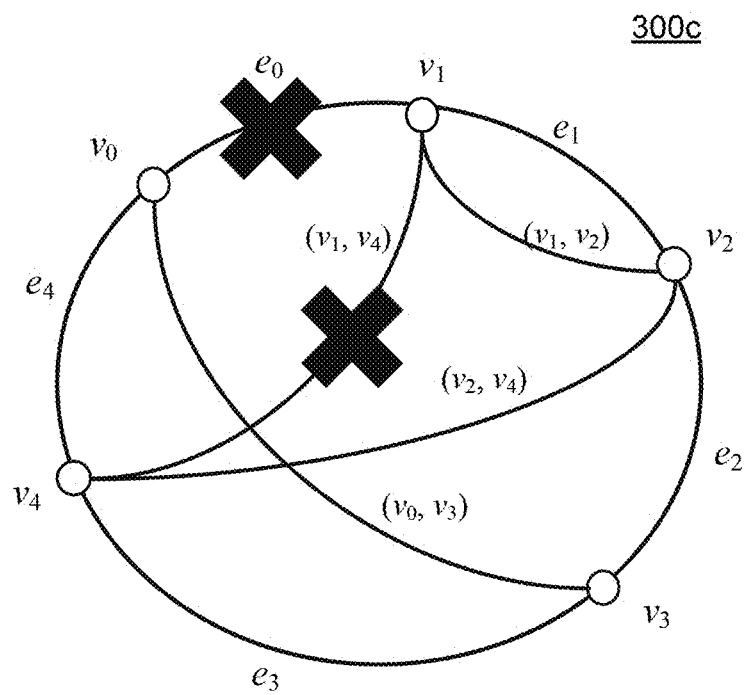

The edge failures can be any edges in the communications route cycle. For example, as shown in FIG. 3C, a failure of edge $e_0$ and internal path ($v_1$, $v_4$) are identified in the communications route cycle 300c. In this example, the service demand <$v_1$, $v_4$> can be satisfied by the path through nodes ($v_1$, $v_2$, $v_3$, $v_4$) when edges $e_0$ and internal path ($v_1$, $v_4$) both fail. In addition, the service demand <$v_1$, $v_4$> can be satisfied by the service path (($v_1$, $v_2$), ($v_2$, $v_4$)) or by (($v_1$, $v_2$), $v_2$, $v_3$, $v_4$) when edges $e_0$ and internal path ($v_1$, $v_4$) both fail. Thus, multiple service paths are available to satisfy the service demand <$v_1$, $v_4$> when edges $e_0$ and internal path ($v_1$, $v_4$) both fail.

Figure 5:
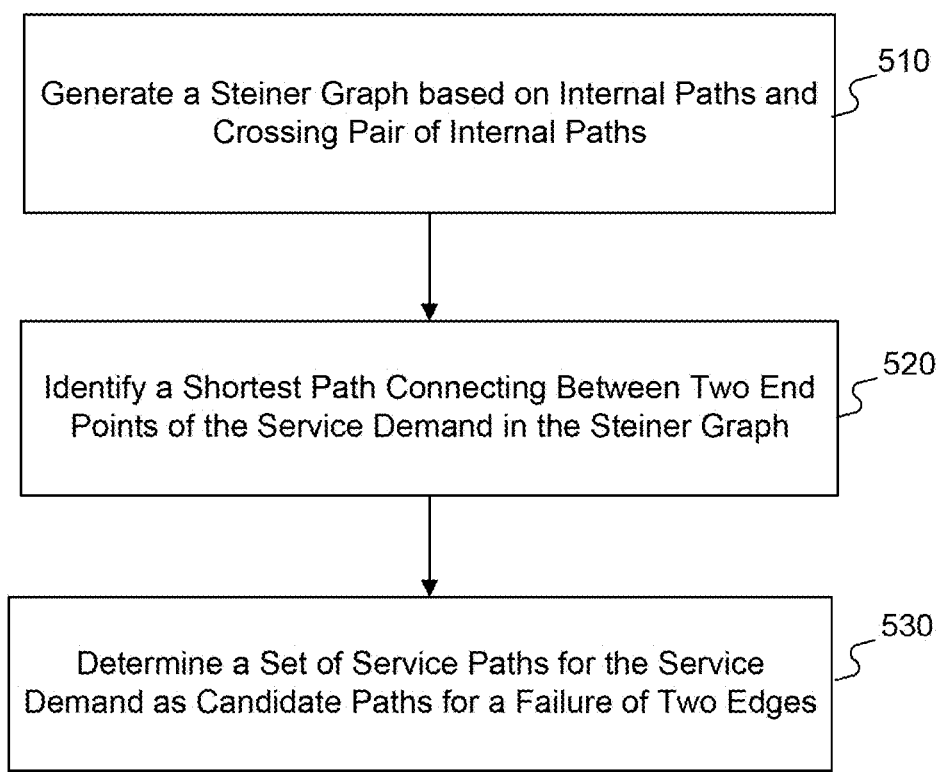
FIG. 5 is a flowchart of an example process for determining a set of service paths for satisfying a service demand in a data communication network, in accordance with embodiments of the present disclosure.

FIG. 5 is a flowchart of an example process 500 for determining a set of service paths for satisfying a service demand in a data communication network, in accordance with embodiments of the present disclosure. The steps associated with this example process may be performed by, for example, a processor of the network management system 150 of FIG. 1. The example process 500 provides an alternate path to satisfy a service demand in a data communication network when a network link failure occurs. In some implementations, the example process 500 may be implemented in step 450 of the process 400 described above in connection with FIG. 4.

In step 510, the network management system generates a Steiner graph based on internal paths and crossing pairs of internal paths in the communications route cycle. The Steiner graph includes a plurality of vertices and edges connecting the vertices. Using the Steiner graph, a Steiner tree that connects end points of a service demand on the Steiner graph provides a service path that satisfies the service demand.

The Steiner graph includes vertices representing nodes on the communications route cycle and vertices representing the internal paths in the communications route cycle. To generate a Steiner graph, the network management system may create vertices corresponding to nodes on the communications route cycle and vertices corresponding to the internal paths in the communications route cycle.

Figure 6:
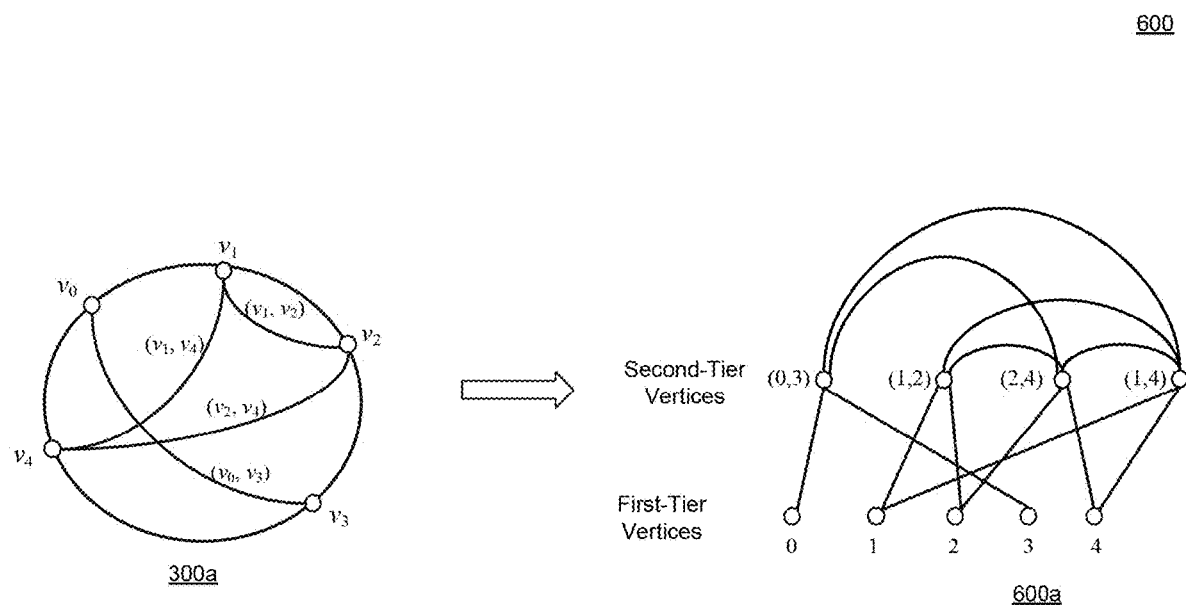
FIG. 6 is a diagram illustrating a process for generating a Steiner graph, in accordance with embodiments of the present disclosure.

FIG. 6 is a diagram illustrating a process 600 for generating a Steiner graph, in accordance with embodiments of the present disclosure. The diagrams depicted in FIG. 6 are examples only and are not intended to be limiting. As shown in FIG. 6, a Steiner graph 600a is generated based on the communications route cycle 300a. The Steiner graph 600a includes a first tier of vertices {0, 1, 2, 3, 4} that correspond to vertices {$v_0$, $v_1$, $v_2$, $v_3$, $v_4$} on the communications route cycle 300a. The Steiner graph 600a further includes a second tier of vertices {(0, 3), (1, 2), (2, 4), (1, 4)} that correspond to internal paths {($v_0$, $v_3$), ($v_1$, $v_2$), ($v_2$, $v_4$), ($v_1$, $v_4$)} on the communications route cycle 300a.

After creating the vertices in the Steiner graph, the network management system 150 may create edges connecting the vertices in the Steiner graph. The network management system 150 may create a first set of edges connecting the second-tier vertex that corresponds to an internal path with the first-tier vertices corresponding to end points of the internal path. For example, as shown in FIG. 6, for vertex (0, 3) that corresponds to internal path ($v_0$, $v_3$), an edge between vertex 0 and vertex (0, 3) is created and another edge between vertex 3 and vertex (0, 3) is created on the Steiner graph. Similarly, for vertex (1, 2) that corresponds to internal path ($v_1$, $v_2$), an edge between vertex 1 and vertex (1, 2) is created and another edge between vertex 2 and vertex (1, 2) is created on the Steiner graph. For vertex (2, 4) that corresponds to internal path ($v_2$, $v_4$), an edge between vertex 2 and vertex (2, 4) is created and another edge between vertex 4 and vertex (2, 4) is created on the Steiner graph. For vertex (1, 4) that corresponds to internal path ($v_1$, $v_4$), an edge between vertex 1 and vertex (1, 4) is created and another edge between vertex 4 and vertex (1, 4) is created on the Steiner graph. Thus, for each second-tier vertex representing an internal path on the Steiner graph, two edges are created connecting that vertex to the first tier of vertices representing end points of the internal path.

The Steiner graph may further include a second set of edges connecting the second-tier vertices if a common node is shared by the corresponding internal paths. For example, as shown in FIG. 6, an edge between the second-tier vertices (1, 2) and (2, 4) is created on the Steiner graph as they share a common node 2. Similarly, an edge between the second-tier vertices (1, 2) and (1, 4) is created on the Steiner graph as they share a common node 1, and an edge between the second-tier vertices (2, 4) and (1, 4) is created on the Steiner graph as they share a common node 4.

The Steiner graph may further include a third set of edges connecting the second-tier vertices if the corresponding internal paths are a crossing pair of internal paths. For example, as discussed above, the internal paths {($v_0$, $v_3$), ($v_1$, $v_4$)} and {($v_0$, $v_3$), ($v_2$, $v_4$)} is a crossing pair of internal paths in the communications route cycle 300a. Thus, as shown in FIG. 6, an edge between the second-tier vertices (0, 3) and (1, 4) and another edge between the second-tier vertices (0, 3) and (2, 4) are created on the Steiner graph, and the Steiner graph for the communications route cycle 300a is completed.

The first set, second set, and third set of edges may be generated in parallel by the network management system or may be generated in sequence. Similarly, the first-tier and second-tier vertices may be generated in parallel by the network management system or may be generated in sequence. The present disclosure does not limit the order the vertices or the edges are generated in constructing the Steiner graph.

Figure 7A:
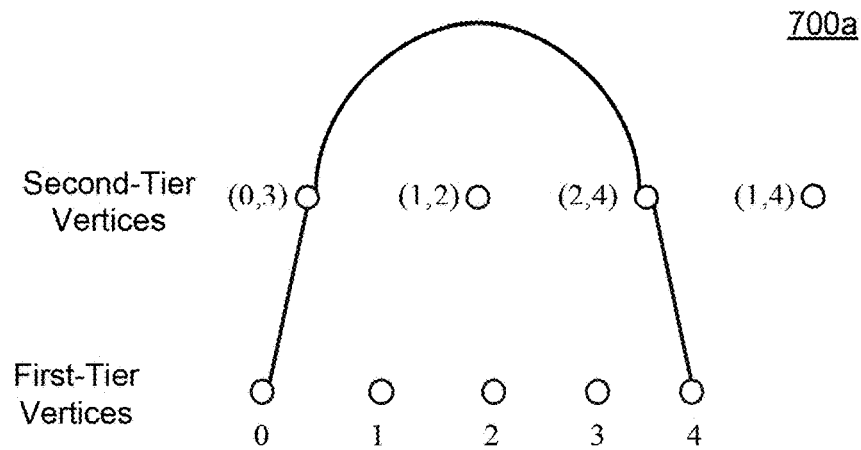
FIGS. 7A-7C are diagrams of example paths over a Steiner graph, in accordance with embodiments of the present disclosure.

Referring back to FIG. 5, in step 520, the network management system 150 identifies a shortest path connecting between vertices corresponding to two end points of the service demand in the Steiner graph. For example, for service demand <$v_0$, $v_4$>, the first-tier vertices 0 and 4 in the Steiner graph 600 shown in FIG. 6 correspond to the end points of the service demand, and the network management system 150 identifies a shortest path connecting between the first-tier vertices 0 and 4 in the Steiner graph. FIG. 7A is a diagram illustrating an example Steiner tree 700a for the service demand $<v_0, v_4>$. In this example, assuming all edges in the Steiner graph 600a are equal weight, the shortest path connecting between the first-tier vertices 0 and 4 is the path through vertices (0, (0, 3), (2, 4), 4) as shown in FIG. 7A.

Figure 7B:
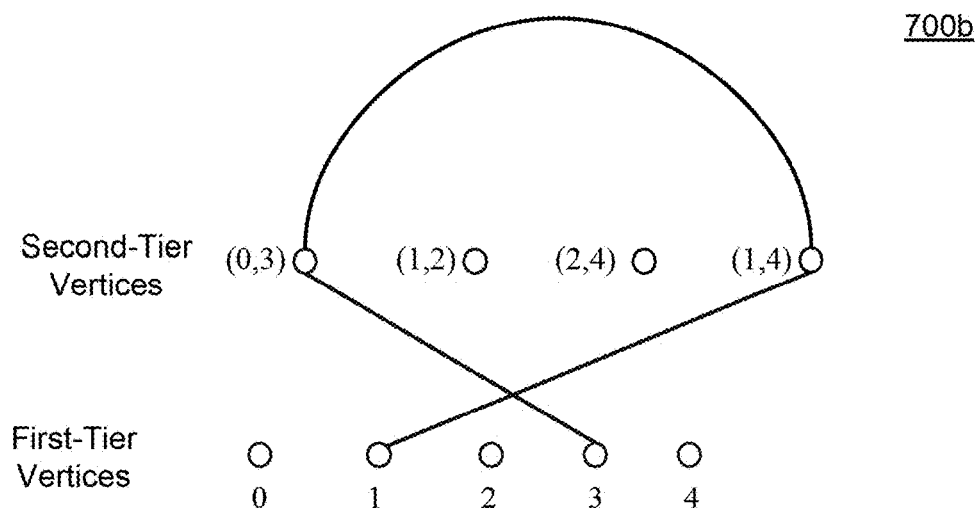

As another example, for service demand $<v_1, v_3>$, the first-tier vertices 1 and 3 in the Steiner graph 600a shown in FIG. 6 correspond to the end points of the service demand, and the network management system identifies a shortest path connecting between the first-tier vertices 1 and 3 in the Steiner graph. FIG. 7B is a diagram illustrating an example Steiner tree 700b for the service demand $<v_1, v_3>$. In this example, assuming all edges in the Steiner graph 600a are equal weight, the shortest path connecting between the first-tier vertices 1 and 3 is the path through vertices (1, (1, 4), (0, 3), 3) as shown in FIG. 7B.

Figure 7C:
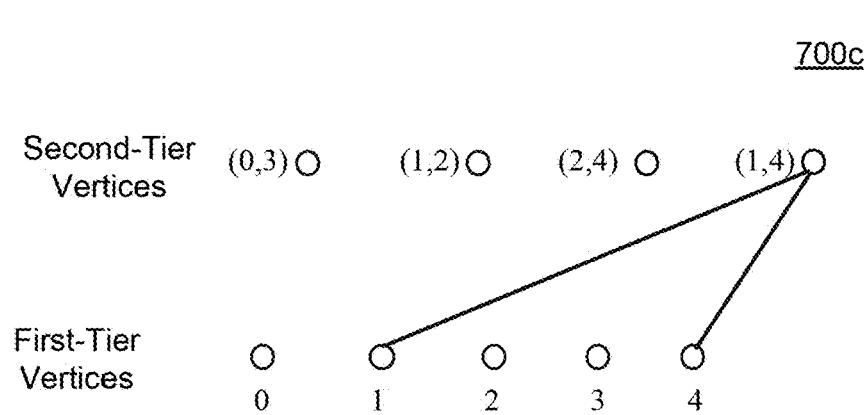

As another example, for service demand $<v_1, v_4>$, the first-tier vertices 1 and 4 in the Steiner graph 600a shown in FIG. 6 correspond to the end points of the service demand, and the network management system identifies a shortest path connecting between the first-tier vertices 1 and 4 in the Steiner graph. FIG. 7C is a diagram illustrating an example Steiner tree 700c for the service demand $<v_1, v_4>$. In this example, assuming all edges in the Steiner graph 600a are equal weight, the shortest path connecting between the first-tier vertices 1 and 4 is the path through vertices (1, (1, 4), 4) as shown in FIG. 7C.

Given a Steiner graph and a set of terminal vertices, a minimum cost Steiner tree can be found heuristically between the terminal vertices, and thus the details of how to find a Steiner tree are not provided in this disclosure. Methods to find a minimum cost Steiner tree can also be used to identify the shortest path in the Steiner graph for a corresponding service demand.

Referring back to FIG. 5, in step 530, the network management system 150 determines a set of service paths for the service demand as candidate paths for a failure of two edges based on the identified shortest path. For example, referring to FIG. 3B, the network management system 150 determines candidate paths for the service demand in case that a failure of $e_0$ and $e_1$ occurs in the communications route cycle 300b. As discussed above in connection with FIG. 7C, for service demand $<v_1, v_4>$, the network management system 150 identifies the shortest path connecting vertices 1 and 4 on the Steiner graph being (1, (1, 4), 4). Thus, in case that edges $e_0$ and $e_1$ in the communications route cycle 300b fail, the network management system 150 identifies candidate paths based on the shortest path (1, (1, 4), 4) in the Steiner graph. The shortest path in the Steiner graph includes a vertex (1, 4) corresponding to the internal path $(v_1, v_4)$, and the network management system 150 identifies candidate paths in case of the edge failures. In this example, the candidate service path is the internal path $(v_1, v_4)$ when a failure of $e_0$ and $e_1$ occurs in the communications route cycle 300b.

As another example, for service demand $<v_1, v_3>$, the network management system 150 identifies the shortest path connecting vertices 1 and 3 on the Steiner graph being (1, (1, 4), (0, 3), 3) as discussed above in connection with FIG. 7B. Thus, in case that edges $e_0$ and $e_1$ in the communications route cycle 300b fail, the network management system 150 identifies candidate paths based on the shortest path (1, (1, 4), (0, 3), 3) in the Steiner graph. The shortest path in the Steiner graph includes a vertex (1, 4) corresponding to the internal path $(v_1, v_4)$ and a vertex (0, 3) corresponding to the internal path $(v_0, v_3)$. In this example, the network management system 150 identifies candidate service path being $((v_1, v_4), v_3)$, i.e., the internal path $(v_1, v_4)$ combined with edge $e_3$, when a failure of $e_0$ and $e_1$ occurs in the communications route cycle 300b. Although the internal path $(v_0, v_3)$ is not used as part of a candidate service path in this example, the internal path $(v_0, v_3)$ may be used for a candidate service path when other edges in the communications route cycle fail. For example, when edges $e_1$ and $e_3$ in the communications route cycle 300b fail, the network management system 150 identifies candidate service path being $(v_1, v_0, (v_0, v_3))$, i.e., edge $e_3$ combined with the internal path $(v_0, v_3)$. Thus, for service demand $<v_1, v_3>$, two internal paths $(v_1, v_4)$ and $(v_0, v_3)$ are required to protect the service demand in case of a failure of any two edges in the communications route cycle.

The above described method in connection with FIG. 5 can be used to identify alternate service paths in case of a failure of any two edges on communications route cycle. For example, based on the set of internal paths in the shortest path of the Steiner graph, a service demand can be satisfied using one or more of the internal paths when a failure of two or more edges occur in the communications route cycle. In some embodiments, the candidate service paths in case of edge failures may be pre-determined using the Steiner graph and stored in a memory prior to the occurrence of the edge failures, such that the network management system 150 may quickly determine the alternate service path when the edge failure occurs. In other embodiments, the network management system 150 may determine the candidate service paths using the Steiner graph when the edge failure occurs.

In a data communication network, there may be a large number of service demands to be satisfied. It may be required to provide service paths to satisfy the service demands, and in the meantime, it is desired to reduce the number of service paths to satisfy the service demands to the extent possible. The disclosed embodiments provide a method for traffic grooming, where a set of service paths are determined for multiple service demands collectively.

Figure 8:
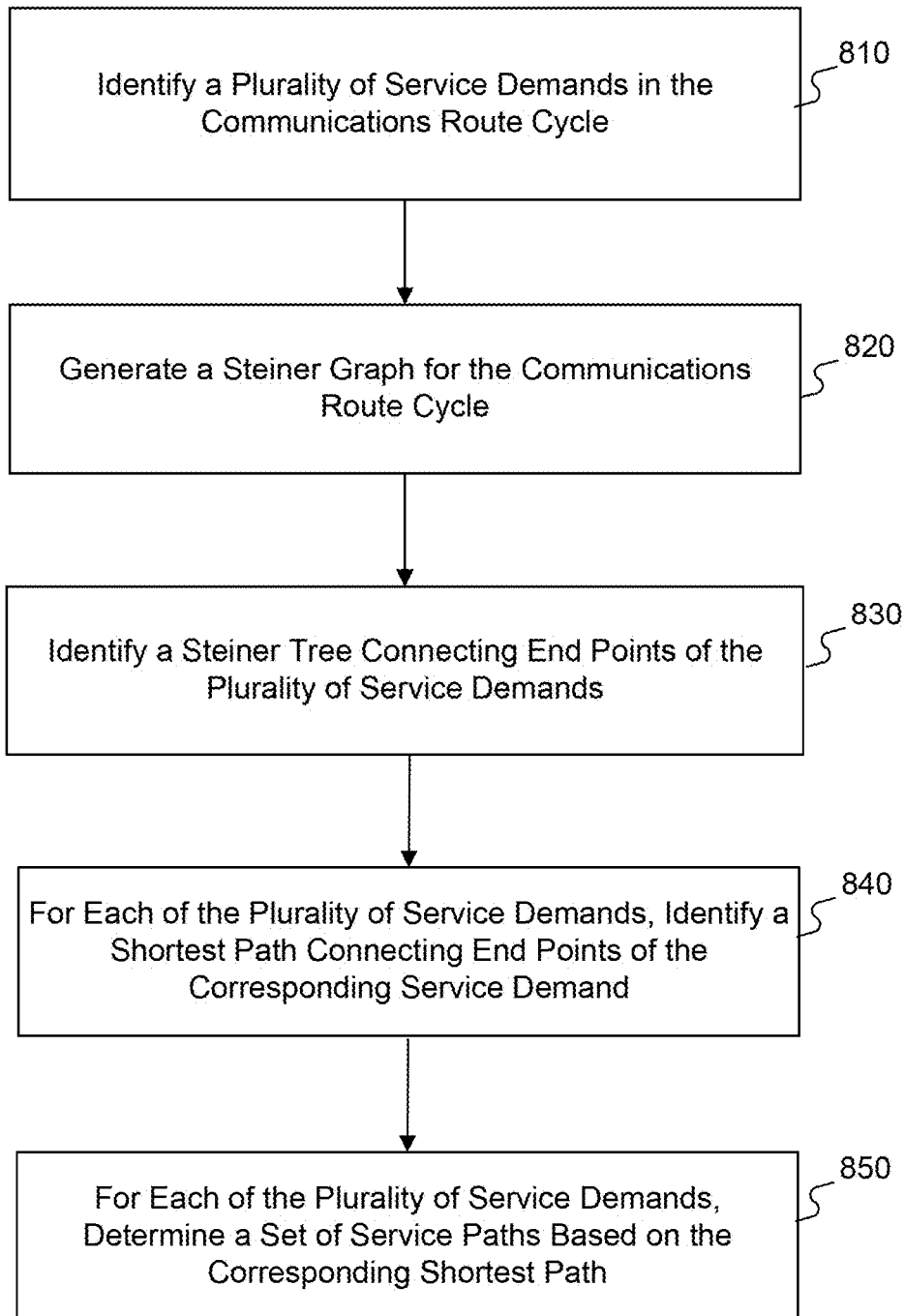
FIG. 8 is a flowchart of an example process for satisfying a plurality of service demands in a data communication network, in accordance with embodiments of the present disclosure.

FIG. 8 is a flowchart of an example process 800 for satisfying a plurality of service demands in a data communication network, in accordance with embodiments of the present disclosure. The steps associated with this example process may be performed by, for example, a processor of the network management system 150 of FIG. 1. The example process 800 provides a method to determine a set of service paths for multiple service demands collectively.

In step 810, the network management system 150 identifies a plurality of service demands in the communications route cycle. For example, there may be multiple service demands, such as $<v_0, v_4>$ and $<v_1, v_3>$, for the communications route cycle 300a shown in FIG. 3A.

In step 820, the network management system 150 generates a Steiner graph for the communications route cycle. For example, the network management system 150 may identify the internal paths and crossing pairs of internal paths in the communications route cycle and generate a Steiner graph based on the internal paths and crossing pairs of internal paths. The network management system 150 may generate a Steiner graph according to the method described above in connection with FIGS. 5 and 6.

Figure 9:
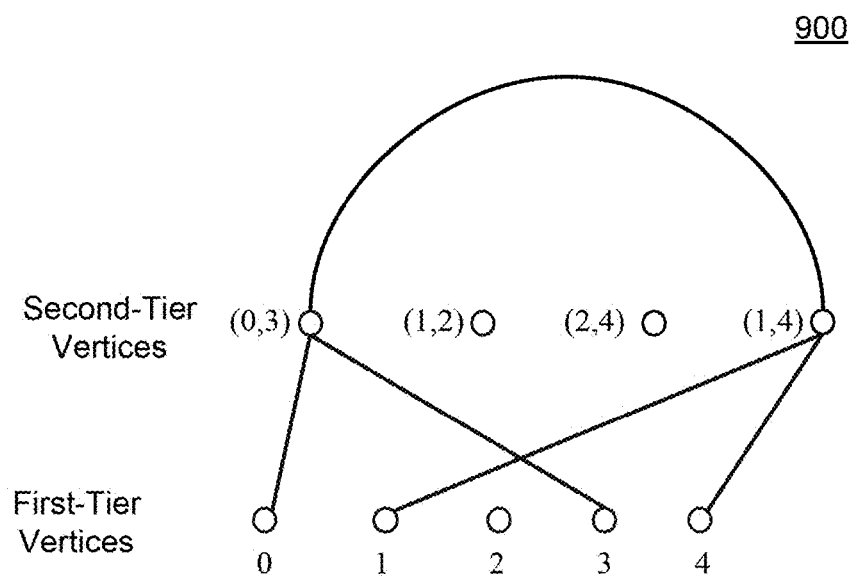
FIG. 9 is a diagram of an example Steiner tree, in accordance with embodiments of the present disclosure.

In step 830, the network management system 150 identifies a Steiner tree connecting end points of the plurality of service demands in the Steiner graph. For example, referring to the Steiner graph 600a shown in FIG. 6, when there are two service demands $<v_0, v_4>$ and $<v_1, v_3>$, the end points for the service demands collectively includes $v_0$, $v_1$, $v_3$, $v_4$. The network management system 150 may identify a Steiner tree connecting through vertices 0, 1, 3, 4 on the Steiner graph. FIG. 9 is a diagram illustrating an example Steiner tree 900 for service demands $<v_0, v_4>$ and $<v_1, v_3>$. In this example, the network management system 150 may identify the Steiner tree connecting through 0, 1, 3, 4 being the path through vertices {0, (0, 3), 3, (1, 4), 1, 4} as shown in FIG. 9. The network management system 150 may identify a Steiner tree according to the method described above in connection with FIG. 5.

Figure 10A:
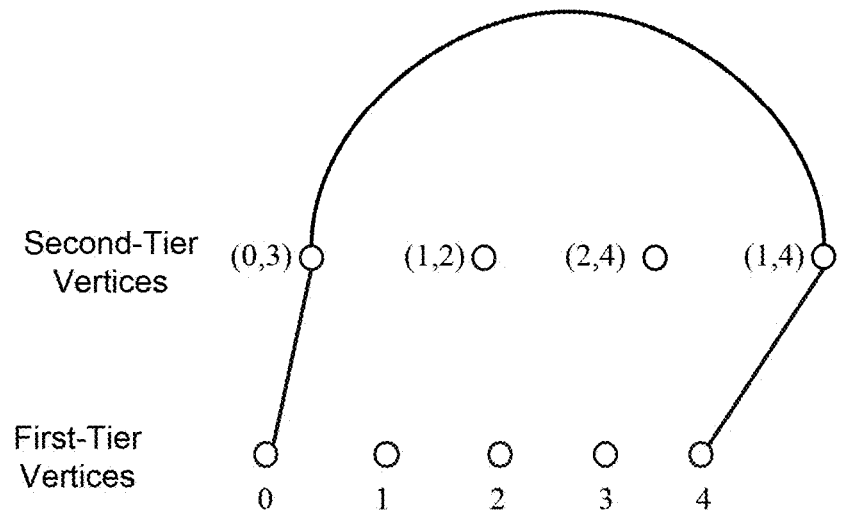
FIGS. 10A and 10B are diagrams illustrating a path on the Steiner tree, in accordance with embodiments of the present disclosure.
Figure 10B:
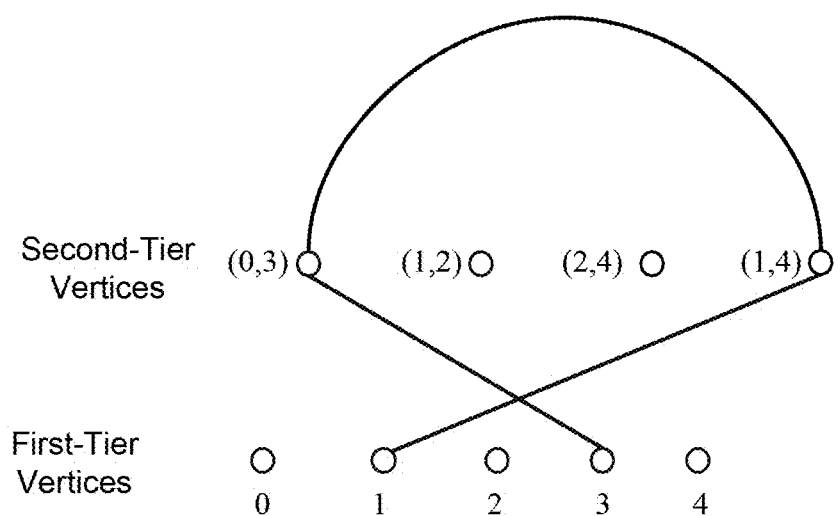

In step 840, the network management system 150, for each of the plurality of service demands, determines a shortest path connecting end points of the corresponding service demand based on the Steiner tree. The network management system 150 may find a shortest path on the Steiner tree for each service demand. For example, referring to the Steiner tree 900 shown in FIG. 9, the network management system 150 may determine a shortest path connecting end points of service demand $<v_0, v_4>$ on the Steiner tree. FIG. 10A is a diagram illustrating an example shortest path 1000a for service demands $<v_0, v_4>$ on the Steiner tree. In this example, the network management system 150 may identify the shortest path connecting through vertices 0 and 4 on the Steiner tree being the path through vertices (0, (0, 3), (1, 4), 4) as shown in FIG. 10A. FIG. 10B is a diagram illustrating an example shortest path 1000b for service demands $<v_1, v_3>$ on the Steiner tree. In this example, the network management system 150 may identify the shortest path connecting through vertices 1 and 3 on the Steiner tree being the path through vertices (1, (1, 4), (0, 3), 3) as shown in FIG. 10B.

It can be seen that only two internal paths $(v_1, v_4)$ and $(v_0, v_3)$, corresponding to two second-tier vertices (1, 4) and (0, 3) on the Steiner graph, are required to satisfy both service demands $<v_0, v_4>$ and $<v_1, v_3>$. Compared to individually solving each demand using internal paths $(v_0, v_3)$ and $(v_2, v_4)$ for demand $<v_0, v_4>$ as described above in connection with FIG. 7A and using internal paths $(v_0, v_3)$ and $(v_1, v_4)$ for demand $<v_1, v_3>$ as described above in connection with FIG. 7B, the method described above example process 800 reduces the number of internal paths required to satisfy both service demands $<v_0, v_4>$ and $<v_1, v_3>$. The internal path $(v_2, v_4)$ used to satisfy demand $<v_0, v_4>$ in FIG. 7A is eliminated when the service demands $<v_0, v_4>$ and $<v_1, v_3>$ are solved collectively using the method described above in the example process 800.

In step 850, the network management system 150 determines, for each of the plurality of service demands, a set of service paths based on the corresponding shortest path. For example, when there is a failure of two edges on the communications route cycle, the network management system 150 may determine candidate service paths to satisfy service demands $<v_0, v_4>$ and $<v_1, v_3>$ using the internal path $(v_1, v_4)$ or $(v_0, v_3)$ identified in step 840. In the case of edge failures, the network management system 150 may determine a set of service paths to satisfy the service demands using the identified internal paths according to the method described above in connection with FIG. 5.

Solving Type 2 Demands

Figure 11:
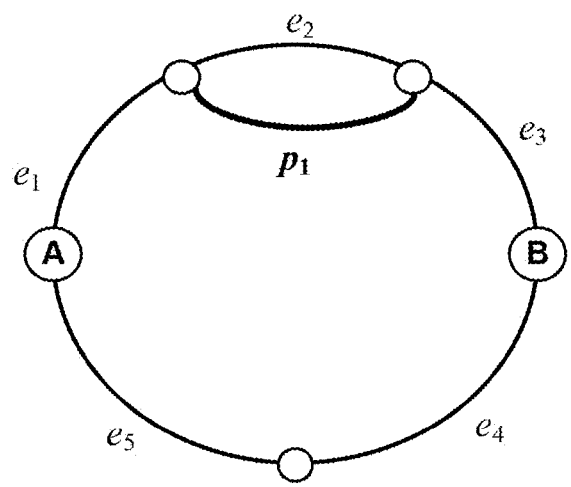
FIG. 11 is a diagram illustrating another example communications route cycle, in accordance with embodiments of the present disclosure.

A type 2 demand refers to a service demand that needs to be protected against failure of any two edges on a communications route cycle. Due to the sparsity of the network graph, there may be edge failure combinations against which there is no protection. For example, if two edges are removed from the network and would result in disconnection in the network communication graph, the service demand cannot be protected against the failure of these two edges. One or more internal paths may be added in the communications route cycle to protect the service demand in case of edge failures that do not result in disconnection of the network. Although adding internal paths may not protect all of the two edge failures, the additional internal paths can protect the two edges failures to the extent possible. FIG. 11 is a diagram illustrating an example communications route cycle 1100, in accordance with embodiments of the present disclosure. As shown in FIG. 11, the communications route cycle 1100 includes five edges {$e_1, \ldots, e_5$}. A type 2 service demand $<A, B>$ is to be satisfied in the data communication network. An internal path $p_1$ is added in the data communication network to protect the in cases of edge failures. By adding the internal path $p_1$, service demand $<A, B>$ can be protected against failures of multiple pairs of edges. For example, in case of a failure of edges $e_2$ and $e_5$, service demand $<A, B>$ can be satisfied through $e_1$, $p_1$, and $e_3$. As another example, in case of a failure of edges $e_2$ and $e_3$, service demand $<A, B>$ can be satisfied through $e_5$ and $e_4$. Thus, adding the internal path $p_1$ protects service demand $<A, B>$ against additional edge failures. On the other hand, adding one internal path $p_1$ does not protect service demand $<A, B>$ against any failure of a pair of edges. For example, in case of a failure of edges $e_1$ and $e_5$, service demand $<A, B>$ cannot be satisfied by the communications route cycle 1100. Adding more internal paths may protect the service demand $<A, B>$ against additional failure of two edges on the communications route cycle 1100.

In a data communication network, it is also desired to protect the service demand against edge failures with a minimal number of internal paths, so as to save network resources and operating cost. When there are multiple type 2 demands in the data communication network, it is desired to protect each of the service demands while using a minimal number of overall internal paths. The disclosed embodiments provide a method for determining a set of internal paths for satisfying the service demands in cases of failures of two edges. The service paths for satisfying the plurality of service demands are then determined based on the set of internal paths and the available edges on the communications route cycle communications route cycle.

Figure 12:
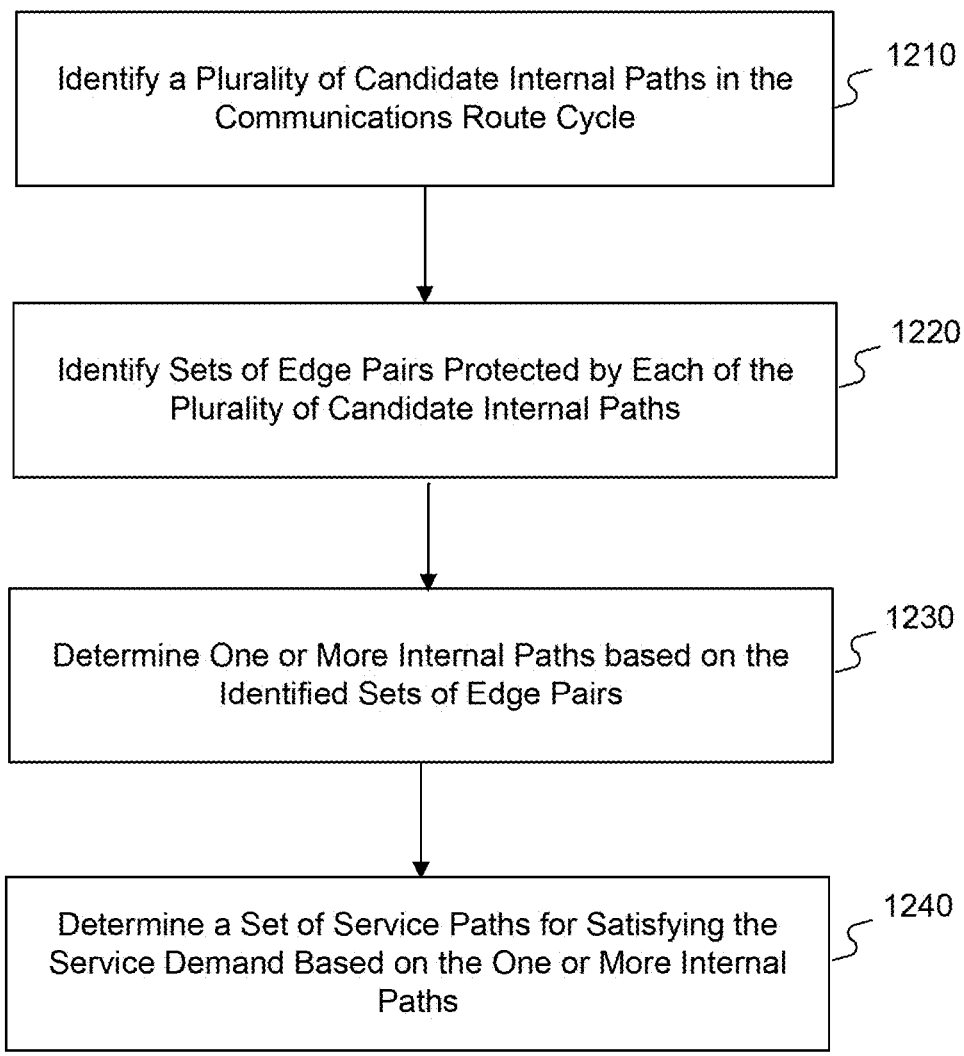
FIG. 12 is a flowchart of an example process for satisfying a service demand in a data communication network, consistent with the disclosed embodiments.

FIG. 12 is a flowchart of an example process 1200 for satisfying a service demand in a data communication network, in accordance with embodiments of the present disclosure. The steps associated with this example process may be performed by, for example, a processor of the network management system 150 of FIG. 1. The example process 1200 provides a set of service paths with a reduced number of internal paths in the communications route cycle while providing the same level of protection for the service demand in cases of edge failures in communications route cycle.

Figure 13A:
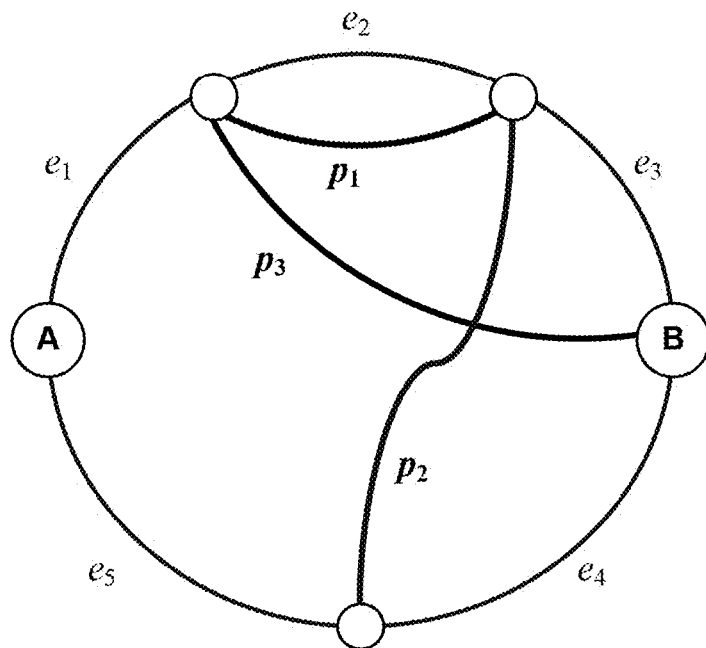
FIGS. 13A-13B are diagrams illustrating example communications route cycles, in accordance with embodiments of the present disclosure.

In step 1210, the network management system 150 identifies a plurality of candidate internal paths in the communications route cycle. Each of the plurality of candidate internal paths connects between two of the vertices in the communications route cycle, and each of the plurality of candidate internal paths is disjoint to the edges in the communications route cycle. For example, referring to the communications route cycle 1300a shown in FIG. 13A, the network management system 150 identifies candidate internal paths {$p_1, p_2, p_3$} in the communications route cycle, each of which connects between two of the vertices in the communications route cycle 1300a and is disjoint to the edges {$e_1, \ldots, e_5$} in the communications route cycle 1300a. As shown in FIG. 13A, there is a service demand <A, B> between vertex A to vertex B to be satisfied by the communications route cycle 1300a. The diagram depicted in FIG. 13A is an example only and is not intended to be limiting.

In step 1220, the network management system 150 identifies sets of edge pairs protected by each of the plurality of candidate internal paths. For example, the network management system 150 may identify one or more pairs of edges the failure of which is protected by the corresponding candidate internal path for the service demand. In cases of failure of these pairs of edges, the service demand can be satisfied by the candidate internal path and/or other edges on the communications route cycle.

Referring to FIG. 13A, candidate internal path $p_1$ protects the service demand <A, B> against failure of multiple pairs of edges, such as the pair $(e_2, e_4)$. In particular, when the pair of edges $(e_2, e_4)$ fail, service demand <A, B> can be satisfied by service path connecting through $e_1$, $p_1$, and $e_3$. Table 1 shows pairs of edges protected by each of the candidate internal paths $p_1$, $p_2$, $p_3$.

TABLE 1

Pairs of Protected Edges

| Candidate Internal Path | Protected Pairs of Edges |
| --- | --- |
| $p_1$ | $\{(e_2, e_4), (e_2, e_5), (e_1, e_2), (e_1, e_3), (e_2, e_3)\}$ |
| $p_2$ | $\{(e_1, e_4), (e_2, e_4), (e_3, e_5), (e_2, e_3), (e_1, e_2), (e_1, e_3), (e_5, e_4)\}$ |
| $p_3$ | $\{(e_2, e_4), (e_2, e_5), (e_3, e_5), (e_3, e_4), (e_1, e_2), (e_1, e_3), (e_2, e_3), (e_5, e_4)\}$ |

As shown in Table 1, candidate internal path $p_1$ protects the service demand <A, B> against failure of five different pairs of edges, candidate internal path $p_2$ protects the service demand <A, B> against failure of seven different pairs of edges, and candidate internal path $p_3$ protects the service demand <A, B> against failure of seven different pairs of edges. The pair of edges protected by candidate internal paths $p_1$, $p_2$, and $p_3$ can overlap. For example, candidate internal paths $p_1$, $p_2$, and $p_3$ each protect the edge pair $(e_2, e_4)$, $(e_1, e_3)$, $(e_1, e_2)$, and $(e_2, e_3)$. As another example, both candidate internal paths $p_1$ and $p_3$ protect the edge pair $(e_2, e_5)$, while candidate internal paths $p_2$ does not protect the edge pair $(e_2, e_5)$. The candidate internal paths $p_1$, $p_2$, and $p_3$ together can protect nine pairs of edges $\{(e_1, e_4), (e_2, e_4), (e_3, e_5), (e_2, e_3), (e_1, e_2), (e_1, e_3), (e_2, e_3), (e_2, e_5), (e_3, e_4)\}$, which is a union of the set of edge pairs protected by each candidate internal path.

Figure 13B:
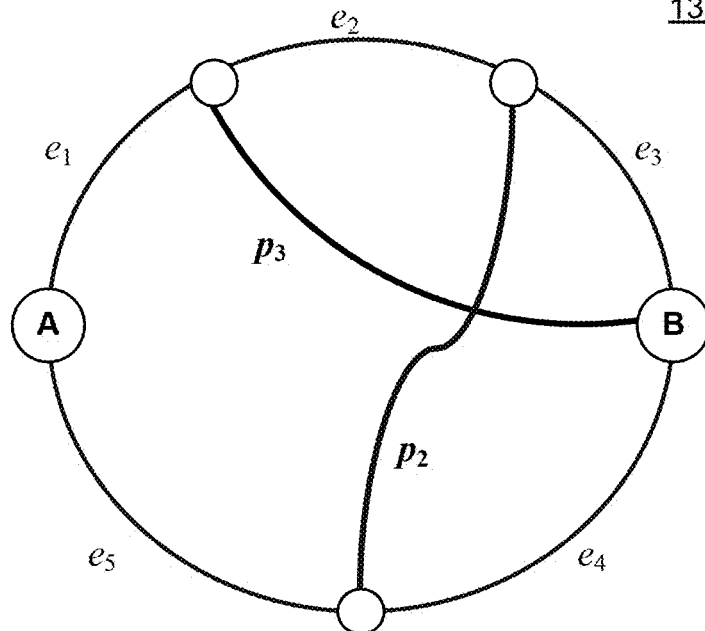

In step 1230, the network management system 150 determines one or more internal paths in the communications route cycle based on the identified sets of edge pairs. The goal is to determine a minimum number of internal paths that can protect the union of edge pairs protected by the candidate internal paths. For example, referring to the communications route cycle 1300a shown in FIG. 13A, internal paths $p_2$ and $p_3$ can protect the nine pairs of edges $\{(e_1, e_4), (e_2, e_4), (e_3, e_5), (e_2, e_3), (e_1, e_2), (e_1, e_3), (e_2, e_3), (e_2, e_5), (e_3, e_4)\}$ that are protected by all of the candidate internal paths $p_1$, $p_2$, and $p_3$. Thus, candidate internal paths $p_1$ is redundant and can be removed in the communications route cycle 1300a, because the same level of protection for the service demand <A, B> can be provided by internal paths $p_2$ and $p_3$. FIG. 13B shows the communications route cycle 1300b with the determined internal paths $p_2$ and $p_3$.

In some embodiments, the internal paths can be determined by using a set cover algorithm. The set cover algorithm may include, for example, a greedy algorithm or an integer linear programming. The set cover algorithm may identify a subset of candidate internal paths to cover all of the edge pairs that can be protected by all the candidate internal paths. For example, using a set cover algorithm on the sets of edge pairs protected by each of the candidate internal paths, a set cover that corresponds to the internal paths may be determined. The set cover covers all protected edge pairs by all the candidate internal paths. For example, referring to the communications route cycle 1300a shown in FIG. 13A, the set cover algorithm may identify a subset of candidate internal paths $\{p_1, p_2, \text{and } p_3\}$ that protect the nine pairs of edges $\{(e_1, e_4), (e_2, e_4), (e_3, e_5), (e_2, e_3), (e_1, e_2), (e_1, e_3), (e_2, e_3), (e_2, e_5), (e_3, e_4), (e_5, e_4)\}$ the candidate internal paths $\{p_1, p_2, \text{and } p_3\}$ jointly protect. In some implementations, the set cover algorithm may determine that internal paths $p_2$ and $p_3$ are sufficient to protect all the nine pairs of edges jointly protected by the candidate internal paths $\{p_1, p_2, \text{and } p_3\}$.

In step 1240, the network management system 150 determines a set of service paths for satisfying the service demand based on the one or more internal paths. For example, referring to the communications route cycle 1300b shown in FIG. 13B, the network management system 150 may determine the service paths for service demand <A, B> using the internal paths $p_2$ and $p_3$ and/or the edges $\{e_1, \ldots, e_5\}$ on the communications route cycle 1300b. The network management system 150 may determine four service paths for service demand <A, B>, including a first path connecting through $e_1$, $e_2$, $e_3$, a second path connecting through $e_1$, $p_3$, a third path connecting through $e_5$, $e_4$, and a fourth path connecting through $e_5$, $p_2$, $e_3$. When one or more edges on the communications route cycle fail to operate properly, the network management system 150 may use one of these four paths that does not involve the failed edges to satisfy the service demand <A, B>.

The example process 1200 provides a method for reducing the number of required internal paths to satisfy a service demand without sacrificing the protection given to the service demand in cases of edge failures. In some implementations, the set cover algorithm discussed in connection with process 1200 may not provide an optimal solution for the number of required internal paths to satisfy a service demand. The present disclosure provides another method for determining internal paths required to satisfy a service demand utilizing a Steiner tree.

Figure 14:
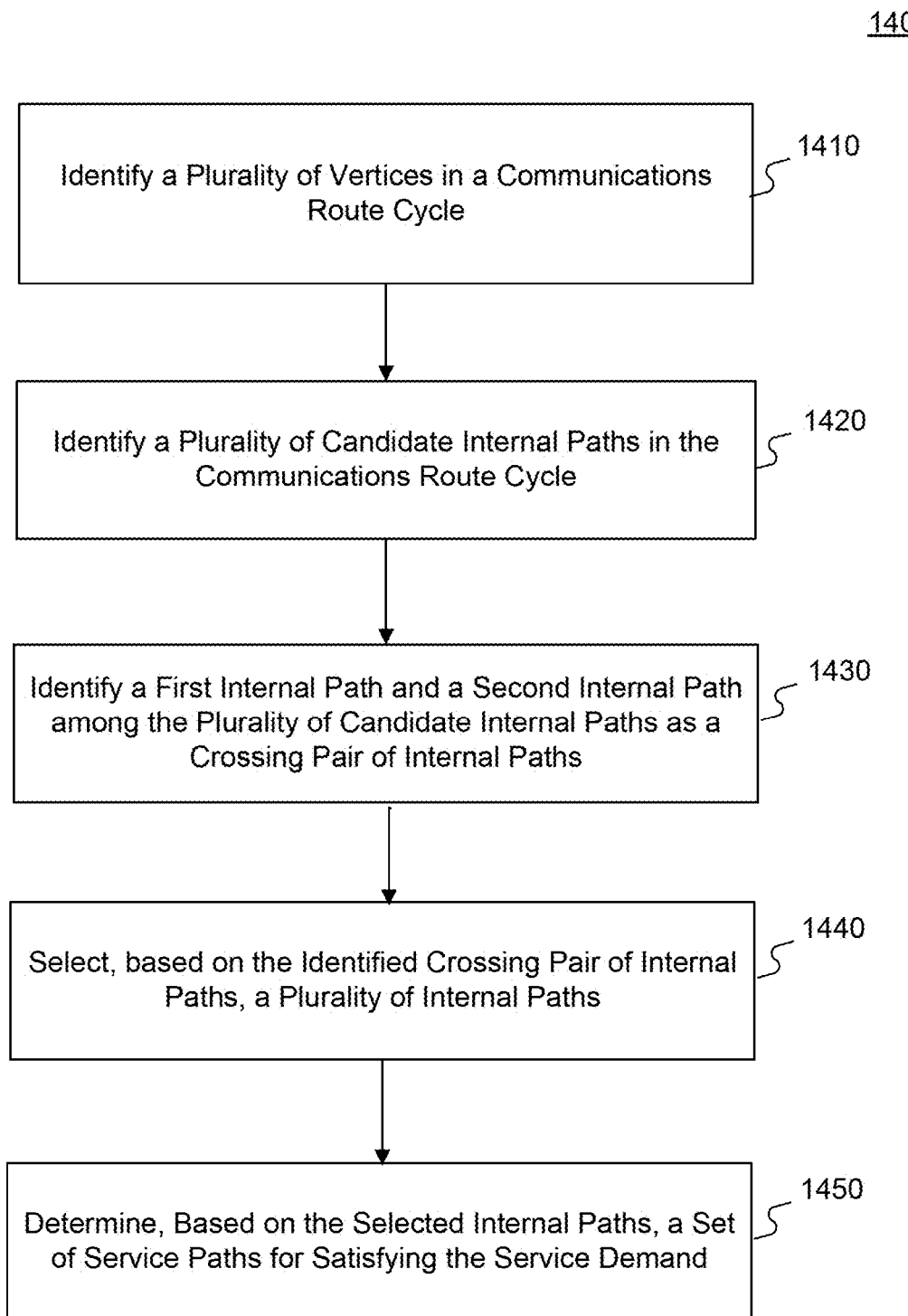
FIG. 14 is a flowchart of an example process 1400 for satisfying a service demand in a data communication network, in accordance with embodiments of the present disclosure.

FIG. 14 is a flowchart of an example process 1400 for satisfying a service demand in a data communication network, in accordance with embodiments of the present disclosure. The steps associated with this example process may be performed by, for example, a processor of the network management system 150 of FIG. 1. The example process 1400 provides a set of service paths with a reduced number of internal paths in the communications route cycle while providing the same level of protection for the service demand in cases of edge failures in communications route cycle.

In step 1410, the network management system 150 identifies a plurality of vertices in a communications route cycle. For example, referring to the communications route cycle 1500a shown in FIG. 15A, the network management system 150 identifies vertices $\{v_0, \ldots, v_9\}$ in the communications route cycle 1500a. The diagram depicted in FIG. 135A is an example only and is not intended to be limiting.

Figure 15A:
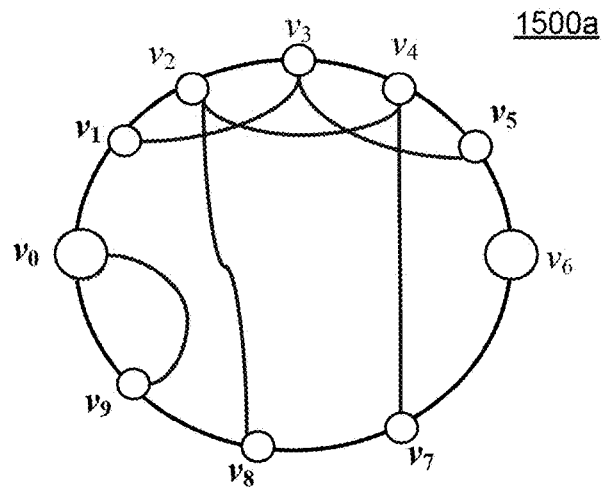
FIG. 15A is a diagram illustrating another example communications route cycle, consistent with the disclosed embodiments.

In step 1420, the network management system 150 identifies a plurality of candidate internal paths in the communications route cycle. Each of the plurality of candidate internal paths connects between two of the vertices in the communications route cycle, and each of the plurality of candidate internal paths is disjoint to the edges in the communications route cycle. For example, referring to the communications route cycle 1500a shown in FIG. 15A, the network management system 150 identifies candidate internal paths between vertices $(v_1, v_3)$, $(v_3, v_5)$, $(v_2, v_4)$, $(v_2, v_8)$, $(v_4, v_7)$, $(v_0, v_9)$ in the communications route cycle 1500a, each of which is disjoint to the edges in the communications route cycle 1500a. As shown in FIG. 15A, there is a service demand $<v_0, v_6>$ from vertex $v_0$ to vertex $v_6$ to be satisfied by the communications route cycle 1500a.

In step 1430, the network management system 150 identifies a first internal path and a second internal path among the plurality of candidate internal paths as a crossing pair of internal paths. The process of identifying a crossing pair of internal paths is described above in connection with FIG. 4. For example, referring to the communications route cycle 1500a shown in FIG. 15A, the network management system 150 identifies internal paths $\{(v_1, v_3), (v_2, v_4)\}$ are a crossing pair of internal paths in the communications route cycle. The communications route cycle may include a plurality of crossing pairs of internal paths. For example, the communications route cycle 1500a also includes crossing pairs of internal paths $\{(v_1, v_3), (v_2, v_8)\}$, $\{(v_2, v_4), (v_3, v_5)\}$, $\{(v_4, v_7), (v_3, v_5)\}$ in addition to the crossing pair $\{(v_0, v_3), (v_1, v_4)\}$. The vertices in the crossing pair of internal paths intersect from one another on the communications route cycle. For example, referring to the crossing pair $\{(v_1, v_3), (v_2, v_4)\}$ in the communications route cycle 1500a, the first internal path connects between vertices $(v_1, v_3)$, and the second internal path connects between vertices $(v_2, v_4)$. As shown in FIG. 15A, the communications route cycle 1500a alternates through a first vertex $v_1$ of the first internal path, a first vertex $v_2$ of the second internal path, a second vertex $v_3$ of the first internal path, and a second vertex $v_4$ of the second internal path in a sequence.

In step 1440, the network management system 150 selects, based on the identified crossing pair of internal paths, a plurality of internal paths for the service demand. In some embodiments, the network management system 150 may use a Steiner graph to select the internal paths for the service demand.

Figure 16:
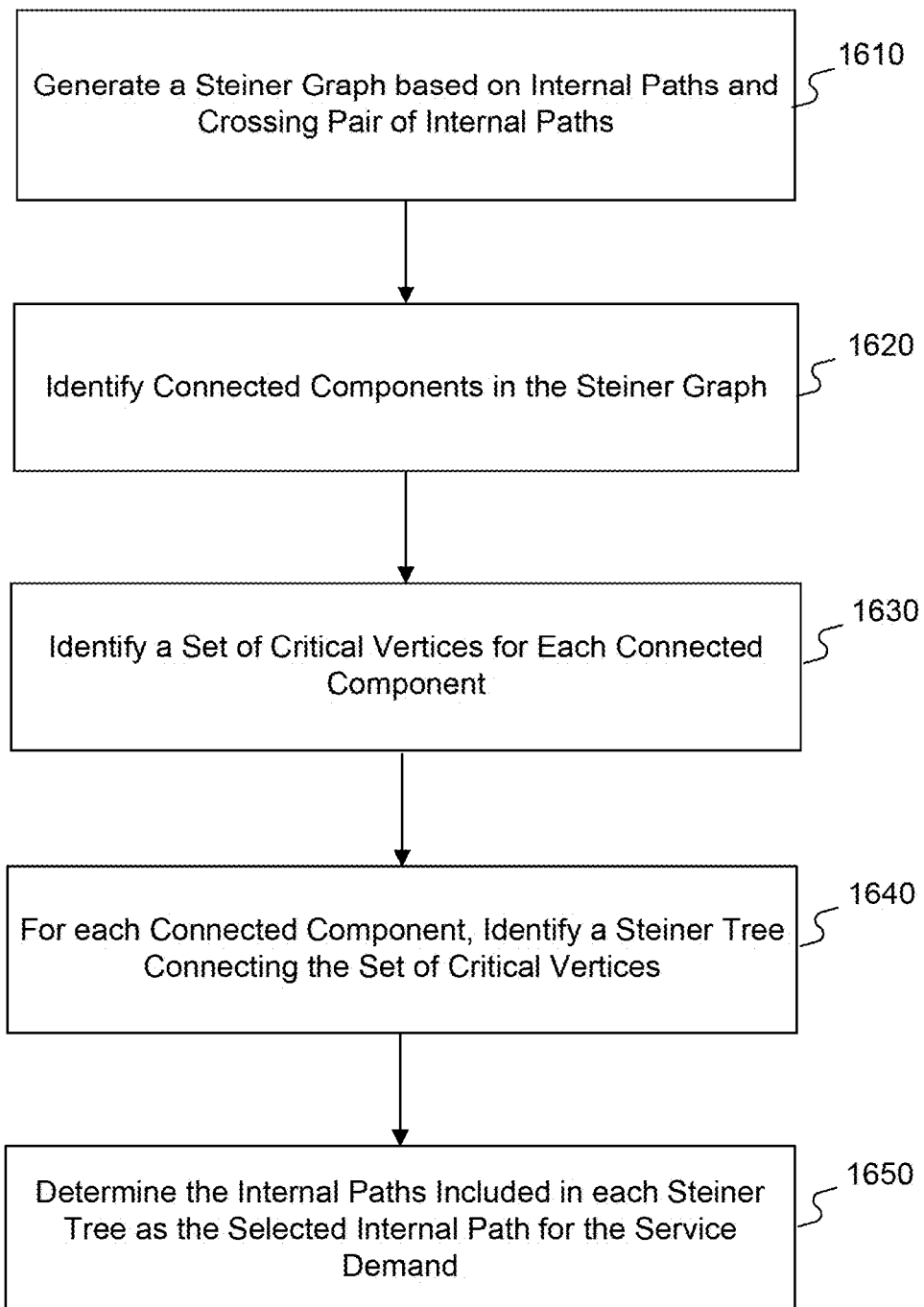
FIG. 16 is a flowchart of an example process for selecting a plurality of internal paths for satisfying a service demand in a data communication network, in accordance with embodiments of the present disclosure.

FIG. 16 is a flowchart of an example process 1600 for selecting a plurality of internal paths for satisfying a service demand in a data communication network, in accordance with embodiments of the present disclosure. The steps associated with this example process may be performed by, for example, a processor of the network management system 150 of FIG. 1. In some implementations, the example process 1600 may be implemented in step 1440 of the process 1400 described above in connection with FIG. 14.

Figure 15B:
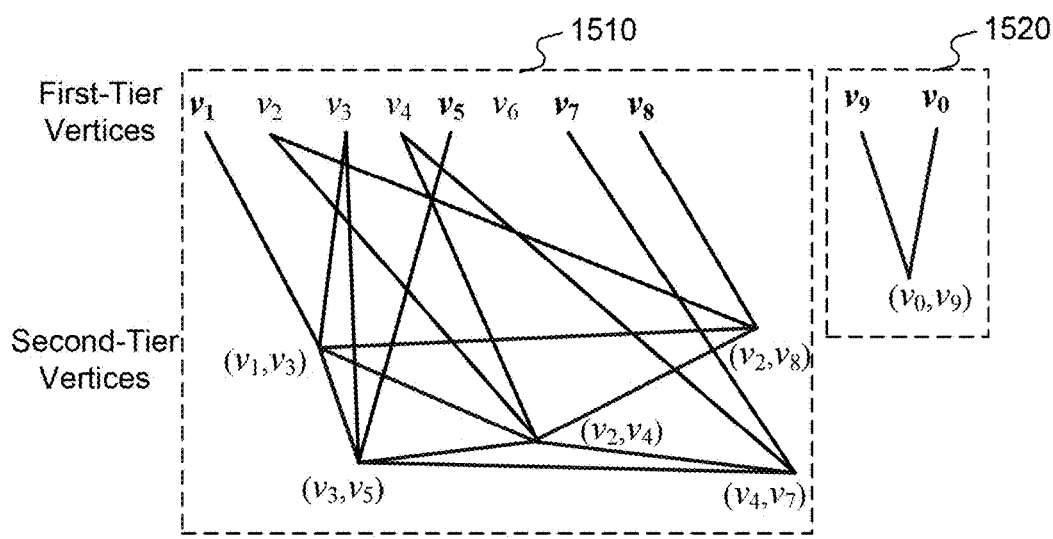
FIG. 15B is a diagram illustrating another Steiner Graph, consistent with the disclosed embodiments.

In step 1610, the network management system 150 generates a Steiner graph based on internal paths and crossing pairs of internal paths in the communications route cycle. The process of generating a Steiner graph is described above in connection with FIG. 5. FIG. 15B is a diagram illustrating an example Steiner graph 1500b corresponding to the communications route cycle 1500a, in accordance with embodiments of the present disclosure. As shown in FIG. 15B, the Steiner graph 1500b includes a first tier of vertices $\{v_0, \ldots, v_9\}$ that correspond to vertices $\{v_0, \ldots, v_9\}$ on the communications route cycle 300a. The Steiner graph 1500b further includes a second tier of vertices $\{(v_1, v_3), (v_3, v_5), (v_2, v_4), (v_2, v_8), (v_4, v_7), (v_0, v_9)\}$ that correspond to internal paths $\{(v_1, v_3), (v_3, v_5), (v_2, v_4), (v_2, v_8), (v_4, v_7), (v_0, v_9)\}$ on the communications route cycle 1500a.

As shown in FIG. 15B, the Steiner graph 1500b further includes edges connecting between the edges. The network management system 150 may create a first set of edges connecting the second-tier vertex that corresponds to an internal path with the first-tier vertices corresponding to end points of the internal path. For example, as shown in FIG. 15B, for vertex $(v_1, v_3)$ that corresponds to internal path $(v_1, v_3)$, an edge between vertex $v_1$ and vertex $(v_1, v_3)$ is created and another edge between vertex $v_3$ and vertex $(v_1, v_3)$ is created on the Steiner graph. Similar edges are created in the Steiner graph for the other internal paths $(v_3, v_5)$, $(v_2, v_4)$, $(v_2, v_8)$, $(v_4, v_7)$, $(v_0, v_9)$.

As shown in FIG. 15B, the Steiner graph 1500b further includes a second set of edges connecting the second-tier vertices if a common node is shared by the corresponding internal paths. For example, as shown in FIG. 15B, an edge between the second-tier vertices $(v_1, v_3)$ and $(v_3, v_5)$ is created on the Steiner graph as they share a common node $v_3$. Similarly, an edge between the second-tier vertices $(v_2, v_4)$ and $(v_2, v_8)$ is created on the Steiner graph as they share a common node $v_2$, and an edge between the second-tier vertices $(v_2, v_4)$ and $(v_4, v_7)$ is created on the Steiner graph as they share a common node $v_4$.

The Steiner graph may further include a third set of edges connecting the second-tier vertices if the corresponding internal paths are a crossing pair of internal paths. For example, as discussed above, the internal paths $\{(v_1, v_3), (v_2, v_4)\}$, $\{(v_1, v_3), (v_2, v_8)\}$, $\{(v_2, v_4), (v_3, v_5)\}$, $\{(v_4, v_7), (v_3, v_5)\}$ are crossing pairs of internal paths in the communications route cycle 300a. Thus, as shown in FIG. 15B, an edge between the second-tier vertices $(v_1, v_3)$ and $(v_2, v_4)$, an edge between the second-tier vertices $(v_1, v_3)$ and $(v_2, v_8)$, an edge between the second-tier vertices $(v_2, v_4)$ and $(v_3, v_5)$, and an edge between the second-tier vertices $(v_4, v_7)$ and $(v_3, v_5)$ are created on the Steiner graph 1500b. The Steiner graph for the communications route cycle 1500a is thereby completed.

In step 1620, the network management system 150 identifies one or more connected components in the Steiner graph. In this disclosure, a connected component refers to two or more connected edges in a Steiner graph. For example, referring to the Steiner graph 1500b shown in FIG. 15B, the Steiner graph 1500b includes two connected components 1510 and 1520, where connected component 1510 includes the edges connecting through vertices $\{v_1, v_2, v_3, v_4, v_5, v_6, v_7, v_8\}$, and connected component 1520 includes the edges connecting through vertices $\{v_9, v_0\}$.

In step 1630, the network management system determines a set of critical vertices for each connected component. The set of critical vertices may include two, three, or four vertices, each of which is an end point of an internal path of the communications route cycle. To identify the critical vertices, the network management system 150 identifies, among vertices included in the corresponding connected component, the closest vertices to end points of the service demand from two opposing sides of the communications route cycle. For example, for connected component 1510 shown in FIG. 15B, it includes eight vertices $\{v_1, v_2, v_3, v_4, v_5, v_6, v_7, v_8\}$ on the communications route cycle 1500a. Among these eight vertices, on the upper half of the communications route cycle connecting between end points of the service demand $<v_0, v_6>$, vertex $v_1$ is the closest to the first end point $v_0$, and vertex $v_5$ is the closest to the second end point $v_6$ of the service demand $<v_0, v_6>$. On the lower half of the communications route cycle connecting between end points of the service demand $<v_0, v_6>$, vertex $v_8$ is the closest to the first end point $v_0$, and vertex $v_7$ is the closest to the second end point $v_6$ of the service demand $<v_0, v_6>$. Thus, the network management system 150 may identify vertices $\{v_1, v_5, v_7, v_8\}$ as a set of critical vertices for the connected component 1510. The connected component 1520 includes two vertices $\{v_9, v_0\}$, and on the upper half of the communications route cycle connecting between end points of the service demand $<v_0, v_6>$, vertex $v_0$ is the closest to the first end point $v_0$, and is also the closest to the second end point $v_6$ of the service demand $<v_0, v_6>$. On the lower half of the communications route cycle connecting between end points of the service demand $<v_0, v_6>$, vertex $v_0$ is the closest to the first end point $v_0$, and vertex $v_9$ is the closest to the second end point $v_6$ of the service demand $<v_0, v_6>$. Thus, the network management system 150 may identify vertices $\{v_0, v_9\}$ as a set of critical vertices for the connected component 1520.

Figure 17A:
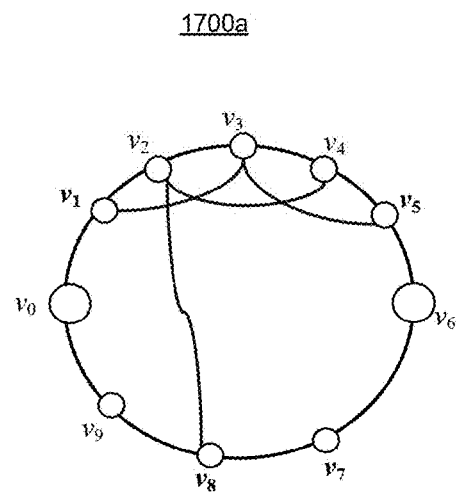
FIG. 17A is a diagram illustrating another example communications route cycle, consistent with the disclosed embodiments.
Figure 17B:
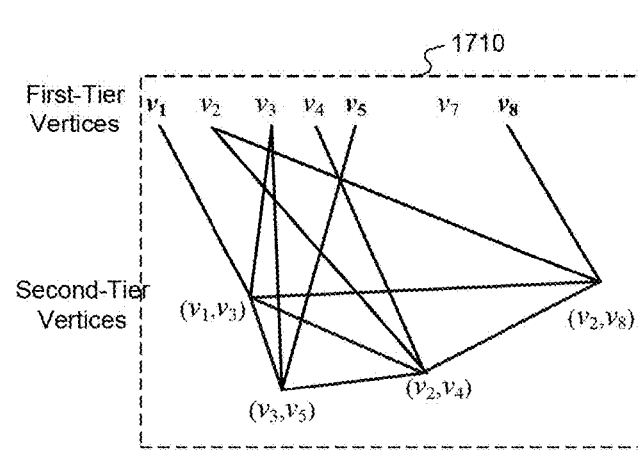
FIG. 17B is a diagram illustrating another Steiner Graph, consistent with the disclosed embodiments.

FIG. 17A illustrates another diagram of an example communications route cycle 1700a. FIG. 17B illustrates the Steiner graph 1700b corresponding to the communications route cycle 1700a, in accordance with embodiments of the present disclosure. As shown in FIG. 17B, the Steiner graph 1700b includes one connected component 1710 which includes seven vertices $\{v_1, v_2, v_3, v_4, v_5, v_6, v_8\}$ on the communications route cycle 1700a. Among these seven vertices, on the upper half of the communications route cycle connecting between end points of the service demand $<v_0, v_6>$, vertex $v_1$ is the closest to the first end point $v_0$, and vertex $v_5$ is the closest to the second end point $v_6$ of the service demand $<v_0, v_6>$. On the lower half of the communications route cycle connecting between end points of the service demand $<v_0, v_6>$, vertex $v_8$ is the closest to the first end point $v_0$, and vertex $v_8$ is the closest to the second end point $v_6$ of the service demand $<v_0, v_6>$. Thus, the network management system 150 may identify vertices $\{v_1, v_5, v_8\}$ as a set of critical vertices for the connected component 1710.

Figure 15C:
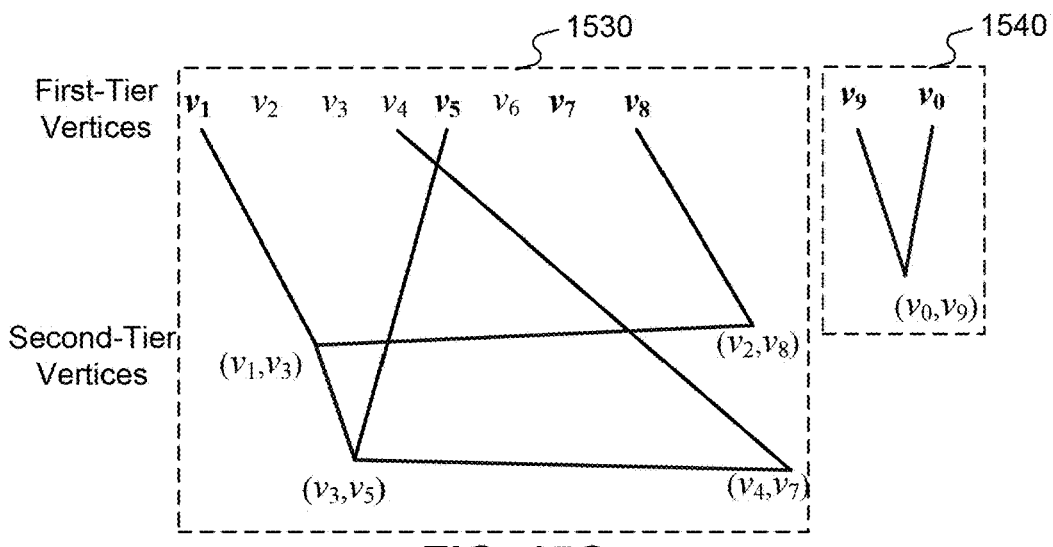
FIG. 15C is a diagram illustrating Steiner trees, consistent with the disclosed embodiments.

Referring back to FIG. 16, in step 1640, the network management system 150 identifies, for each connected component, a Steiner tree connecting the corresponding critical vertices in the Steiner graph. FIG. 15C is a diagram illustrating example Steiner trees for the Steiner graph 1500b, in accordance with embodiments of the present disclosure. As discussed above, the critical vertices for the connected component 1510 are vertices $\{v_1, v_5, v_7, v_8\}$. The Steiner tree 1530 connecting the critical vertices $\{v_1, v_5, v_7, v_8\}$ is shown in FIG. 15C. For the connected component 1520, the critical vertices are vertices $\{v_0, v_9\}$, and the Steiner tree 1540 connecting the critical vertices $\{v_0, v_9\}$ is shown in FIG. 15C. Given a Steiner graph and a set of terminal vertices, a minimum cost Steiner tree can be found heuristically between the terminal vertices, and thus the details of how to find a Steiner tree are not provided in this disclosure. Further, other methods to find a minimum cost Steiner tree can be used to identify the shortest path in the Steiner graph connecting the critical vertices for each connected component.

In step 1650, the network management system 150 determines the internal paths included in each Steiner tree as the selected internal paths for the service demand. For example, referring to the Steiner tree 1530 shown in FIG. 15C, the internal paths $(v_1, v_3)$, $(v_2, v_8)$, $(v_3, v_5)$, $(v_4, v_7)$ are included in the Steiner tree. For the Steiner tree 1540 shown in FIG. 15C, the internal path $(v_0, v_9)$ is included in the Steiner tree. Thus, the network management system 150 determines that the internal paths $\{(v_1, v_3), (v_2, v_8), (v_3, v_5), (v_4, v_7), (v_0, v_9)\}$ as the selected internal path for the service demand $<v_0, v_6>$. It can be seen that the internal path $(v_2, v_4)$ is omitted from the selected internal path for the service demand $<v_0, v_6>$, because the set of internal paths $\{(v_1, v_3), (v_2, v_8), (v_3, v_5), (v_4, v_7), (v_0, v_9)\}$ protects the same level of protection against edge failures as if the internal path $(v_2, v_4)$ is added to the set of selected internal path.

Referring back to FIG. 14, in step 1450, the network management system 150 determines a set of service paths for satisfying the service demand for cases of two edges failures based on the selected internal paths. Referring to FIG. 15C, based on the set of internal paths $\{(v_1, v_3), (v_2, v_8), (v_3, v_5), (v_4, v_7), (v_0, v_9)\}$, the network management system 150 determines a set of service paths for satisfying the service demand $<v_0, v_6>$, in addition to the first path on the communication cycle going through vertices $(v_0, v_1, v_2, v_3, v_4, v_5, v_6)$ and the second path on the communication cycle going through vertices $(v_0, v_9, v_8, v_7, v_6)$. For example, the network management system 150 may determine a service path going through vertices $(v_0, v_9, v_8, v_2, v_3, v_4, v_5, v_6$ for the service demand $<v_0, v_6>$ in case that a failure of the edge $e_1$ connecting between $(v_0, v_1)$ and $e_2$ connecting between $(v_8, v_7)$ occurs in the communications route cycle 1500a. Continuing the example, the network management system 150 may further determine a service path going through vertices $(v_0, v_1, v_3, v_4, v_5, v_6)$ for the service demand $<v_0, v_6>$ in case that a failure of the edge connecting between $(v_1, v_2)$ and the edge connecting between $(v_7, v_6)$ occurs in the communications route cycle 1500a. In some embodiments, this process can be performed for all pairs of edges failure that can be protected.

In a data communication network, there may be a large number of service demands to be satisfied. It may be required to provide service paths to satisfy the service demands, and in the meantime, it is desired to reduce the number of internal paths to satisfy the service demands to the extent possible. The disclosed embodiments thus provide a method for traffic grooming, where a set of internal paths are determined for multiple service demands collectively.

Figure 18:
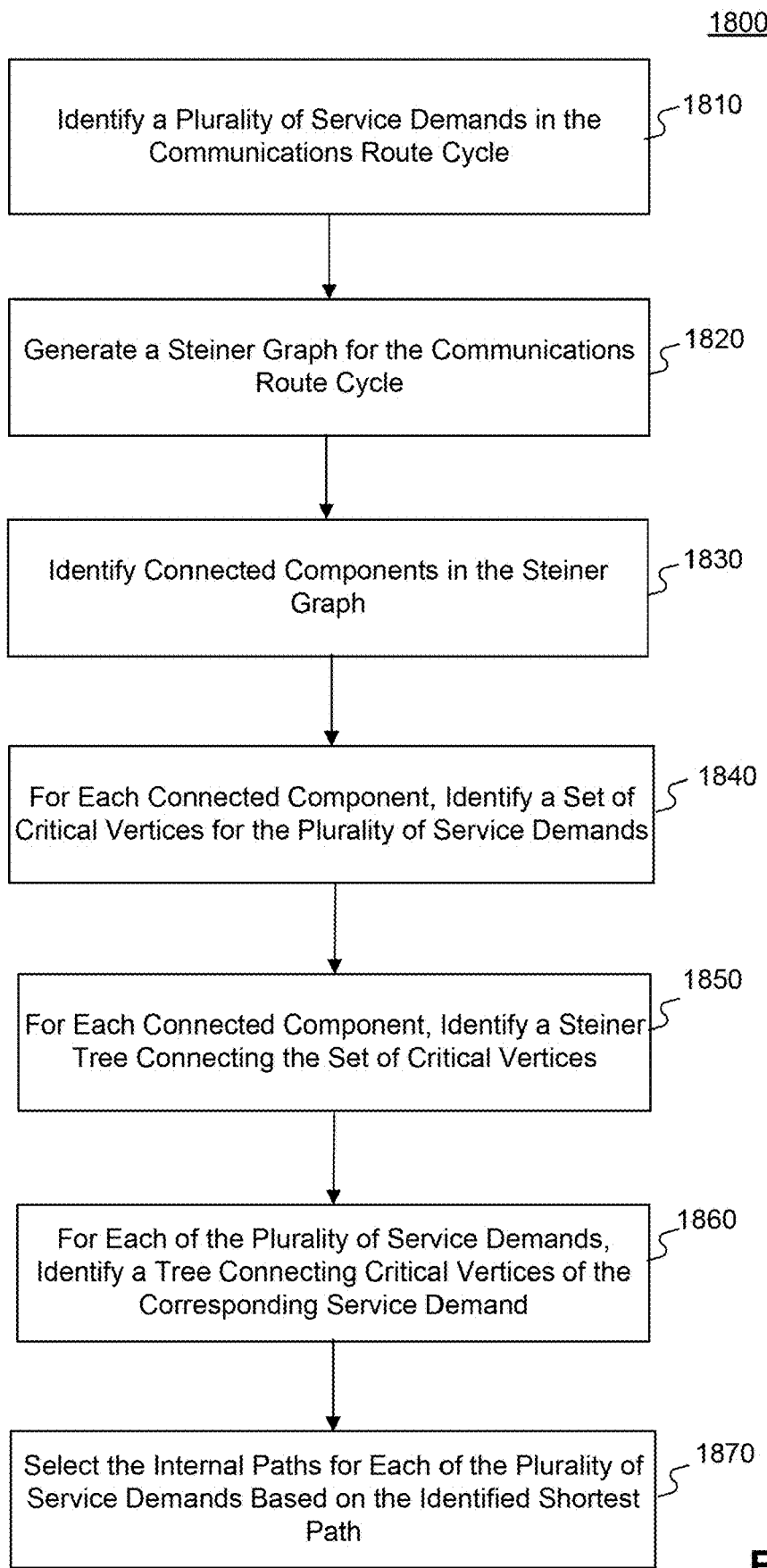
FIG. 18 is a flowchart of an example process for satisfying a plurality of service demands in a data communication network, in accordance with embodiments of the present disclosure.

FIG. 18 is a flowchart of an example process 1800 for satisfying a plurality of service demands in a data communication network, in accordance with embodiments of the present disclosure. The steps associated with this example process may be performed by, for example, a processor of the network management system 150 of FIG. 1. The example process 1800 provides a method to determine a set of internal paths for multiple service demands collectively.

Figure 19A:
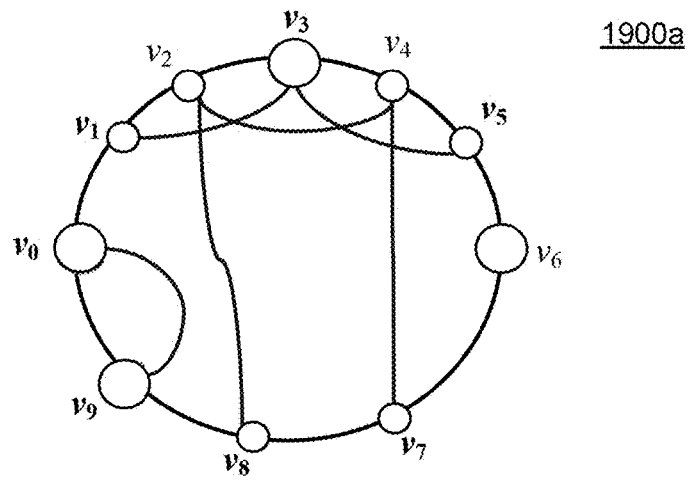
FIGS. 19A-19C are examples of communications route cycles, a Steiner graph, and Steiner trees, consistent with the disclosed embodiments.

In step 1810, the network management system 150 identifies a plurality of service demands in the communications route cycle. For example, referring to the communications route cycle 1900a shown in FIG. 19A, the network management system 150 identifies multiple service demands, such as $<v_0, v_6>$ and $<v_3, v_9>$, for the communications route cycle.

Figure 19B:
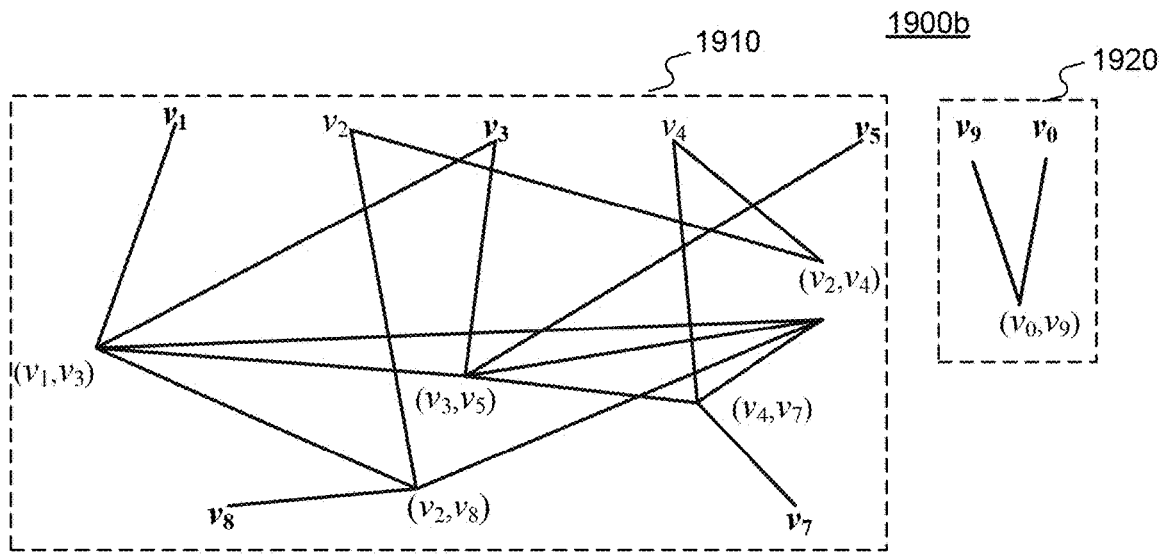

In step 1820, the network management system 150 generates a Steiner graph for the communications route cycle. For example, the network management system 150 may identify the internal paths and crossing pairs of internal paths in the communications route cycle and generate a Steiner graph based on the internal paths and crossing pairs of internal paths. The network management system 150 may generate a Steiner graph according to the method described above in connection with FIGS. 5 and 6. FIG. 19B is a diagram illustrating an example Steiner graph 1900b corresponding to the communications route cycle 1900a, in accordance with embodiments of the present disclosure.

In step 1830, the network management system 150 identifies one or more connected components in the Steiner graph. For example, referring to the Steiner graph 1900b shown in FIG. 19B, the Steiner graph 1900b includes two connected components 1910 and 1920, where connected component 1910 includes the edges connecting through vertices $\{v_1, v_2, v_3, v_4, v_5, v_6, v_7, v_8\}$, and connected component 1920 includes the edges connecting through vertices $\{v_9, v_0\}$.

In step 1840, the network management system 150 identifies, for each connected component in the Steiner graph, a set of critical vertices for the plurality of service demands. For each connected component in the Steiner graph, the network management system 150 may identify the critical vertices for each service demand and determine a set of critical vertices that includes the critical vertices for each service demand. For example, when there are service demands $<v_0, v_6>$ and $<v_3, v_9>$ in the communications route cycle 1900a, for connected component 1910, the network management system 150 may identify vertices $\{v_1, v_5, v_7, v_8\}$ as the critical vertices for service demand $<v_0, v_6>$ and vertices $\{v_1, v_3, v_8\}$ as the critical vertices for service demand $<v_3, v_9>$. The process for determining the critical vertices for a service demand is described above in connection with FIG. 16. The network management system 150 may then determine the set of critical vertices for both service demands as $\{v_1, v_3, v_5, v_7, v_8\}$, which includes the critical vertices for each service demand $<v_0, v_6>$ and $<v_3, v_9>$. For connected component 1920, the network management system 150 may identify vertices $\{v_9, v_0\}$ as the critical vertices for both service demand $<v_0, v_6>$ and service demand $<v_3, v_9>$.

Figure 19C:
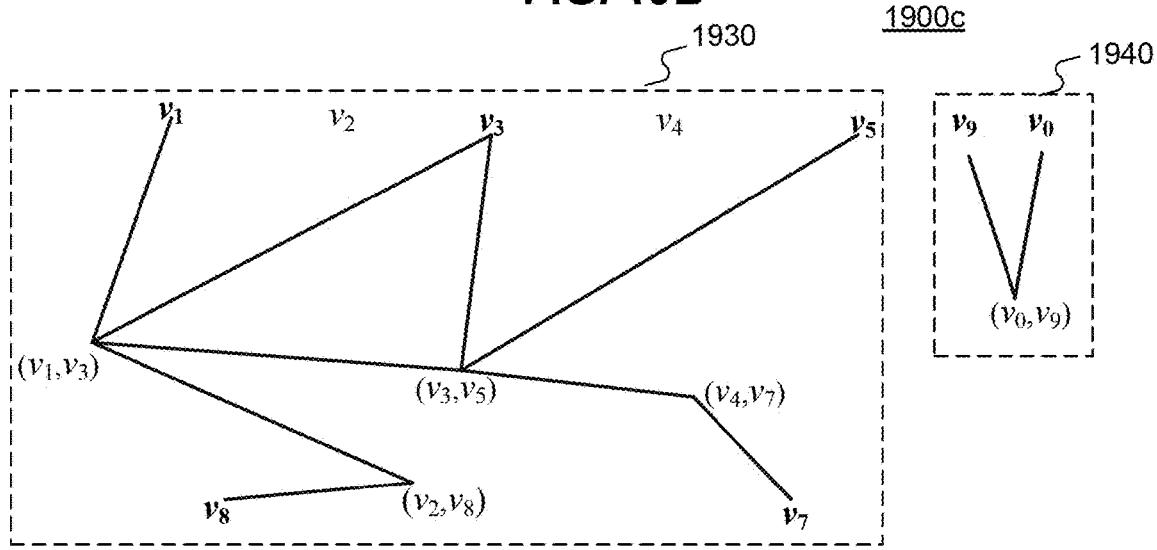

In step 1850, the network management system 150 identifies, for each connected component, a Steiner tree connecting the corresponding set of critical vertices in the Steiner graph. FIG. 19C is a diagram illustrating example Steiner trees for the Steiner graph 1900b, in accordance with embodiments of the present disclosure. As discussed above, the critical vertices for the connected component 1910 are vertices $\{v_1, v_3, v_5, v_7, v_8\}$. The Steiner tree 1930 connecting the critical vertices $\{v_1, v_3, v_5, v_7, v_8\}$ is shown in FIG. 19C. For the connected component 1920, the critical vertices are vertices $\{v_0, v_9\}$, and the Steiner tree 1940 connecting the critical vertices $\{v_0, v_9\}$ is shown in FIG. 19C.

Figure 20A:
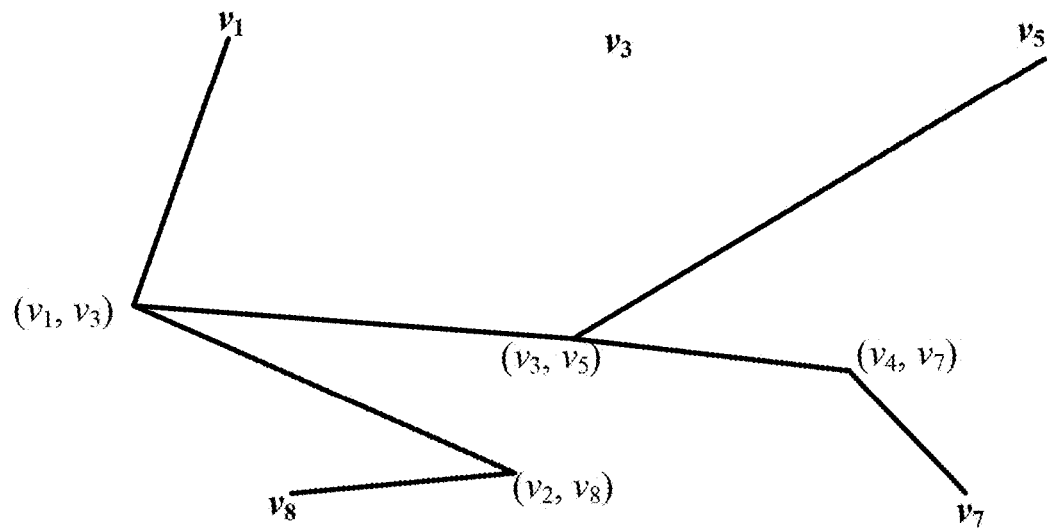
FIG. 20A is an example diagram illustrating a Steiner tree over a Steiner graph, in accordance with embodiments of the present disclosure.
Figure 20B:
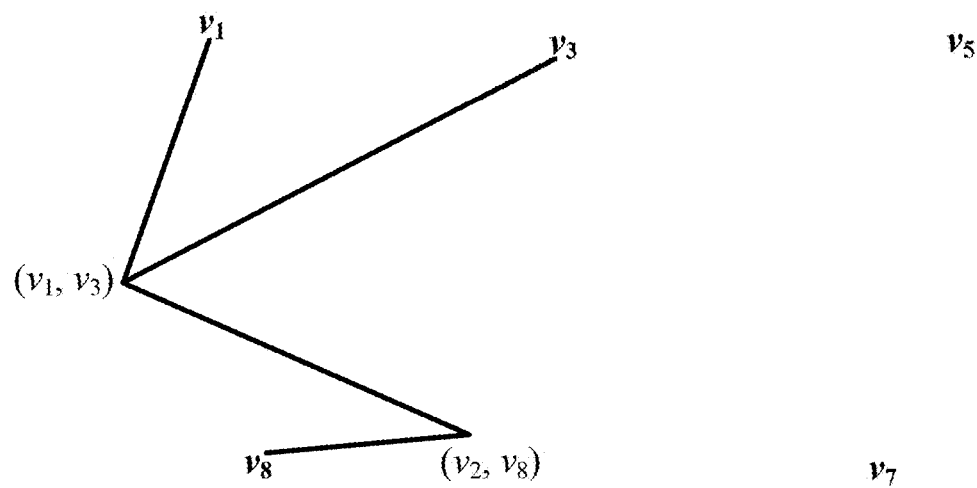
FIG. 20B is an example diagram illustrating a Steiner tree over a Steiner graph, in accordance with embodiments of the present disclosure.

In step 1860, the network management system 150 identifies, for each of the plurality of service demands, a tree connecting critical vertices of the corresponding service demand based on the Steiner tree. The network management system 150 may find for each service demand a tree connecting the critical points of the service demand, on the Steiner tree. For example, referring to the Steiner tree 1930 shown in FIG. 19C, the network management system 150 may determine a shortest path connecting critical vertices $\{v_1, v_5, v_7, v_8\}$ for service demand $<v_0, v_6>$ on the Steiner tree. FIG. 20A is a diagram illustrating an example tree 2000a for critical vertices $\{v_1, v_5, v_7, v_8\}$ on the Steiner tree. FIG. 20B is a diagram illustrating an example tree 2000b for service demand $<v_3, v_9>$ on the Steiner tree. In this example, the network management system 150 may identify the shortest path connecting critical vertices $\{v_1, v_3, v_8\}$ for service demand $<v_3, v_9>$ on the Steiner tree.

In step 1860, the network management system 150 selects the internal path for each of the plurality of service demands based on the identified shortest path. For example, referring to the shortest path 2000a shown in FIG. 20A for service demand $<v_0, v_6>$, the internal paths $(v_1, v_3), (v_2, v_8), (v_3, v_5), (v_4, v_7)$ are included in the shortest path, and the network management system 150 may select these internal paths for service demand $<v_0, v_6>$. The network management system 150 may then use the selected internal paths $(v_1, v_3), (v_2, v_8), (v_3, v_5), (v_4, v_7)$ with the edges of the communications route cycle to satisfy the service demands $<v_0, v_6>$. For the shortest path 2000b shown in FIG. 20B for service demand $<v_3, v_9>$, the internal paths $(v_1, v_3), (v_2, v_8)$ are included in the shortest path, and the network management system 150 may select these internal paths for service demand $<v_3, v_9>$. The network management system 150 may then use the selected internal paths $(v_1, v_3), (v_2, v_8)$ with the edges of the communications route cycle to satisfy the service demands $<v_3, v_9>$.

The example process 1800 provides a method to identify a Steiner tree for multiple service demands collectively and select the internal paths for each service demand based on the Steiner tree. As a result, the total internal paths used to satisfy the multiple service demands may be reduced compared to selecting the internal paths for each service demand independently.

Solving Type 1++ Demands

In a data communication network, there may be various types of service demands requiring different levels of protection against network link failure. For example, one type of service demand is called the 1++ demand, where the 1++ demand requires two disjoint paths between end points of a service demand, and for a failure of any edge on the two disjoint paths, an alternate pair of disjoint paths that exclude the failed edge and include an undamaged path, should be available to satisfy the demand.

Figure 21A:
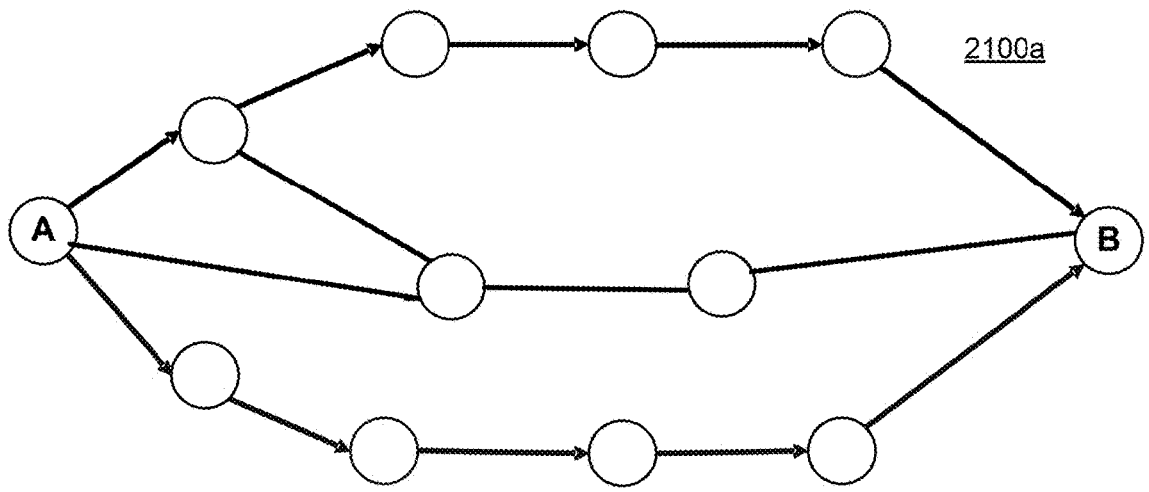
FIGS. 21A-21C are diagrams illustrating example communications route cycles, in accordance with embodiments of the present disclosure.
Figure 21B:
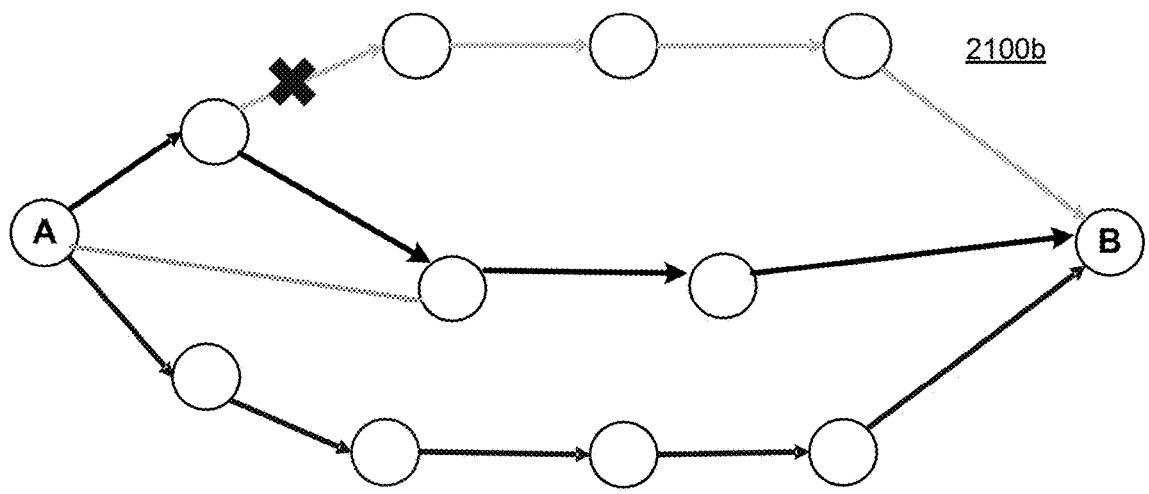
Figure 21C:
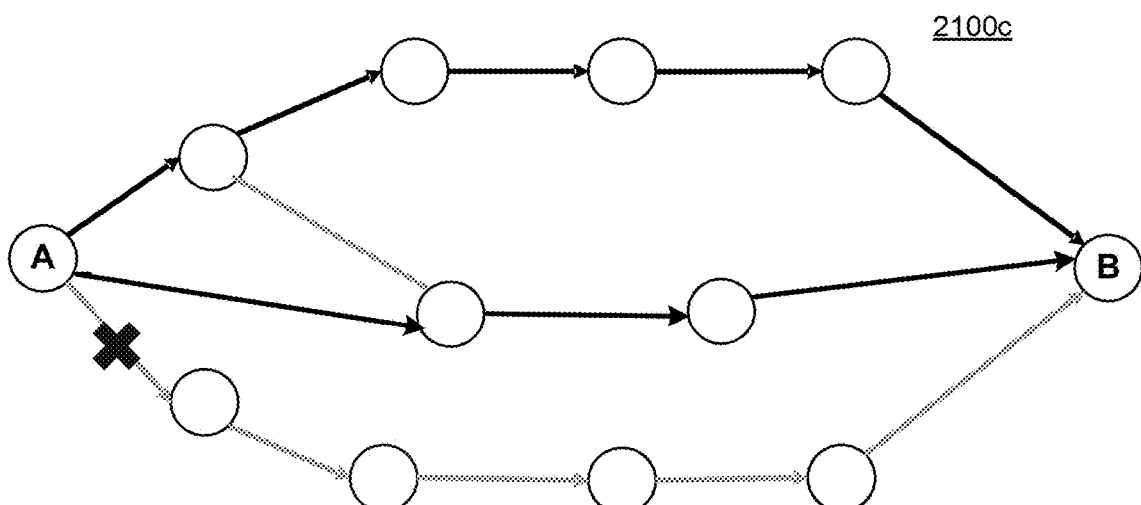

FIG. 21A is a diagram illustrating an example communications route cycle 2100a, in accordance with embodiments of the present disclosure. As shown in FIG. 21A, the communications route cycle 2100a includes a plurality of edges and internal paths to satisfy the type 1++ service demand <A, B>. Two disjoint paths are available to satisfy the service demand <A, B>. For example, as shown in the black arrowed lines in FIG. 21A, the top part of the communications route cycle connecting between vertices A and B provide a first service path, and the lower part of the communications route cycle connecting between vertices A and B provide a second service path that is disjoint to the first service path. FIG. 21B is a diagram illustrating an example communications route cycle 2100b, in accordance with embodiments of the present disclosure. As shown in FIG. 21B, there is an edge failure in the communications route cycle 2100b. In this circumstance, the top part of the communications route cycle connecting between vertices A and B involves a failed edge and would not operate to satisfy the service demand <A, B>. Nonetheless, there still exist two disjoint paths to satisfy the type 1++ service demand <A, B>. The alternate disjoint paths are denoted in black arrowed lines in FIG. 21B. FIG. 21C is a diagram illustrating an example communications route cycle 2100c, in accordance with embodiments of the present disclosure. As shown in FIG. 21C, there is an edge failure in the communications route cycle 2100c. In this circumstance, the lower part of the communications route cycle connecting between vertices A and B involves a failed edge and would not operate to satisfy the service demand <A, B>. Nonetheless, there still exist two disjoint paths to satisfy the type 1++ service demand <A, B>. The alternate disjoint paths are denoted in black arrowed lines in FIG. 21C.

Figure 22:
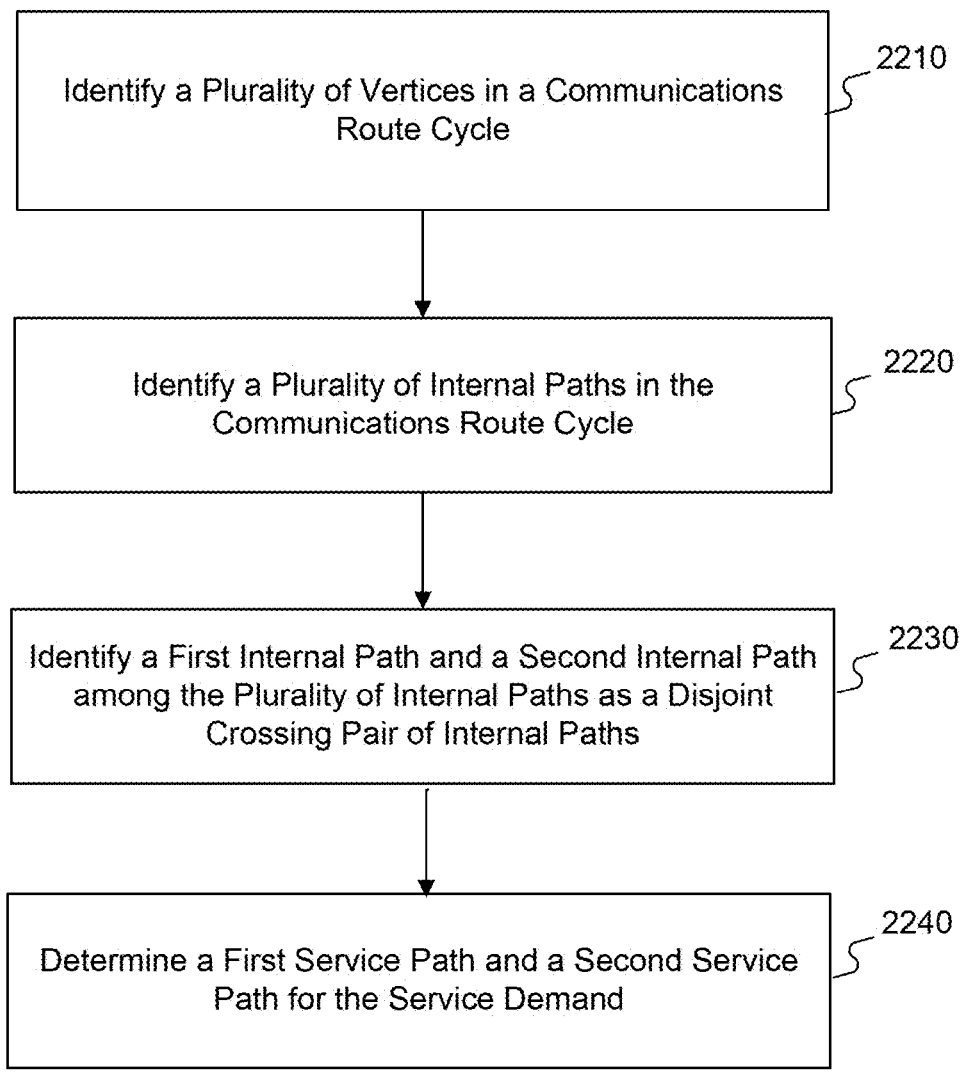
FIG. 22 is a flowchart of an example process for satisfying a service demand in a data communication network, in accordance with embodiments of the present disclosure.

FIG. 22 is a flowchart of an example process 2200 for satisfying a service demand in a data communication network, in accordance with embodiments of the present disclosure. The steps associated with this example process may be performed by, for example, a processor of the network management system 150 of FIG. 1. The example process 2200 provides a pair of disjoint service paths, one of which includes an undamaged path to satisfy the service demand in case of an edge failure.

Figure 23A:
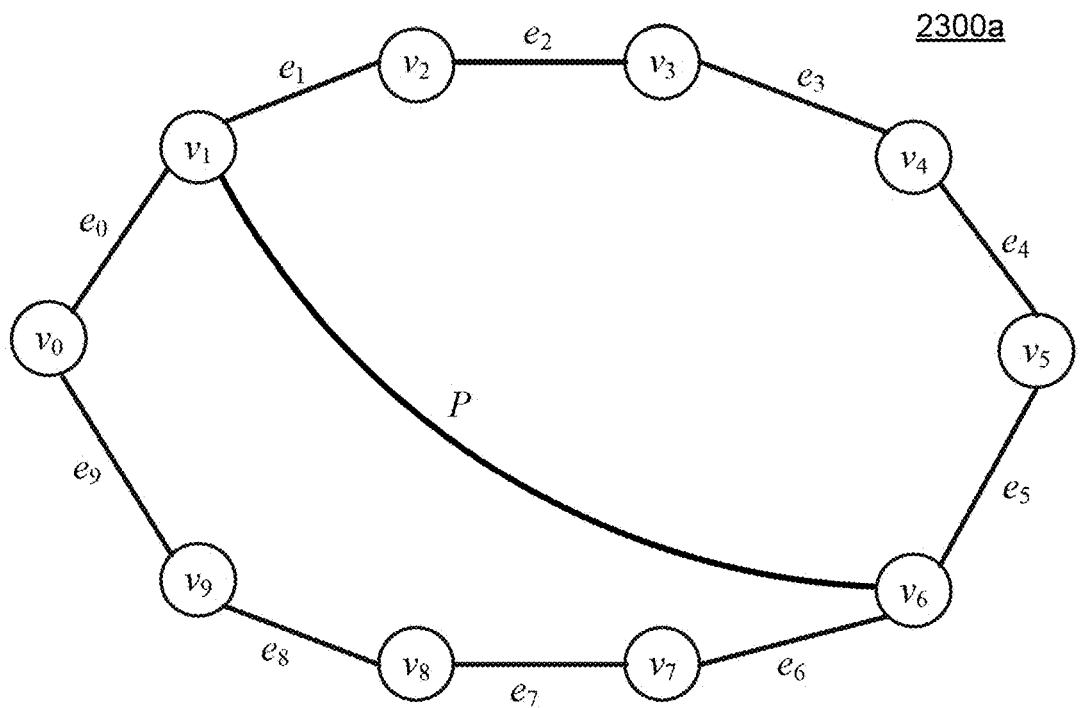
FIGS. 23A-23B are diagrams illustrating example communications route cycles, in accordance with embodiments of the present disclosure.
Figure 23B:
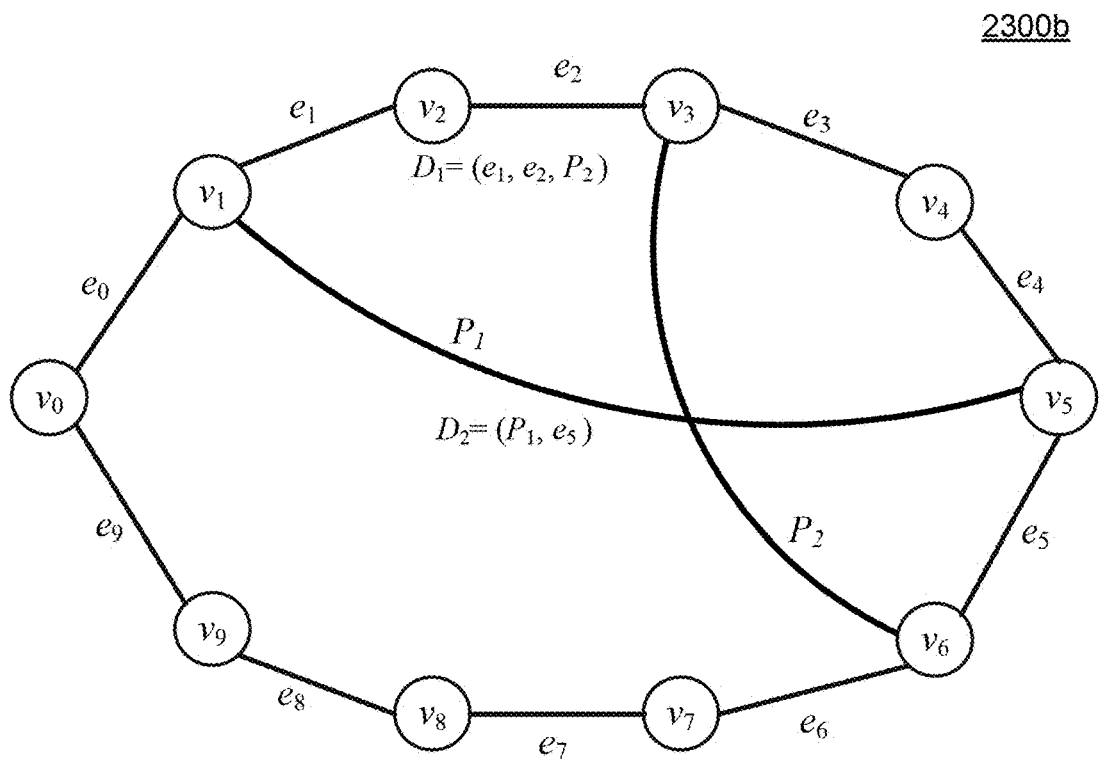

In step 2210, the network management system 150 identifies a plurality of vertices in a communications route cycle. For example, referring to the communications route cycle 2300a shown in FIG. 23A, the network management system 150 identifies ten vertices $\{v_0, \ldots, v_9\}$ in the communications route cycle 2300a. As another example, referring to the communications route cycle 2300b shown in FIG. 23B, the network management system 150 identifies ten vertices $\{v_0, \ldots, v_9\}$ in the communications route cycle 2300b. The diagrams depicted in FIGS. 23A and 23B are examples only and are not intended to be limiting.

In step 2220, the network management system 150 identifies a plurality of internal paths in the communications route cycle. Each of the plurality of internal paths connects between two of the vertices in the communications route cycle, and each of the plurality of candidate internal paths is disjoint to the edges in the communications route cycle. For example, referring to the communications route cycle 2300b shown in FIG. 23B, the network management system 150 identifies internal paths $P_1$ and $P_2$ between vertices $(v_1, v_5)$ and $(v_3, v_6)$ respectively, each of which is disjoint to the edges in the communications route cycle 2300b.

In step 2230, the network management system 150 identifies a first internal path and a second internal path among the plurality of internal paths as a disjoint crossing pair of internal paths. The process of identifying a crossing pair of internal paths is described above in connection with FIG. 4. For example, referring to the communications route cycle 2300b shown in FIG. 23B, the network management system 150 identifies internal paths $P_1$ and $P_2$ between vertices $(v_1, v_5)$ and $(v_3, v_6)$ are a disjoint crossing pair of internal paths in the communications route cycle.

In some embodiments, the network management system 150 may determine whether the vertices of the crossing pair of internal paths include the end points of a service demand. For example, referring to the communications route cycle 2300b shown in FIG. 23B, the network management system 150 may identify a service demand $<v_1, v_6>$ in the communications route cycle. The network management system 150 may further determine that the vertices of the crossing pair internal paths $P_1$ and $P_2$ include the end points of the service demand $<v_1, v_6>$, i.e., vertices $v_1$ and $v_6$, as $P_1$ connects between $v_1$ and $v_5$, and $P_2$ connects between $v_3$ and $v_6$.

In step 2240, the network management system 150 determines a first service path and a second service path for the service demand. In some embodiments, the network management system 150 may determine the first service path and second service path for the service demand based on the communications route cycle and the identified crossing pair of internal paths. For example, referring to the communications route cycle 2300b shown in FIG. 23B, the network management system 150 may determine a first service path and a second service path for the service demand $<v_1, v_6>$ based on the communications route cycle 2300b and the identified disjoint crossing pair of internal paths $P_1$ and $P_2$, including a first path $D_1$ going through edges $e_1, e_2, P_2$, and a disjoint second path $D_2$ going through edges $P_1, e_5$. The first path $D_1$ and the second path $D_2$ do not share any edges.

In some embodiments, the network management system 150 may detect a failure of an edge in the communications route cycle and determine an alternate pair of disjoint paths to satisfy the service demand, that exclude the failed edge. For example, referring to the communications route cycle 2300b shown in FIG. 23B, the network management system 150 may detect an edge failure of $e_1$ between vertices $v_1$ and $v_2$. With the failure of the edge $e_1$, the pair of disjoint paths $D_1$ and $D_2$ do not satisfy the service demand $<v_1, v_6>$ anymore. The network management system 150 may determine an alternate pair of service paths for the service demand $<v_1, v_6>$. For example, with the failure of the edge $e_1$ between vertices $v_1$ and $v_2$, the network management system 150 may determine an alternate first path $A_1$ going through $e_0, e_9, e_8, e_7, e_6$ on the communications route cycle 2300b, and a disjoint second undamaged path $D_2$ going through edges $P_1, e_5$ on the communications route cycle 2300b. The alternate paths $A_1$ and $D_2$ satisfy the service demand $<v_1, v_6>$ in case of failure of $e_1$. Continuing the example, the network management system 150 may detect an edge failure of $e_5$ between vertices $v_6$ and $v_5$. With the failure of the edge $e_5$, the pair of disjoint paths $D_1$ and $D_2$ do not satisfy the service demand $<v_1, v_6>$ anymore. The network management system 150 may determine an alternate pair of service paths for the service demand $<v_1, v_6>$. For example, with the failure of the edge $e_5$ between vertices $v_5$ and $v_6$, the network management system 150 may determine an alternate first path $A_1$ going through $e_0, e_9, e_8, e_7, e_6$ on the communications route cycle 2300b, and a disjoint alternate second undamaged path $D_1$ going through edges $e_1, e_2, P_2$. The alternate paths $A_1$ and $D_1$ satisfy the service demand $<v_1, v_6>$ in case of failure of $e_5$.

In some embodiments, the network management system 150 may determine that the type 1++ service demand can be satisfied if there exists a disjoint crossing pair of internal paths with vertices corresponding to end points of the service demand. For example, referring to the communications route cycle 2300b shown in FIG. 23B, the network management system 150 may determine that the type 1++ service demand $<v_1, v_6>$ can be satisfied because the vertices of the crossing pair of internal paths $P_1$ and $P_2$ include the vertices of end points $v_1$ and $v_6$ of the service demand $<v_1, v_6>$.

In some embodiments, the network management system 150 may determine that the type 1++ service demand can be satisfied if there exists a direct internal path connecting end points of the service demand. For example, referring to the communications route cycle 2300a shown in FIG. 23A, the network management system 150 may determine that the type 1++ service demand $<v_1, v_6>$ can be satisfied because the internal path P connecting between the end points $v_1$ and $v_6$ of the service demand $<v_1, v_6>$. For example, referring to the communications route cycle 2300a shown in FIG. 23A, there are two disjoint paths on the communications route cycle that satisfy the service demand $<v_1, v_6>$, including a first path $C_1$ going through edges $e_1, e_2, e_3, e_4, e_5$ on one side of communications route cycle 2300a, and a disjoint second path $C_2$ going through edges $e_0, e_9, e_8, e_7, e_6$ on the other side of communications route cycle 2300a. When an edge failure of $e_3$ between vertices $v_3$ and $v_4$ occurs, the pair of disjoint paths $C_1$ and $C_2$ do not satisfy the service demand $<v_1, v_6>$ anymore. The network management system 150 may determine an alternate pair of service paths for the service demand $<v_1, v_6>$. For example, with the failure of the edge $e_3$ between vertices $v_3$ and $v_4$, the network management system 150 may determine an alternate first path $A_1$ going through the internal path P on the communications route cycle 2300a, and a disjoint undamaged second path $C_2$ going through edges $e_0, e_9, e_8, e_7, e_6$ on the communications route cycle 2300a. The alternate paths $A_1$ and $C_2$ satisfy the service demand $<v_1, v_6>$ in case of failure of $e_3$. As another example, the network management system 150 may detect an edge failure of $e_9$ between vertices $v_0$ and $v_9$. With the failure of the edge $e_9$, the pair of disjoint paths $C_1$ and $C_2$ do not satisfy the service demand $<v_1, v_6>$ anymore. The network management system 150 may determine an alternate pair of service paths for the service demand $<v_1, v_6>$. For example, with the failure of the edge $e_9$ between vertices $v_0$ and $v_9$, the network management system 150 may determine a first undamaged path $C_1$ going through edges $e_1$, $e_2$, $e_3$, $e_4$, $e_5$ on the communications route cycle 2300a, and a disjoint alternate second path $A_2$ going through the internal path P on the communications route cycle 2300a. The alternate paths $C_1$ and $A_2$ satisfy the service demand $<v_1, v_6>$ in case of failure of $e_9$.

In a data communication network, there may be a large number of type 1++ service demands to be satisfied. It may be required to provide service paths to satisfy the type 1++ service demands, and in the meantime, it is desired to reduce the number of internal paths used to satisfy the service demands to the extent possible. The disclosed embodiments provide a method for traffic grooming, where a set of internal paths are determined for multiple type 1++ service demands collectively.

Figure 24:
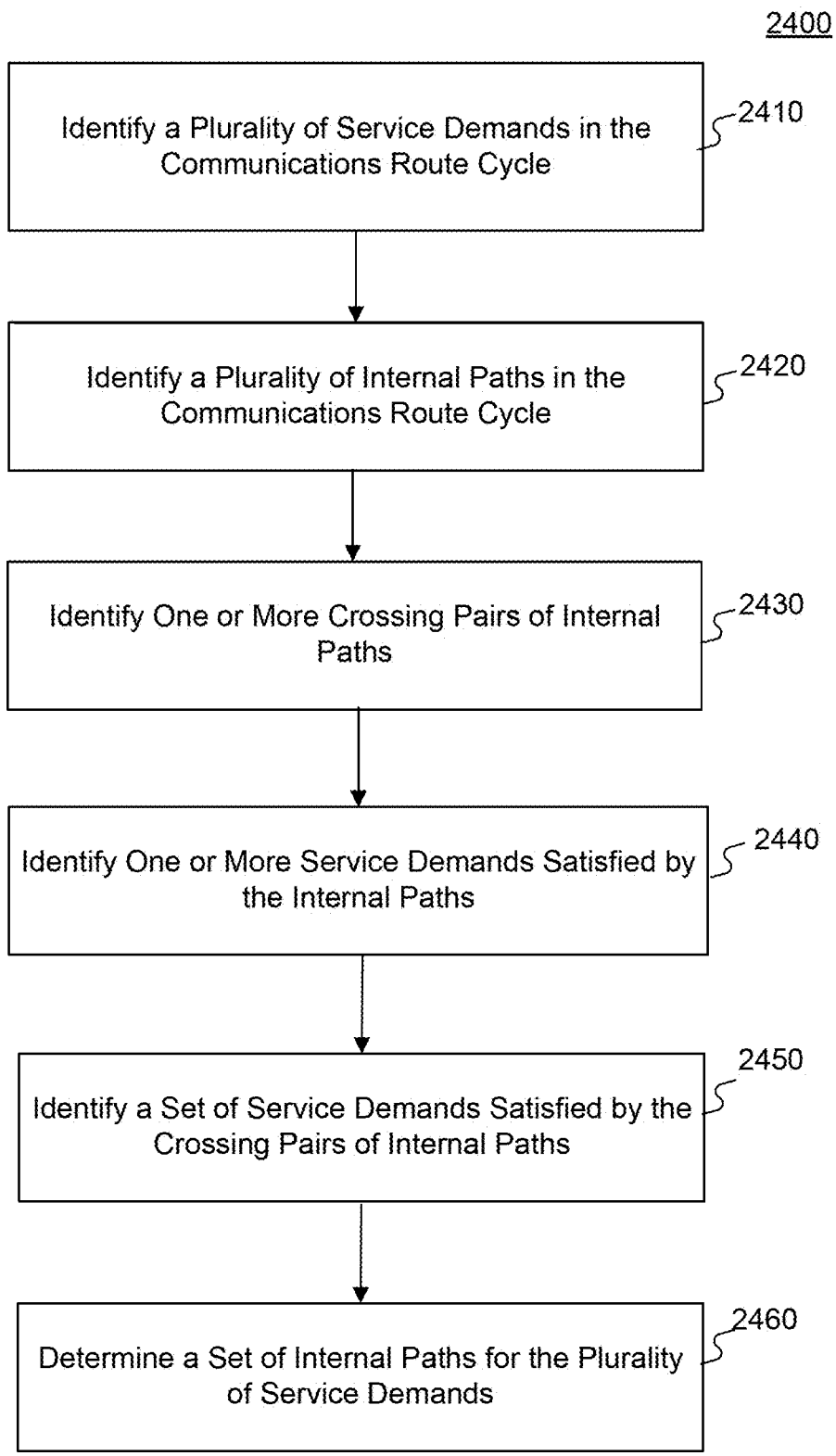
FIG. 24 is a flowchart of an example process for satisfying a plurality of service demands in a data communication network, in accordance with embodiments of the present disclosure.

FIG. 24 is a flowchart of an example process 2400 for satisfying a plurality of service demands in a data communication network, in accordance with embodiments of the present disclosure. The steps associated with this example process may be performed by, for example, a processor of the network management system 150 of FIG. 1. The example process 2400 provides a method to determine a set of internal paths for multiple type 1++ service demands collectively.

In step 2410, the network management system 150 identifies a plurality of service demands in the communications route cycle. For example, referring to the communications route cycle 2500 shown in FIG. 25, the network management system 150 identifies multiple service demands, such as <A, B>, <C, D>, and <A, C>, for the communications route cycle 2500.

Figure 25:
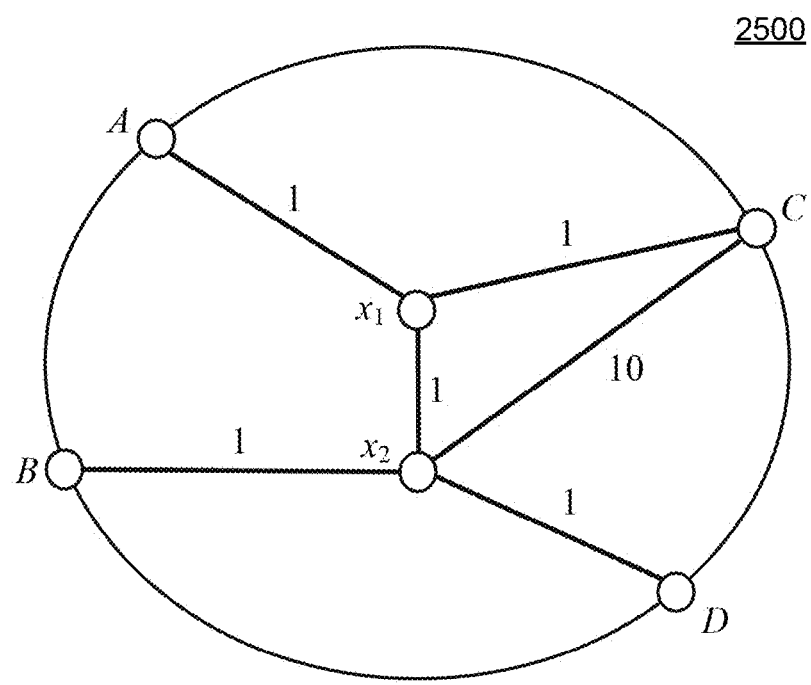
FIG. 25 is a diagram illustrating another example communications route cycle, consistent with the disclosed embodiments.

In step 2420, the network management system 150 identifies a plurality of internal paths in the communications route cycle. Each of the plurality of internal paths connects between two of the vertices in the communications route cycle, and each of the plurality of candidate internal paths is disjoint to the edges in the communications route cycle. For example, referring to the communications route cycle 2500 shown in FIG. 25, the network management system 150 identifies nine internal paths $(A, x_1, C)$, $(A, x_1, x_2, B)$, $(A, x_1, x_2, D)$, $(C, x_2, B)$, $(B, x_2, D)$, $(A, x_1, x_2, C)$, $(C, x_1, x_2, B)$, $(C, x_2, D)$, and $(C, x_1, x_2, D)$, in the communications route cycle, each of which connects between two of the vertices in the communications route cycle 2500 and is disjoint to the edges in the communications route cycle 2500. Each internal path is associated with a cost metric indicating the communication cost of the corresponding path. As shown in FIG. 25, the edge connecting $(A, x_1)$, $(x_1, x_2)$, $(x_2, B)$, $(C, x_1)$, and $(x_2, D)$ each is associated with a cost metric of 1, and the edge connecting $(C, x_2)$ is associated with a cost metric of 10. Table 2 provides the cost metrics for each internal path in the communications route cycle 2500.

TABLE 2

Cost Metrics of Internal Paths

| Internal Path | Cost Metric |
| --- | --- |
| $(A, x_1, C)$ | 2 |
| $(A, x_1, x_2, B)$ | 3 |
| $(A, x_1, x_2, D)$ | 3 |
| $(C, x_2, B)$ | 11 |
| $(B, x_2, D)$ | 2 |
| $(A, x_1, x_2, C)$ | 12 |
| $(C, x_1, x_2, B)$ | 3 |
| $(C, x_2, D)$ | 11 |
| $(C, x_1, x_2, D)$ | 3 |

In step 2430, the network management system 150 identifies one or more crossing pairs of disjoint internal paths in the communications route cycle. The process of identifying a crossing pair of internal paths is described above in connection with FIG. 4. For example, referring to the communications route cycle 2500 shown in FIG. 25, the network management system 150 identifies internal paths $(A, x_1, x_2, D)$ and $(C, x_2, B)$ are the one crossing pair of disjoint internal paths in the communications route cycle 2500.

In step 2440, the network management system 150 identifies one or more service demands satisfied by the internal paths. The network management system 150 may determine that a service demand is satisfied by an internal path if the internal path directly connects between the end points of the service demand. For example, referring to the communications route cycle 2500 shown in FIG. 25, there are service demands <A, B>, <C, D>, and <A, C> for the communications route cycle 2500. The network management system 150 identifies that service demand <A, C> is satisfied by the internal paths $(A, x_1, C)$ and $(A, x_1, x_2, C)$, service demand <A, B> is satisfied by the internal path $(A, x_1, x_2, B)$, and service demand <C, D> is satisfied by the internal paths $(C, x_1, x_2, D)$ and $(C, x_2, D)$. In this example, no service demand is satisfied by the internal paths $(A, x_1, x_2, D)$, $(C, x_2, B)$, $(C, x_1, x_2, B)$, and $(B, x_2, D)$ because these internal paths do not directly connect end points of one of the service demands <A, B>, <C, D>, and <A, C> in the communications route cycle.

In step 2450, the network management system identifies a set of service demands satisfied by the one or more crossing pairs of disjoint internal paths. The network management system 150 may determine that a service demand is satisfied by a crossing pair of internal paths if vertices of the crossing pair of internal paths include the end points of the service demand. For example, referring to the communications route cycle 2500 shown in FIG. 25, there is one crossing pair of disjoint internal paths $(A, x_1, x_2, D)$ and $(C, x_2, B)$. The network management system 150 identifies that service demands <A, B>, <C, D>, and <A, C> are satisfied by the crossing pair of internal paths $(A, x_1, x_2, D)$ and $(C, x_2, B)$, because end vertices of the internal paths $(A, x_1, x_2, D)$ and $(C, x_2, B)$ include the end points of these service demands.

In step 2460, the network management system 150 determines a set of internal paths for the plurality of service demands. In some embodiments, may use a set cover algorithm, such as a red-blue set cover algorithm, to determine the set of internal paths for the service demands. For example, the internal paths and crossing pair of internal paths may correspond to the red elements in the set cover algorithm, and the demands satisfied by the internal paths and crossing pair of internal paths may correspond to the blue elements in the set cover algorithm. The set cover algorithm determines a minimum number of internal paths to cover all the service demands that can be covered by all the internal paths and crossing pair of internal paths.

For example, referring to the communications route cycle 2500 shown in FIG. 25, there are service demands <A, B>, <C, D>, and <A, C> for the communications route cycle 2500. Table 3 below shows the red and blue elements in a red-blue set cover algorithm. It can be seen that the red elements correspond to the internal paths or crossing pair of internal paths in the communications route cycle 2500, and the blue elements correspond to the service demands satisfied by the internal path or crossing pair of internal paths.

TABLE 3

Elements of Red-Blue Set Cover Algorithm

| Red Elements | Blue Elements |
|---|---|
| Internal path (A, $x_1$, C) | <A, C> |
| Internal path (A, $x_1$, $x_2$, C) | <A, C> |
| Internal path (A, $x_1$, $x_2$, B) | <A, B> |
| Internal path (A, $x_1$, $x_2$, D) | None |
| Internal path (C, $x_2$, B) | None |
| Internal path (B, $x_2$, D) | None |
| Internal path (C, $x_1$, $x_2$, D) | <C, D> |
| Internal path (C, $x_2$, D) | <C, D> |
| Crossing pair (A, $x_1$, $x_2$, D), (C, $x_2$, B) | <A, B>, <C, D>, and <A, C> |

The network management system 150 may determine, using the red-blue set cover algorithm, that the crossing pair of internal paths (A, $x_1$, $x_2$, D) and (C, $x_2$, B) is the minimum set of internal paths to cover all the blue elements. Thus, the network management system 150 may determine the internal paths (A, $x_1$, $x_2$, D) and (C, $x_2$, B) for satisfying the service demands <A, B>, <C, D>, and <A, C> for the communications route cycle 2500. It can be seen that the internal path (C, $x_2$, B) is selected for satisfying the service demands even though it has a relatively higher cost than the internal path (C, $x_1$, $x_2$, B). The internal path (C, $x_2$, B) is selected because it can form a crossing pair of disjoint internal paths with the other internal path (A, $x_1$, $x_2$, D), while the internal path (C, $x_1$, $x_2$, B) is not disjoint and cannot form a crossing pair of disjoint internal paths with the other internal path (A, $x_1$, $x_2$, D).

Compared to solving the internal paths to satisfy each service demand individually, the method 2400 may reduce the total number of internal paths used to satisfy the service demands, thereby facilitating efficient network operation. For example, solving the service demands <A, B>, <C, D>, and <A, C> for the communications route cycle 2500 individually would result in using three internal paths (A, $x_1$, C), (C, $x_1$, $x_2$, D), and (A, $x_1$, $x_2$, B), while the method 2400 would result in using only two internal paths (A, $x_1$, $x_2$, D) and (C, $x_2$, B).

The above-described methods can be used to solve type 1+1+R, type 1++, and type 2 demands in a data communication network. Examples of internal paths to satisfy various types of service demands in a particular configuration of a communication route cycle are provided below, in accordance embodiments of the present disclosure.

Figure 26A:
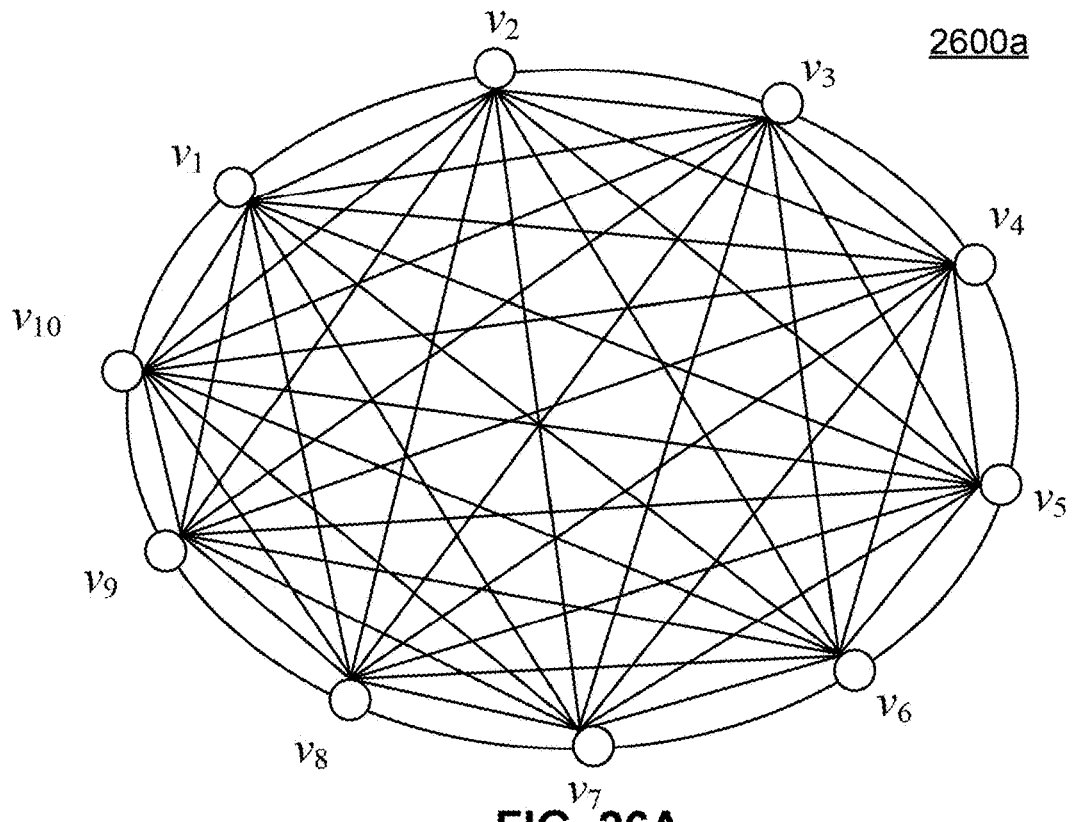
FIGS. 26A-26B are diagrams illustrating an example communications route cycle and internal paths for satisfying type 1+1+R demands, in accordance with embodiments of the present disclosure.

FIG. 26A is a diagram illustrating an example communications route cycle 2600*a* with a plurality of type 1+1+R service demands, consistent with the disclosed embodiments. In this example, the communications route cycle includes a number of 2M vertices and 2M edges on the communication route cycle connecting the vertices, where M is a positive integer. For every pair of vertices, the communication route cycle includes an internal path connecting the pair of vertices, where the internal path is disjoint to the edges of the communication route cycle. The communication route cycle also includes a type 1+1+R service demand between each pair of vertices. As shown in FIG. 26A, the communications route cycle 2600*a* includes ten vertices $\{v_1, v_2, v_3, v_4, v_5, v_6, v_7, v_8, v_9, v_{10}\}$ and ten edges connecting between the vertices, as well as a plurality of internal paths between each pair of vertices, where M equals five in this example. A type 1+1+R service demand exists between each pair of vertices ($v_i$, $v_j$) and needs to be satisfied, where i is a positive integer with a value between [1, 2M], j is a positive integer with a value between [1, 2M], and i≠j.

Figure 26B:
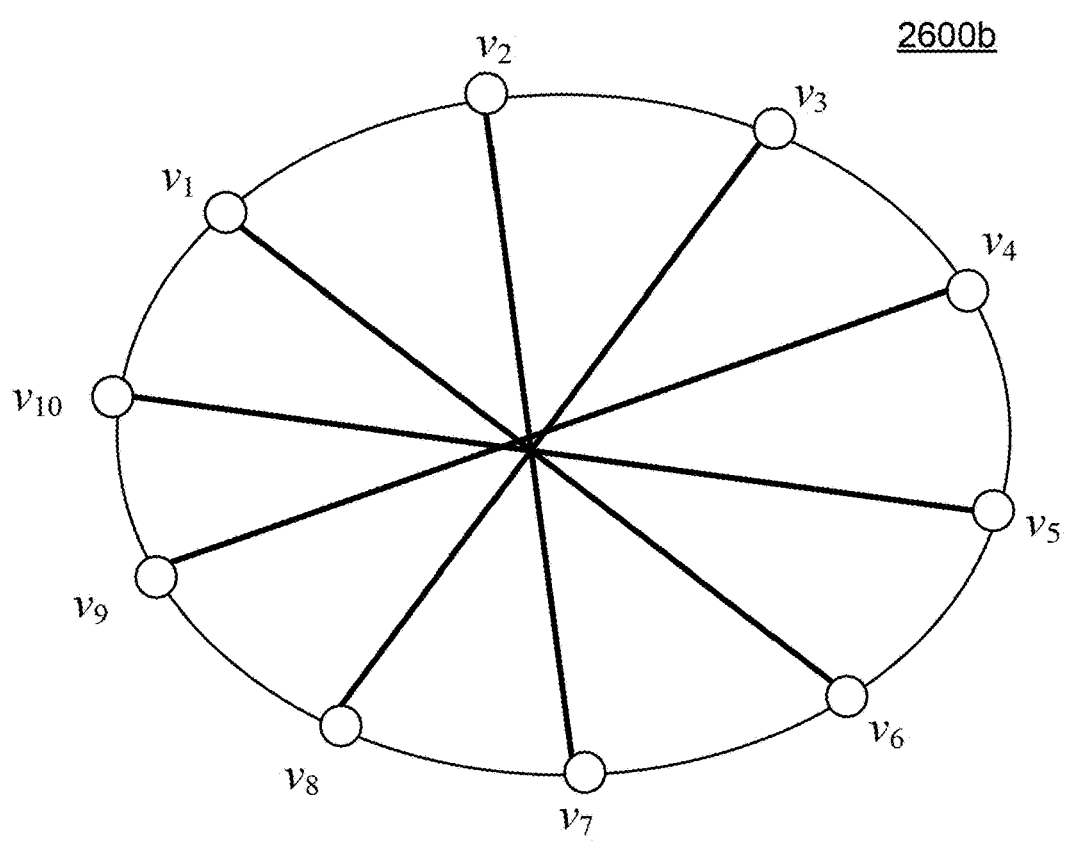

Applying the above-described methods for solving type 1+1+R demands, a subset of internal paths can be selected to satisfy each of the service demands in the communication route cycle. In particular, a number of M internal paths are selected such that each vertex on the communications route cycle is an end point of one internal path. FIG. 26B shows the five internal paths selected to satisfy the plurality of service demands in the communication route cycle 2600*b*. As shown in FIG. 26B, each of the vertices $\{v_1, v_2, v_3, v_4, v_5, v_6, v_7, v_8, v_9, v_{10}\}$ is an end point of one internal path, and the selected internal paths each connect between vertices ($v_k$, $v_{k+M}$), where k is a positive integer with a value between [1, M]. As such, the communication route cycle 2600*b* uses a reduced number of internal paths to satisfy the service demands between each pair of vertices ($v_i$, $v_j$) in the communications route cycle.

Figure 27A:
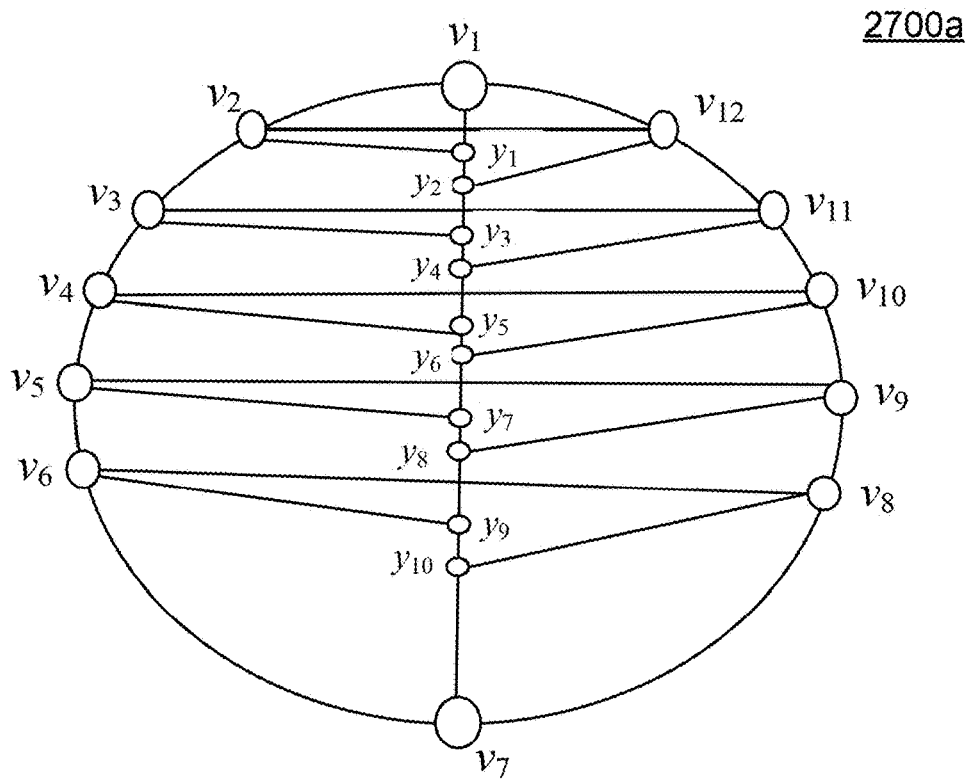
FIGS. 27A-27B are diagrams illustrating an example communications route cycle and internal paths for satisfying type 1++ demands, in accordance with embodiments of the present disclosure.

FIG. 27A is a diagram illustrating an example communications route cycle 2700*a* with a plurality of type 1++ service demands, consistent with the disclosed embodiments. In this example, the communications route cycle includes a number of 2M vertices and 2M edges on the communication route cycle connecting the vertices, where M is a positive integer. The vertices are ordered on the communications route cycle in a clockwise or counterclockwise direction with an index from 1 to 2M. The communications route cycle includes an internal path P connecting between vertices $v_1$ and $v_{M+1}$. In addition, for each pair of vertices ($v_{1+i}$, $v_{2M-i+1}$), i being an integer with a value between [1, M−1], the communications route cycle includes two internal paths connecting the pair of vertices. The first internal path is disjoint to the path P, and the second internal path is not disjoint to the path P. The first internal path is associated with a higher cost than the second internal path. The communication route cycle also includes a type 1++ service demand between vertices $v_1$ and $v_{M+1}$, a type 1++ service demand between vertex $v_1$ and each of the other 2M−2 vertices $v_2, \ldots v_M, v_{M+2}, \ldots, v_{2M}$, a type 1++ service demand between vertex $v_{M+1}$ and each of the other 2M−2 vertices $v_2, \ldots v_M, v_{M+2}, \ldots, v_{2M}$, and a type 1++ service demand between each pair of vertices ($v_{1+i}$, $v_{2M-i+1}$), i being an integer with a value between [1, M−1]. As shown in FIG. 27A, the vertices are ordered on the communications route cycle in a counterclockwise direction with an index from 1 to 12, where M equals 6 in this example. The communications route cycle 2700*a* includes an internal path P connecting between vertex $v_1$ and $v_{M+1}$. The communications route cycle 2700*a* also includes two internal paths connecting each pair of vertices ($v_{1+i}$, $v_{2M-i+1}$), i being an integer with a value between [1, M−1]. For example, for the pair of vertices ($v_2$, $v_{12}$), the communications route cycle 2700*a* includes a first internal path directly connecting between vertices ($v_2$, $v_{12}$) and a second internal path connecting via nodes $y_1$ and $y_2$, where the first internal path is associated with a higher cost than the second internal path. Further, the first internal path is disjoint to the path P, and the second internal path is not disjoint to the path P. The communication route cycle 2700a also includes a type 1++ service demand between vertices $(v_1, v_{M+1})$, between $v_1$ and each of the other 2M−2 vertices $v_2, \ldots v_M, v_{M+2}, \ldots, v_{2M}$, between vertex $v_{M+1}$ and each of the other 2M−2 vertices $v_2, \ldots v_M, v_{M+2}, \ldots, v_{2M}$, and between each pair of vertices $(v_{1+i}, v_{2M-i+1})$, i being an integer with a value between [1, M−1]. That is, the type 1++ service demands include $<v_1, v_7>$, $<v_1, v_2>$, $<v_1, v_3>$, $<v_1, v_4>$, $<v_1, v_5>$, $<v_1, v_6>$, $<v_1, v_8>$, $<v_1, v_9>$, $<v_1, v_{10}>$, $<v_1, v_{11}>$, $<v_1, v_{12}>$, $<v_7, v_2>$, $<v_7, v_3>$, $<v_7, v_4>$, $<v_7, v_5>$, $<v_7, v_6>$, $<v_7, v_8>$, $<v_7, v_9>$, $<v_7, v_{10}>$, $<v_7, v_{11}>$, $<v_7, v_{12}>$, $<v_2, v_{12}>$, $<v_3, v_{11}>$, $<v_4, v_{10}>$, $<v_5, v_9>$, and $<v_6, v_8>$.

Figure 27B:
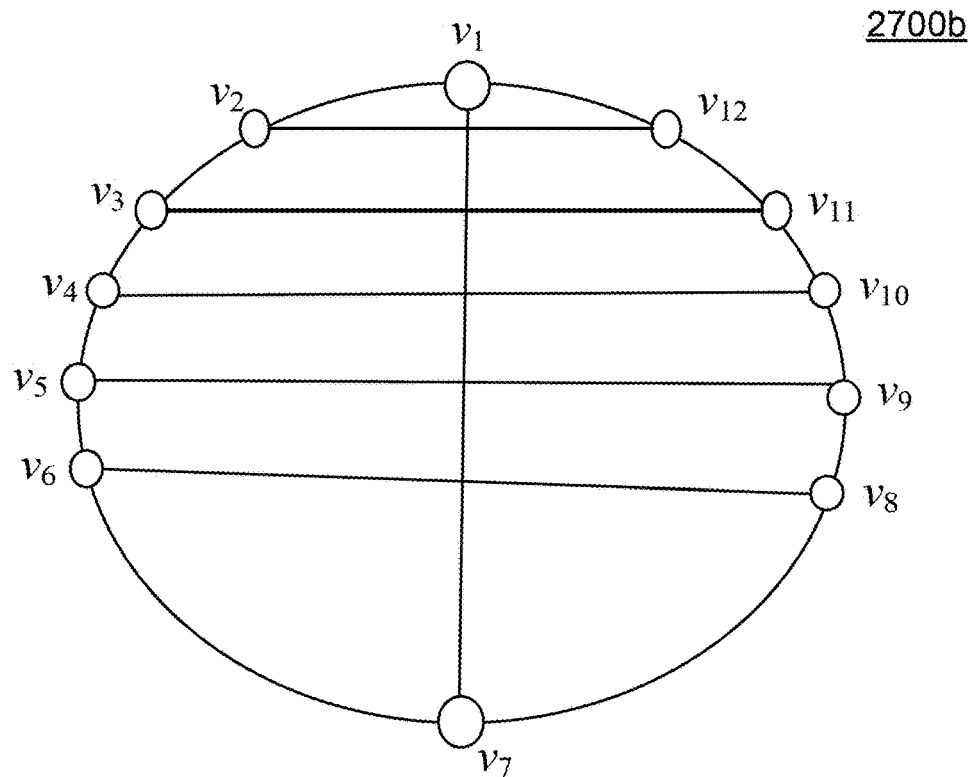

Applying the above-described methods for solving type 1++ demands, a subset of internal paths can be selected to satisfy each of the service demands in the communication route cycle. In particular, for each pair of vertices $(v_{1+i}, v_{2M-i+1})$, i being an integer with a value between [1, M−1], the internal path connecting directly between the pair of vertices is selected to satisfy the service demands. The selected internal paths also include the path P connecting between vertex $v_1$ and $v_{M+1}$. FIG. 27B shows the six internal paths selected to satisfy the plurality of service demands in the communication route cycle 2700b. As shown in FIG. 27B, the selected internal paths include the path P connecting between vertex $v_1$ and $v_7$, as well as the first internal path directly connecting each pair of vertices $(v_{1+i}, v_{2M-i+1})$, i being an integer with a value between [1, M−1]. As such, the communication route cycle 2700b uses a reduced number of internal paths to satisfy the type 1++ service demands $<v_1, v_7>$, $<v_2, v_{12}>$, $<v_3, v_{11}>$, $<v_4, v_{10}>$, $<v_5, v_9>$, and $<v_6, v_8>$.

Figure 28A:
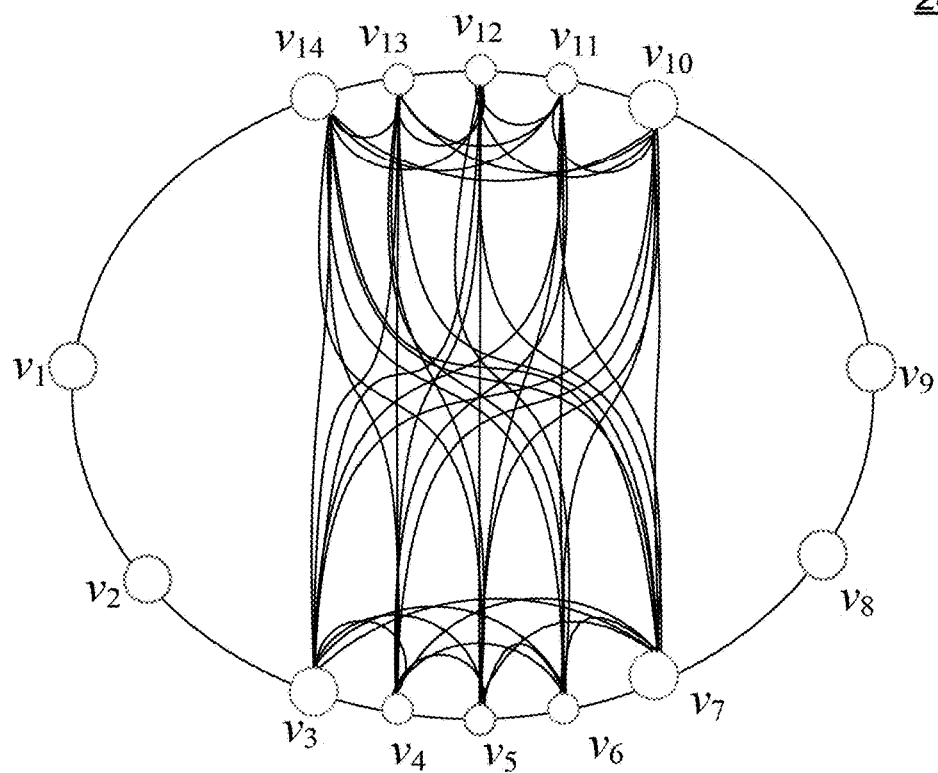
FIGS. 28A-28B are diagrams illustrating an example communications route cycle and internal paths for satisfying type 2 demands, in accordance with embodiments of the present disclosure.

FIG. 28A is a diagram illustrating an example communications route cycle 2800a with a plurality of type 2 service demands, consistent with the disclosed embodiments. In this example, the communications route cycle includes a number of 2M+4 vertices and 2M+4 edges on the communication route cycle connecting the vertices, where M is a positive integer. The vertices are ordered on the communications route cycle in a clockwise or counterclockwise direction with an index from 1 to 2M+4. The vertices are divided into two sets, the first set containing vertices $\{v_3, \ldots, v_{M+2}, v_{M+5}, \ldots v_{2M+4}\}$, and the second set containing vertices $\{v_1, v_2, v_{M+3}, v_{M+4}\}$. Each vertex in the first set is connected to every other vertex in the first set by an internal path, while vertices in the second set are not connected by any internal path. The communication route cycle also includes a plurality of type 2 service demands, each of the type 2 service demands having end points corresponding to vertices in the second set, and the service demands include all combinations of end points from vertices in the second set. As shown in FIG. 28A, the vertices are ordered on the communications route cycle in a counterclockwise direction with an index from 1 to 14, where M equals 5 in this example. The vertices are divided into two sets, the first set containing vertices $\{v_3, v_4, v_5, v_6, v_7, v_{10}, v_{11}, v_{12}, v_{13}, v_{14}\}$, and the second set containing vertices $\{v_1, v_2, v_8, v_9\}$. As shown in FIG. 28A, each vertex in the first set is connected to every other vertex in the first set by an internal path, while vertices in the second set are not connected by any internal path. The communications route cycle 2800a includes a plurality of type 2 service demands, each of the type 2 service demands having end points corresponding to vertices in the second set, and the service demands include all combinations of end points from vertices in the second set. That is, the type 2 service demands in the communications route cycle 2800a include $<v_1, v_2>$, $<v_1, v_8>$, $<v_1, v_9>$, $<v_2, v_8>$, $<v_2, v_9>$, and $<v_8, v_9>$.

Figure 28B:
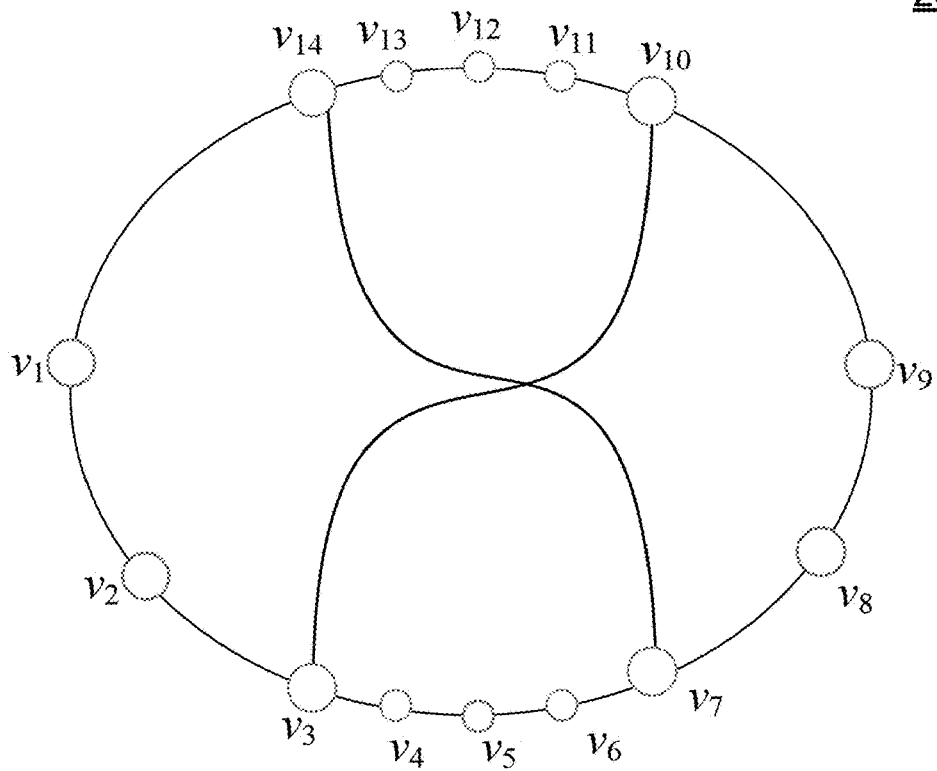

Applying the above-described methods for solving type 2 demands, a subset of internal paths can be selected to satisfy each of the service demands in the communication route cycle. In particular, two internal paths are selected to satisfy the service demands, the first internal path connecting directly between vertices $v_3$ and $v_{M+5}$, and the second internal path connecting directly between vertices $v_{M+2}$ and $v_{2M+4}$. FIG. 28B shows the two internal paths selected to satisfy the plurality of service demands in the communication route cycle 2800b. As shown in FIG. 28B, the selected internal paths include the first internal connecting directly between vertices $v_3$ and $v_{10}$ and the second internal connecting directly between vertices $v_7$ and $v_{14}$. As such, the communication route cycle 2800b uses a reduced number of internal paths to satisfy the type 2 service demands $<v_1, v_2>$, $<v_1, v_8>$, $<v_1, v_9>$, $<v_2, v_8>$, $<v_2, v_9>$, and $<v_8, v_9>$.

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A method for satisfying a service demand in a data communication network, comprising:
   identifying a plurality of vertices in a communications route cycle, the communications route cycle alternating through the plurality of vertices and a plurality of edges in a sequence;
   identifying a plurality of candidate internal paths in the communications route cycle, wherein each of the plurality of candidate internal paths connects between two of the plurality of vertices, and each of the plurality of candidate internal paths is disjoint to the plurality of edges;
   identifying a first internal path and a second internal path among the plurality of candidate internal paths as a crossing pair of internal paths, wherein:
   the first internal path connects between a first vertex and a second vertex among the plurality of vertices, and the second internal path connects between a third vertex and a fourth vertex among the plurality of vertices, and
   the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle;

generating a Steiner graph based on the crossing pair of internal paths and the plurality of candidate internal paths;

selecting, based on the identified crossing pair of internal paths and the Steiner graph, a plurality of internal paths among the plurality of candidate internal paths; and determining a set of service paths for satisfying the service demand based on the plurality of internal paths and the plurality of edges.

2. The method of claim 1, wherein a restoration path is available based on the plurality of internal paths in case of a failure of two edges among the plurality of edges.

3. The method of claim 1, further comprising:
selecting a set of vertices among the plurality of vertices based on end points of the service demand and the plurality of candidate internal paths; and
identifying a Steiner tree connecting between each vertex in a set of vertices in the Steiner graph, wherein the Steiner tree includes the plurality of internal paths.

4. The method of claim 3, wherein the set of vertices includes two, three or four vertices, and each of the set of vertices is an end point of an internal path.

5. The method of claim 3, wherein;
the Steiner graph includes one or more connected components, each of the connected components including two or more connected edges, and selecting the set of vertices comprises:
for each of the connected components, identifying, among vertices included in the corresponding connected component, the closest vertices to end points of the service demand from two opposing sides of the communications route cycle.

6. The method of claim 3, wherein the Steiner graph includes a first set of vertices and a second set of vertices, the first set of vertices corresponding to the plurality of vertices in the communications route cycle, and the second set of vertices corresponding to the plurality of candidate internal paths in the communications route cycle.

7. The method of claim 6, further comprising:
identifying a pair of internal paths, the pair of internal paths sharing at least one vertex as an end point of each of the pair of internal paths, wherein the Steiner graph includes an edge connecting between the pair of internal paths.

8. The method of claim 6, wherein the Steiner graph includes one or more edges connecting between one of the first set of vertices and one of the second set of vertices, wherein the one of the first set of vertices is an end point of the internal path corresponding to the one of the second set of vertices.

9. The method of claim 6, wherein the Steiner graph includes an edge connecting between the identified crossing pair of internal paths.

10. The method of claim 1, further comprising:
identifying a plurality of service demands in the data communication network;
selecting a set of vertices among the plurality of vertices based on end points of the plurality of service demands and the plurality of candidate internal paths;
identifying a Steiner tree connecting the set of vertices in the Steiner graph; and
determining, based on the Steiner tree, a plurality of internal paths for each of the plurality of service demands.

11. The method of claim 10, further comprising:
selecting a group of vertices among the plurality of vertices for each of the plurality of service demands; and
for each of the plurality of service demands, identifying, based on the Steiner tree, a tree connecting the corresponding group of vertices, wherein the plurality of internal paths for the corresponding service demand are determined based on the tree.

12. The method of claim 1, further comprising:
identifying, among the plurality of edges, two edges as a protected edge pair, wherein:
a path between end points of the service demand is available in the data communication network after a failure of the protected edge pair.

13. The method of claim 12, further comprising:
detecting the failure of the protected edge pair; and
identifying a third service path that satisfies the service demand in response to detecting the failure of the protected edge pair.

14. A network management system for satisfying a service demand in a data communication network, the system comprising:
at least one processor; and
a memory for storing instructions executable by the at least one processor;
wherein the at least one processor is configured to:
identify a plurality of vertices in a communications route cycle, the communications route cycle alternating through the plurality of vertices and a plurality of edges in a sequence;
identify a plurality of candidate internal paths in the communications route cycle, wherein each of the plurality of candidate internal paths connects between two of the plurality of vertices, and each of the plurality of candidate internal paths is disjoint to the plurality of edges;
identify a first internal path and a second internal path among the plurality of candidate internal paths as a crossing pair of internal paths, wherein:
the first internal path connects between a first vertex and a second vertex among the plurality of vertices, and the second internal path connects between a third vertex and a fourth vertex among the plurality of vertices, and
the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle;
generate a Steiner graph based on the crossing pair of internal paths and the plurality of candidate internal paths;
select, based on the identified crossing pair of internal paths and the Steiner graph, a plurality of internal paths among the plurality of candidate internal paths; and
determine a set of service paths for satisfying the service demand based on the plurality of internal paths and the plurality of edges.

15. The network management system of claim 14, wherein a restoration path is available based on the plurality of internal paths in case of a failure of two edges among the plurality of edges.

16. The network management system of claim 14, wherein the at least one processor is further configured to:
- select a set of vertices among the plurality of vertices based on end points of the service demand and the plurality of candidate internal paths; and
- identify a Steiner tree connecting between each vertex in a set of vertices in the Steiner graph, wherein the Steiner tree includes the plurality of internal paths.

17. The network management system of claim 16, wherein the set of vertices includes two, three or four vertices, and each of the set of vertices is an end point of an internal path.

18. The network management system of claim 16, wherein:
- the Steiner graph includes one or more connected components, each of the connected components including two or more connected edges, and selecting the set of vertices comprises:
  - for each of the connected components, identifying, among vertices included in the corresponding connected component, the closest vertices to end points of the service demand from two opposing sides of the communications route cycle.

19. The network management system of claim 16, wherein the Steiner graph includes a first set of vertices and a second set of vertices, the first set of vertices corresponding to the plurality of vertices in the communications route cycle, and the second set of vertices corresponding to the plurality of candidate internal paths in the communications route cycle.

20. The network management system of claim 19, wherein the at least one processor is further configured to:
- identify a pair of internal paths, the pair of internal paths sharing at least one vertex as an end point of each of the pair of internal paths, wherein the Steiner graph includes an edge connecting between the pair of internal paths.

21. The network management system of claim 19, wherein the Steiner graph includes one or more edges connecting between one of the first set of vertices and one of the second set of vertices, wherein the one of the first set of vertices is an end point of the internal path corresponding to the one of the second set of vertices.

22. The network management system of claim 19, wherein the Steiner graph includes an edge connecting between the identified crossing pair of internal paths.

23. The network management system of claim 14, wherein the at least one processor is further configured to:
- identify a plurality of service demands in the data communication network;
- select a set of vertices among the plurality of vertices based on end points of the plurality of service demands and the plurality of candidate internal paths;
- identify a Steiner tree connecting the set of vertices in the Steiner graph; and
- determine, based on the Steiner tree, a plurality of internal paths for each of the plurality of service demands.

24. The network management system of claim 23, wherein the at least one processor is further configured to:
- select a group of vertices among the plurality of vertices for each of the plurality of service demands; and
- for each of the plurality of service demands, identify, based on the Steiner tree, a tree connecting the corresponding group of vertices, wherein the plurality of internal paths for the corresponding service demand are determined based on the tree.

25. The network management system of claim 14, wherein the at least one processor is further configured to:
- identify, among the plurality of edges, two edges as a protected edge pair, wherein:
- a path between end points of the service demand is available in the data communication network after a failure of the protected edge pair.

26. The network management system of claim 25, wherein the at least one processor is further configured to:
- detect the failure of the protected edge pair; and
- identify a third service path that satisfies the service demand in response to detecting the failure of the protected edge pair.

27. A non-transitory computer readable medium storing a set of instructions that is executable by at least one processor of a network management system to cause the network management system to perform operations for satisfying a service demand in a data communication network, the operations comprising:
- identifying a plurality of vertices in a communications route cycle, the communications route cycle alternating through the plurality of vertices and a plurality of edges in a sequence;
- identifying a plurality of candidate internal paths in the communications route cycle, wherein each of the plurality of candidate internal paths connects between two of the plurality of vertices, and each of the plurality of candidate internal paths is disjoint to the plurality of edges;
- identifying a first internal path and a second internal path among the plurality of candidate internal paths as a crossing pair of internal paths, wherein:
  - the first internal path connects between a first vertex and a second vertex among the plurality of vertices, and the second internal path connects between a third vertex and a fourth vertex among the plurality of vertices, and
  - the communications route cycle alternates through the first vertex, the third vertex, the second vertex, and the fourth vertex, each of the first vertex and the second vertex intervening between the third vertex and the fourth vertex on the communications route cycle, and each of the third vertex and the fourth vertex intervening between the first vertex and the second vertex on the communications route cycle;
- generating a Steiner graph based on the crossing pair of internal paths and the plurality of candidate internal paths;
- selecting, based on the identified crossing pair of internal paths and the Steiner graph, a plurality of internal paths among the plurality of candidate internal paths; and
- determining a set of service paths for satisfying the service demand based on the plurality of internal paths and the plurality of edges.

28. A method for identifying a set of internal paths for satisfying a plurality of service demands in a data communication network, comprising:
- accessing a communications route cycle, the communications route cycle including a number of 2M+4 vertices and a number of 2M+4 edges, M being a positive integer, wherein the vertices are ordered on the communications route cycle in a clockwise or counterclockwise direction with an index from 1 to 2M+4, wherein a first set of vertices includes vertices $\{v_3, \ldots v_{M+2}, v_{M+5}, \ldots v_{2M+4}\}$, and the second set includes vertices $\{v_1, v_2, v_{M+3}, v_{M+4}\}$, wherein the communications route cycle further includes a plurality of internal paths, each pair of vertices in the first set is connected by one of the plurality of internal paths, and vertices in the second set is not connected by any internal paths, and wherein the plurality of service demands is of type 2, each of the plurality of service demands having end points corresponding to vertices in the second set, and each pair of vertices in the second set corresponds to end points of one of the plurality of service demands; and selecting a first internal path and a second internal path for satisfying the plurality of service demands based on a Steiner graph, the Steiner graph being generated based on the plurality of internal paths, wherein the first internal path connects directly between vertices $v_3$ and $v_{M+5}$, and the second internal path connects directly between vertices $v_{M+2}$ and $v_{2M+4}$.

\* \* \* \* \*